US012812397B2

(12) United States Patent
Tsuda et al.

(10) Patent No.: US 12,812,397 B2
(45) Date of Patent: Nov. 24, 2026

(54) RADIO UNIT, MANAGEMENT DEVICE, AND COMMUNICATION CONTROL METHOD

(71) Applicant: SONY GROUP CORPORATION, Tokyo (JP)

(72) Inventors: Shinichiro Tsuda, Tokyo (JP); Hideji Wakabayashi, Surrey (GB)

(73) Assignee: SONY GROUP CORPORATION, Tokyo (JP)

( * ) Notice: Subject to any disclaimer, the term of this patent is extended or adjusted under 35 U.S.C. 154(b) by 270 days.

(21) Appl. No.: 18/699,978

(22) PCT Filed: Sep. 21, 2022

(86) PCT No.: PCT/JP2022/035244
§ 371 (c)(1),
(2) Date: Apr. 10, 2024

(87) PCT Pub. No.: WO2023/067980
PCT Pub. Date: Apr. 27, 2023

(65) Prior Publication Data

US 2024/0422566 A1 Dec. 19, 2024

(30) Foreign Application Priority Data

Oct. 19, 2021 (JP) ................................ 2021-171111

(51) Int. Cl.
*H04W 16/14* (2009.01)
*H04W 16/16* (2009.01)
(Continued)

(52) U.S. Cl.
CPC ........... *H04W 16/14* (2013.01); *H04W 16/16* (2013.01); *H04W 72/0446* (2013.01);
(Continued)

(58) Field of Classification Search
CPC . H04W 16/14; H04W 16/16; H04W 72/0446; H04W 72/0453; H04W 84/045; H04W 76/15
See application file for complete search history.

(56) References Cited

U.S. PATENT DOCUMENTS

2018/0262978 A1 9/2018 Kahn
2021/0006371 A1 1/2021 Raghothaman et al.
2022/0131798 A1* 4/2022 Akl ....................... H04W 40/24

FOREIGN PATENT DOCUMENTS

JP 2019-521560 A 7/2019
JP 2019-153955 A 9/2019

OTHER PUBLICATIONS

International Search Report and Written Opinion of PCT Application No. PCT/JP2022/035244, issued on Dec. 27, 2022, 09 pages of ISRWO.

(Continued)

*Primary Examiner* — Matthew E Heneghan
(74) *Attorney, Agent, or Firm* — CHIP LAW GROUP

(57) ABSTRACT

[Problem] Provided are a radio unit, a management device, and a communication control method that enable a company such as a microoperator to easily introduce a local network using a mobile communication system such as 5G. [Solution] A radio unit of the present disclosure is a radio unit belonging to a local network domain, and includes a communication processing unit that connects to a first distributed unit and performs first communication between the first distributed unit and a terminal device, and connects to a second distributed unit belonging to a public network domain and performs second communication between the second distributed unit and the terminal device or another terminal device.

20 Claims, 21 Drawing Sheets

(51) Int. Cl.

| | |
|---|---|
| ***H04W 72/0446*** | (2023.01) |
| ***H04W 72/0453*** | (2023.01) |
| ***H04W 76/15*** | (2018.01) |
| ***H04W 84/04*** | (2009.01) |
| ***H04W 88/08*** | (2009.01) |
| *H04W 8/18* | (2009.01) |
| *H04W 88/10* | (2009.01) |

(52) U.S. Cl.
CPC ....... *H04W 72/0453* (2013.01); *H04W 76/15* (2018.02); *H04W 84/045* (2013.01); *H04W 8/186* (2013.01); *H04W 88/085* (2013.01); *H04W 88/10* (2013.01)

(56) References Cited

OTHER PUBLICATIONS

Zte, et al "Summary of Offline Discussion on CB: # 12_IAB_Others_RANsharing", 3GPP TAG-RAN WG3 #109-e, R3-205472, Aug. 17-28, 2020, pp. 1-9.

* cited by examiner

RADIO UNIT, MANAGEMENT DEVICE, AND COMMUNICATION CONTROL METHOD

CROSS REFERENCE TO RELATED APPLICATIONS

This application is a U.S. National Phase of International Patent Application No. PCT/JP2022/035244 filed on Sep. 21, 2022, which claims priority benefit of Japanese Patent Application No. JP 2021-171111 filed in the Japan Patent Office on Oct. 19, 2021. Each of the above-referenced applications is hereby incorporated herein by reference in its entirety.

TECHNICAL FIELD

The present disclosure relates to a radio unit, a management device, and a communication control method.

BACKGROUND ART

The first standard of the 5th generation mobile communication system, so-called 5G, having at least one of functions of high speed and large capacity (enhanced mobile broadband (eMBB)), low latency and high reliability (ultra-reliable and low latency communications (URLLC)), and multi-user simultaneous connection (massive machine type communication (mMTC)) was formulated as Rel-15 in 2018, and a service compatible with 5G was started in Japan in March 2020. In 5G, it is expected to use a high-frequency band such as a millimeter wave band in which a broadband frequency band is easily secured in order to realize ultra-high speed communication.

Furthermore, an O-RAN alliance has been established mainly by telecom operators, and standardization for realizing a configuration of a cloud RAN (C-RAN) by a multi-vendor is also being performed.

Moreover, an operation form of local 5G, which is a 5G system that can be flexibly constructed by various entities such as local companies and local governments in accordance with individual needs of regions and industries in a spot manner in their own buildings or sites, has attracted attention, and a frequency of 28.2-28.3 GHz band is allocated to local 5G also in Japan. In the future, it is expected that a large number of microoperators that develop unique services by utilizing the local 5G will appear.

In a high frequency band, it is easy to secure a wide frequency band, but since radio waves have high straightness and a large propagation loss, there are problems such as utilization of beamforming for compensating the propagation loss and necessity of more densely installing base stations. In the future, a radio unit (RU) that is compliant with O-RAN and does not depend on a vendor is put on the market, so that it is considered that an environment for densely installing base stations is prepared. Patent Document 1 below discloses a technique for flexibly changing allocation of functions to a plurality of base stations configured by functions of a plurality of virtual machines according to mobility or the like of a wireless terminal device. With the future introduction of such a technique, it is considered that the need for dynamic operation management of a wireless access network according to the type of traffic and the demand for services increases.

CITATION LIST

Patent Document

Patent Document 1: Japanese Patent Application Laid-Open No. 2019-153955

SUMMARY OF THE INVENTION

Problems to be Solved by the Invention

It is expected that the burden of the operation management of the network is reduced by the introduction of the concept of the software defined network (SDN) utilizing technologies such as virtualization and container. On the other hand, since the introduction of the local 5G requires operation management by installing a 5G core (5GC) device or a Home GW device by itself, the introduction of the local 5G is considered to be a heavy load for a microoperator having a small business scale, unlike a WiFi hot spot that can be immediately used by being connected to a broadband line. Furthermore, when telecom operators densely install base stations in order to improve capacity, there is a concern that the trouble of negotiating with right holders of buildings and sites is one of obstacles to the spread of 5G.

The present disclosure provides a radio unit, a management device, and a communication control method that enable a company such as a microoperator to easily introduce a local network using a mobile communication system such as 5G.

Solutions to Problems

A radio unit of the present disclosure is a radio unit belonging to a local network domain, including a communication processing unit that connects to a first distributed unit and performs first communication between the first distributed unit and a terminal device, and connects to a second distributed unit belonging to a public network domain and performs second communication between the second distributed unit and the terminal device or another terminal device

MODE FOR CARRYING OUT THE INVENTION

Hereinafter, embodiments of the present invention will be described with reference to the drawings. In one or more embodiments described in the present disclosure, components included in each of the embodiments can be combined with each other, and the combined resultant also forms part of the embodiments described in the present disclosure.

[1. Configuration of Network Architecture of 5G System (5GS)]

Figure 1:
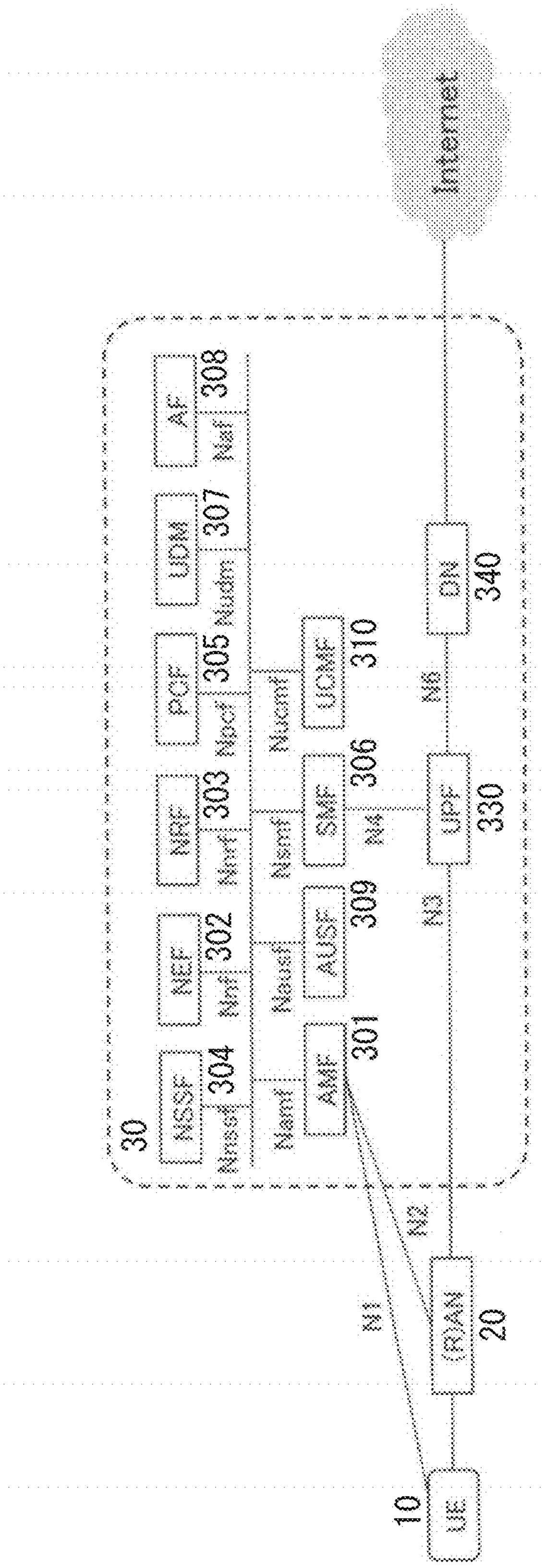
FIG. 1 is a diagram illustrating a configuration of a network architecture of a 5G system (5GS).

FIG. 1 is a diagram illustrating a configuration of a 5G system (5GS) network architecture. The 5GS includes a user equipment (UE) 10, a radio access network/access network ((R)AN) 20, and a core network 30. Here, the core network 30 is also referred to as 5G core (5GC) or NG core (NGC).

The function group of the control plane includes a plurality of network functions (NFs) including an access and mobility management function (AMF) 301, a network exposure function (NEF) 302, a network repository function (NRF) 303, a network slice selection function (NSSF) 304, a policy control function (PCF) 305, a session management function (SMF) 306, a unified data management (UDM) 307, an application function (AF) 308, an authentication server function (AUSF) 309, and a UE radio capability management function (UCMF) 310.

The UDM 307 includes a unified data repository (UDR) that holds and manages subscriber information and a front end (FE) unit that processes the subscriber information. Furthermore, the AMF 301 performs mobility management. The SMF 306 performs session management. The UCMF 310 holds UE radio capability information corresponding to all UE radio capability IDs in a public land mobile network (PLMN). The UCMF 310 is responsible for assigning each PLMN-assigned UE radio capability ID.

Here, Namf is a service-based interface provided by the AMF 301, Nsmf is a service-based interface provided by the SMF 306, Nnef is a service-based interface provided by the NEF 302, Npcf is a service-based interface provided by the PCF 305, Nudm is a service-based interface provided by the UDM 307, Naf is a service-based interface provided by the AF 308, Nnrf is a service-based interface provided by the NRF 303, Nnssf is a service-based interface provided by the NSSF 304, and Nausf is a service-based interface provided by the AUSF 309. Each NF exchanges information with another NF via each service-based interface.

Furthermore, a user plane function (UPF) 330 has a function of user plane processing. A data network (DN) 340 has a function of enabling connection to a service unique to a mobile network operator (MNO), the Internet, or a third-party service.

The (R)AN 20 has a function of enabling connection to a radio access network (RAN) and connection to an access network (AN) other than the RAN. The (R)AN 20 includes a base station device 20 called a gNB or an ng-eNB. The RAN may be referred to as a next generation (NG)-RAN.

Information is exchanged between the UE 10 and the AMF 301 via a reference point N1. Information is exchanged between the (R)AN 20 and the AMF 301 via a reference point N2. Information is exchanged between the SMF 306 and the UPF 330 via a reference point N4.

[2. Function Division of Base Station Device]

Figure 2:
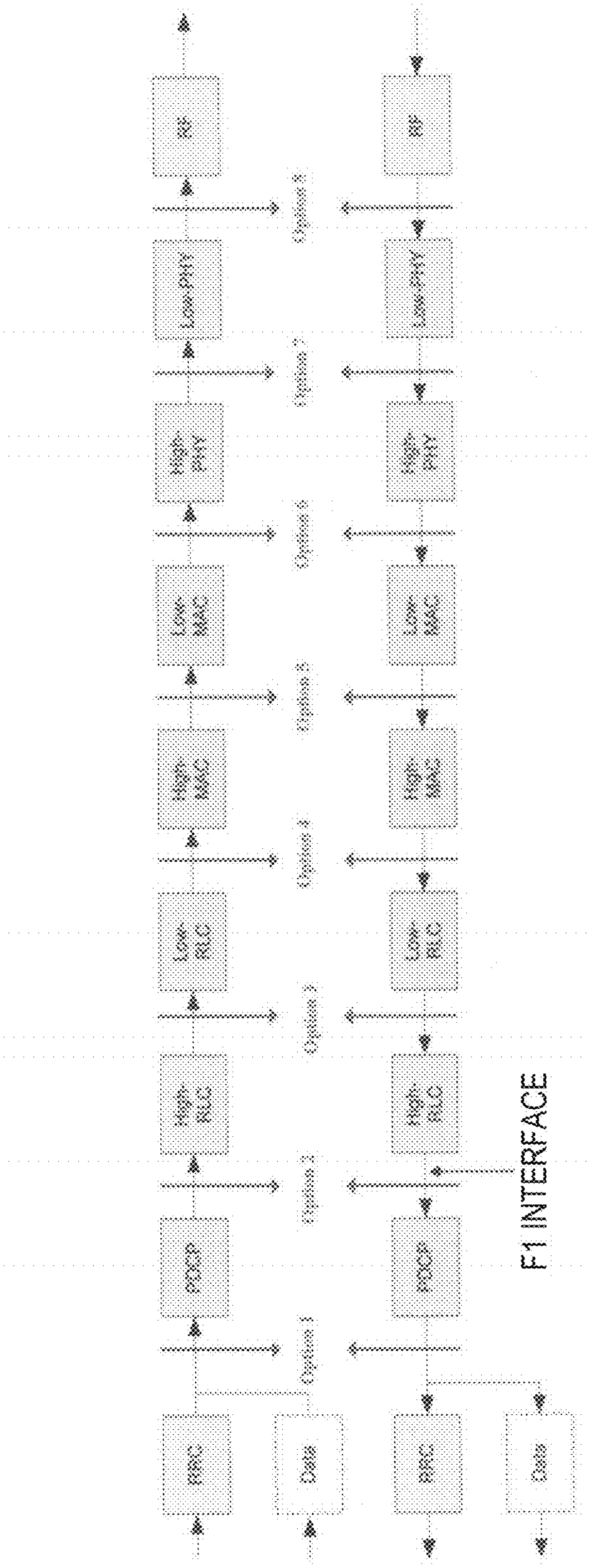
FIG. 2 is a diagram illustrating respective Options of function division of a central unit (CU) and a distributed unit (DU) discussed in 5G.

FIG. 2 is a diagram illustrating respective Options of function division of a central unit (CU) and a distributed unit (DU) discussed in 5G extracted from 3GPP TR38.801 "Study on new radio access technology: Radio access architecture and interfaces".

In the 4G, Option 8 using the CPRI/OBSAI protocol is adopted, and a configuration in which the RF unit is divided into a remote radio head (RRH) that processes the RF unit and a base band unit (BBU) that processes other L1/L2/L3 functions is defined. Since a transmission rate proportional to the number of antenna ports and the channel bandwidth is required for the fronthaul connecting the BBU and the RRH, introduction of a division option capable of relaxing the transmission rate has been required in 5G. Therefore, in 5G, a configuration is defined in which a DU that processes L2/L1 functions below a radio link control (RLC) sublayer and a CU that processes L2/L3 functions above a packet data convergence protocol (PDCP) sublayer are divided at a division point corresponding to Option 2. That is, the F1 interface based on Option 2 is defined.

5G supports three types of communication forms having greatly different properties, such as eMBB, URLLC, and mMTC. After B5G (Beyond 5G), it is assumed that demand for support for other communication forms having such different properties increases more and more, and introduction of an adaptive communication processing mechanism according to each communication form is desired. Furthermore, depending on the communication form, an operation of dynamically controlling the division of functions other than Option 2 may be considered.

Figure 3:
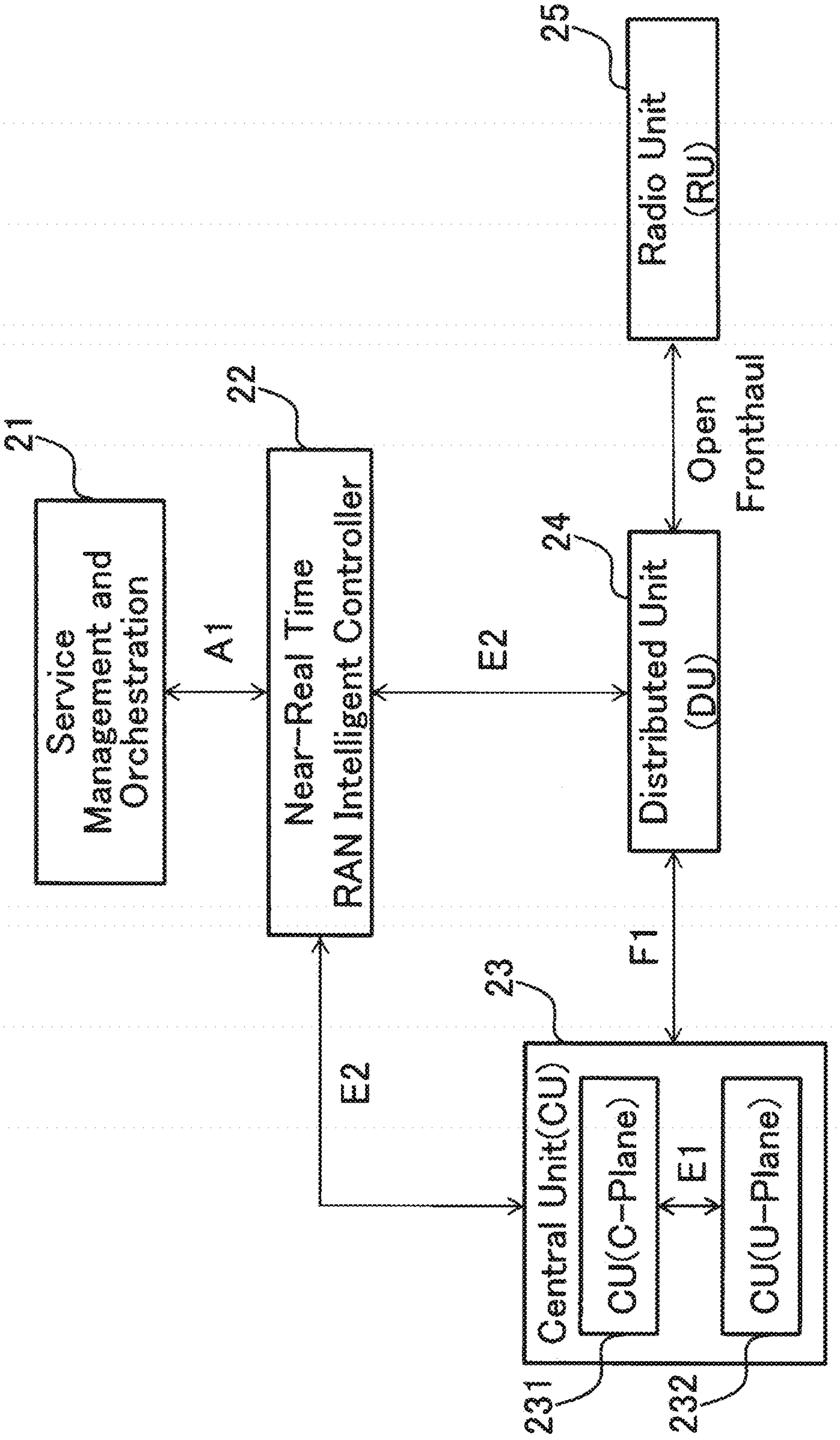
FIG. 3 is a diagram illustrating a configuration of a reference architecture of an O-RAN.

FIG. 3 is a diagram illustrating a configuration of a reference architecture of the O-RAN. The O-RAN includes functions of a service management and orchestration (SMO) 21, a near-real time RAN intelligent controller (RIC) 22, a central unit (CU) 23, a distributed unit (DU) 24, and a radio unit (RU) 25. The SMO 21 is connected to the near-real time RIC 22 via an A1 interface. The CU 23 and the DU 24 are connected to the near-real time RIC 22 via an E2 interface. The CU 23 is connected to the DU 24 through an F1 interface based on the foregoing Option 2. In the O-RAN, a function of a DU of 5G new radio (NR) is further divided into a DU 24 and an RU 25 at a division point corresponding to Option 7 of the function division option illustrated in FIG. 2. The DU 24 is connected to the RU 25 via Open Fronthaul. The CU 23 includes a CU (C-Plane) 231 that processes a control plane (C-Plane) and a CU (U-Plane) 232 that processes a user plane (U-Plane). The CU (C-Plane) 231 and the CU (U-Plane) 232 are connected via an E1 interface.

The service management and orchestration (SMO) 21 has a function of non-real time RIC and a function of managing policies, settings, performance, and the like, and controls the CU 23 and the DU 24 via the near-real time RIC 22.

The near-real time RIC 22 has compatibility with conventional radio resource management (RRM), and can further provide a function of RRM that implements quality of service (QOS) management utilizing artificial intelligence (AI), connection management, and seamless handover.

The CU 23 includes sublayers of PDCP, service data adaptation protocol (SDAP), and radio resource control (RRC) in a protocol stack necessary for the base station.

The DU 24 includes sublayers of RLC, medium access control (MAC), and HIGH PHY in a protocol stack necessary for the base station.

The RU 25 has functions of a LOW PHY sublayer and a wireless unit (Radio) in a protocol stack necessary for the base station.

[3. Configuration of Local 5G]

Figure 4:
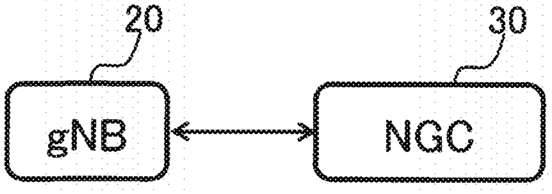
FIG. 4 is a diagram illustrating a basic configuration of a local 5G.

FIG. 4 is a diagram illustrating a basic configuration of the local 5G. The local 5G includes a gNB 20 and an NGC 30. The gNB 20 corresponds to the (R)AN 20, and the NG core (NGC) 30 is a device corresponding to the core network 30. Here, the local 5G may be in a form called a private network, a non-public network (NPN), or a local area network. For example, the microoperator serving as the local 5G operator can provide a private network service using the local 5G as a standalone configuration by installing and operating the base station device corresponding to the gNB 20 and the core network device corresponding to the NGC 30. Here, various entities such as local companies and local governments that provide local 5G according to individual needs of regions and industries are assumed as the microoperator, and it is considered that it is a considerable burden to install and operate the base station device and the core network device by itself depending on the scale of the microoperator.

Since a service based architecture is introduced in the NGC 30 illustrated in FIG. 1, each NF may be configured by virtualization or container, and each NF may be realized on a cloud basis using a software defined network (SDN).

Figure 5:
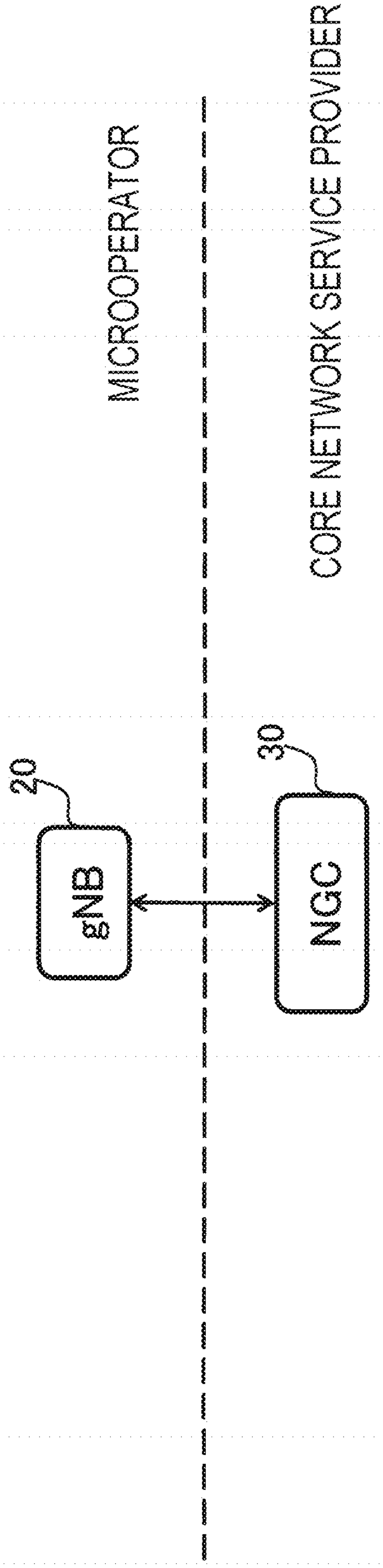
FIG. 5 is a diagram illustrating an example of a configuration of a local 5G using a cloud-based core network.

FIG. 5 is a diagram illustrating an example of a configuration of the local 5G using a cloud-based core network. Here, a core network service provider (which may be simply referred to as a service provider) provides a microoperator with a cloud-based core network (NGC 30) operation and management service as a network as a service (NaaS). That is, by using the cloud-based core network operation and management service, the microoperator is only required to install only the base station device corresponding to the gNB 20 by himself/herself, so that the burden can be reduced.

The service-based architecture may be applied not only to the NGC 30 but also to the gNB 20. For example, by configuring the signal processing of each sublayer of the PHY, the MAC, the RLC, the SDAP, the PDCP, and the RRC by virtualization or a container, a part or all of the functions of the base station device can be processed on a cloud basis.

Figure 6:
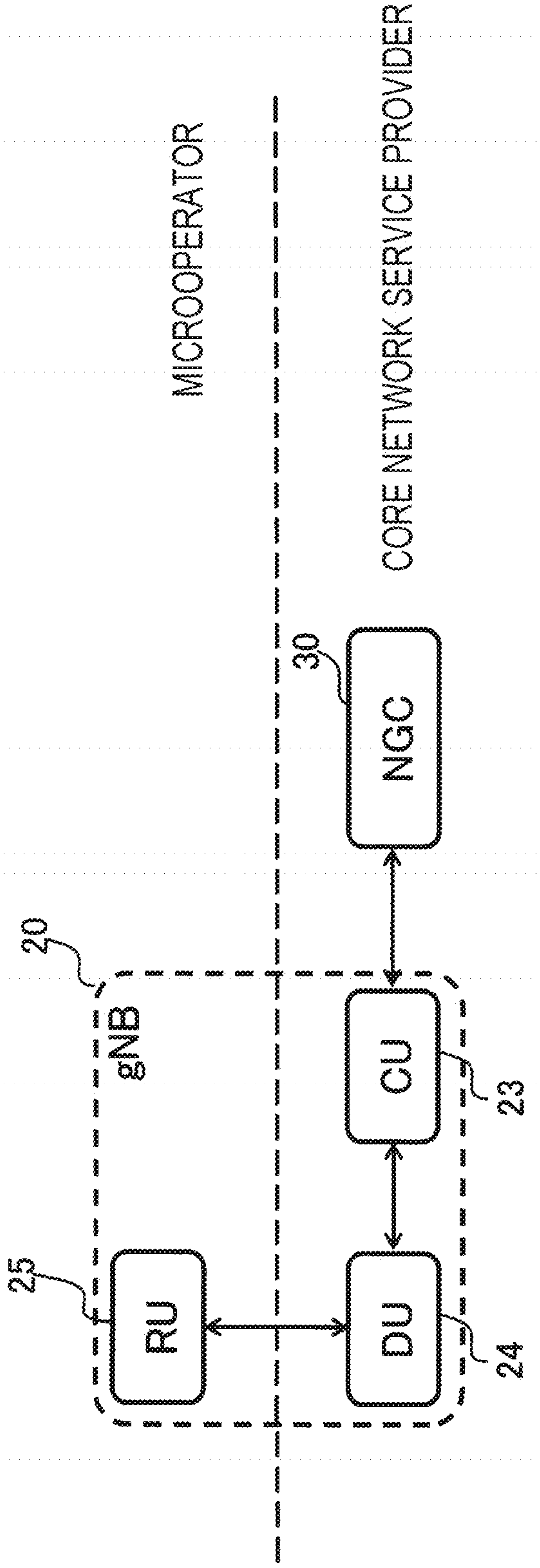
FIG. 6 is a diagram illustrating another example of a configuration of a local 5G using a cloud-based base station device.

FIG. 6 is a diagram illustrating another example of the configuration of the local 5G using the cloud-based base station device. Here, the service provider provides the microoperator with a service of operation and management of the CU 23 and the DU 24 constituting the base station device in addition to the cloud-based core network (NGC 30) as NaaS. That is, by using the cloud-based core network and the services of the operation and management of the CUs and the DUs constituting the base station device, the microoperator is only required to install only the device corresponding to the RU 25 by himself/herself, so that the burden can be further reduced.

[4. Coordinated Operation of Local 5G and PLMN]

As a standard assuming operation of the local 5G, a standard of a non-public network (NPN) is formulated in Release 16 in the third generation partnership project (3GPP). In the NPN, two operation modes of a stand-alone non-public network (SNPN) and a public network integrated NPN (PNI-NPN) are prepared. The former SNPN is a configuration of a stand-alone (SA) operated in a frequency band (frequency band) that can be used by the local 5G business operator itself assuming that the local 5G business operator who newly enters other than the operator uses the SNPN. The latter PNI-NPN is configured to depend on a network function provided by a public land mobile network (PLMN) operator assuming that the PLMN operator operates in its own licensed frequency band. In the PNI-NPN, by setting a closed access group (CAG) that limits a group of contractors that can access a specific cell of a 5G base station belonging to a PLMN ID of a PLMN operator, the PLMN operator can provide a non-public network environment for the specific contractor in its own licensed frequency band. PLMN operators provide public and non-public services over the same PLMN ID, and UE 10 identifies a CAG cell that is a PNI-NPN by the CAG ID. That is, the public and non-public services provided by the PLMN operator are provided by a network identified by a PLMN ID that is a globally unique identifier (GUID). Here, the PLMN ID includes a mobile country code (MCC) and a mobile network code (MNC). On the other hand, in order for the UE 10 to identify the SNPN, a SNPN ID that is an identifier obtained by combining a PLMN ID and a network identifier (NID) is used. Here, the PLMN ID used for the SNPN ID is different from the PLMN ID which is a globally unique identifier (GUID) used in the PNI-NPN, and may be locally (that is, in the SNPN) unique. The non-public service provided by the microoperator serving as the local 5G operator is provided by a network identified by the SNPN ID. That is, the device belonging to the network providing the non-public service of the microoperator or the network function is different from the device belonging to the network providing the public and non-public services of the PLMN operator or the network function, and the device belonging to another network or the network function cannot be necessarily identified only by the PLMN ID.

In the UE 10 not operating in the SNPN access mode, the access-stratum (AS) must report one or more CAG-IDs associated with one or more available PLMNs to the NAS in response to a request from the non-access-stratum (NAS) or autonomously.

In the UE 10 operating in the SNPN access mode, the AS needs to report the available SNPN to the NAS in response to a request from the NAS or autonomously.

As described above, by using the cloud-based core network operation and management service, the microoperator serving as the local 5G operator is only required to install the base station device only, so that the burden on the micro-operator can be reduced. Moreover, by using the cloud-based CU and DU operation and management service in addition to the core network, the microoperator serving as the local 5G operator is only required to install the RU only, so that the burden on the microoperator can be further reduced. Furthermore, by densely installing inexpensive RUs (radio units) by utilizing the O-RAN (including a case where a microoperator installs RUs), the PLMN operator can advance utilization of the millimeter wave band in which a broadband frequency band can be easily secured. On the other hand, when the base station device is installed in a building or a site, trouble to negotiate with a local 5G operator (microoperator or the like) who is a right holder of the building or the site is also a problem for the PLMN operator. In order to spread the 5G and the local 5G, there is a demand for an operation form that provides economic advantages to both the PLMN operator and the local 5G operator. Therefore, an operation mode in which a base station device or RU (radio unit) installed by a microoperator for providing a local 5G service is dynamically shared by PLMN operators in accordance with a consideration is considered. Hereinafter, an embodiment related to this operation mode will be described.

[4.1. In a Case where a Different Operator from the PLMN Provides a Cloud-Based Core Network]

Figure 7:
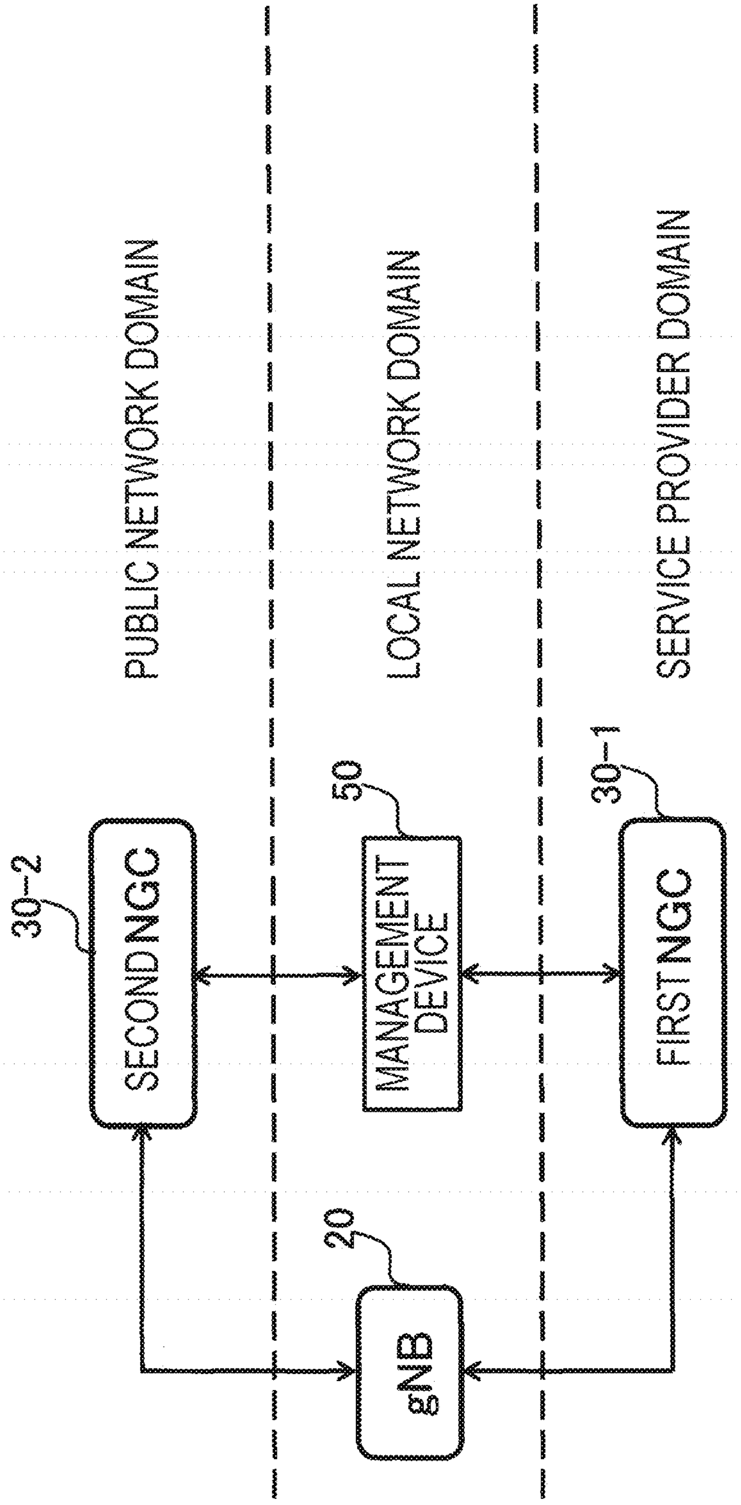
FIG. 7 is a diagram illustrating a configuration of a local 5G in a case where a service of operation and management of a cloud-based core network is provided by a business operator different from a PLMN.

FIG. 7 is a diagram illustrating a configuration of the local 5G in a case where a service of operation and management of the cloud-based core network is provided by an operator different from the PLMN. A base station device (gNB 20) installed, operated, and managed by a microoperator is connected to a cloud-based core network (first NGC 30-1) provided by a service provider as NaaS to the microoperator, and configures a first gNB (described as first gNB 20-1) that is a local 5G base station device. Here, the local network domain corresponds to an area to which a device operated and managed by a microoperator providing a local 5G service belongs. The service provider domain corresponds to an area to which a network function of a cloud-based core network provided to a PLMN operator or a microoperator as NaaS operated and managed by the service provider belongs. Here, the service provider may construct a respective independent local network for one or more microoperators in the service provider domain. Each independent local network can be assigned an independent identifier or an address without depending on another local network. The base station device (gNB 20) is connected to a core network (second NGC 30-2) operated and managed by the PLMN operator, and constitutes a second gNB (referred to as second gNB 20-2) which is a 5G base station device of the PLMN operator. That is, the base station device (gNB 20) has the functions of both the first qNB 20-1 and the second gNB 20-2. Here, the public network domain corresponds to an area to which a device/network function operated and managed by a PLMN operator that provides a public 5G service belongs. The public network is identified by a PLMN ID, which is a globally unique identifier (GUID). The management device 50 is connected to the first NGC 30-1 and the second NGC 30-2 to control a base station device (gNB 20) that operates as a local 5G base station device (first gNB 20-1) or a base station device (gNB 20) that operates as a PLMN operator's 5G base station device (second gNB 20-2). Here, a network that provides a wireless communication service other than the public wireless communication service provided to the public by the PLMN operator is collectively referred to as a non-public network. The non-public network includes, for example, a mode in which a PLMN operator provides a wireless communication service only to a specific contractor separately from a contractor of a public wireless communication service. In the wireless communication service limited to this specific contractor, for example, it is possible to provide a service of a quality different from a service provided in the public wireless communication service. Furthermore, a wireless communications service limited to a specific subscriber may include a service of the same quality as a public wireless communications service. Note that, whether the wireless communication service limited to the specific contractor is provided locally or in a wide area depends on the operation of the PLMN operator. Furthermore, the non-public network includes a local network in which a microoperator limits an area and provides a unique wireless communication service. These wireless communication services may be provided as a set of one or more network slices.

Note that the UE 10 has a subscription with at least a microoperator or a PLMN operator, and can use a local 5G service or a public 5G service.

Figure 8:
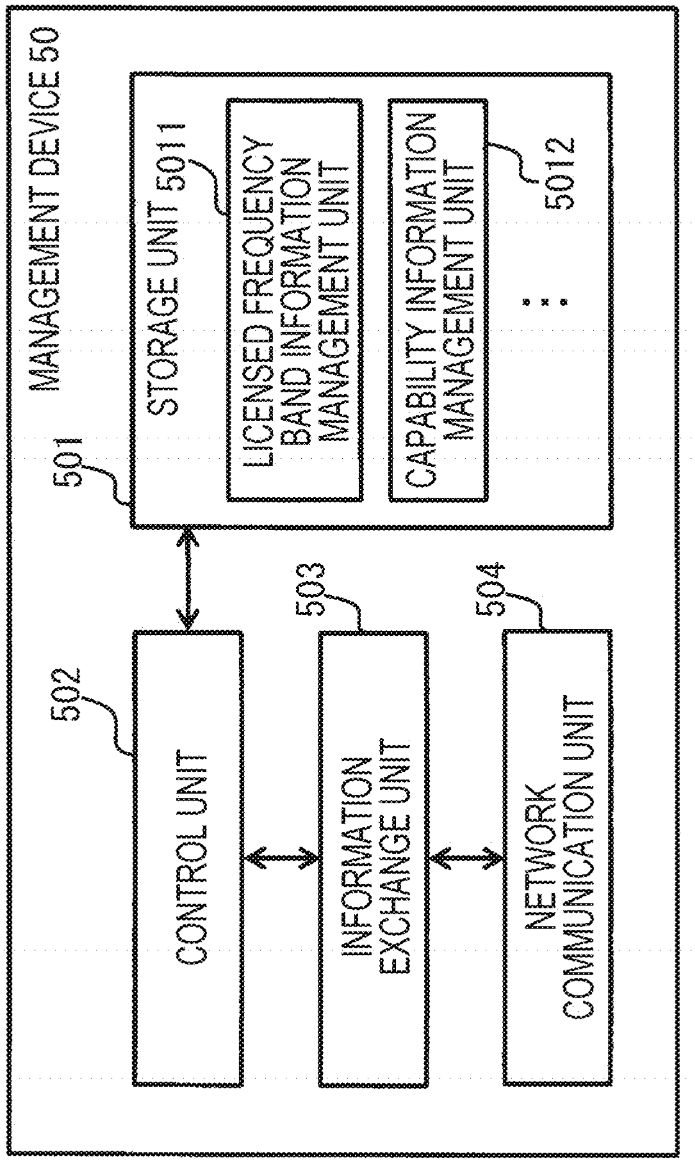
FIG. 8 is a diagram illustrating a configuration of a management device.

FIG. 8 is a diagram illustrating a configuration of the management device 50. The management device 50 includes a storage unit 501, a control unit 502, an information exchange unit 503, and a network communication unit 504.

The storage unit 501 includes, for example, a licensed frequency band information management unit 5011 and a capability information management unit 5012.

The licensed frequency band information management unit 5011 manages or stores information related to the first licensed frequency band dedicated to the local 5G allocated to the microoperator and information related to the second licensed frequency band dedicated to the 5G service allocated to the PLMN operator. Furthermore, the licensed frequency band information management unit 5011 can dynamically acquire information related to the shared frequency band permitted to be used on the basis of the information for identifying the base station device (gNB 20) or the RU 25 and the position information via the automated frequency coordination (AFC) system. Alternatively, the licensed frequency band information management unit 5011 can determine, as the AFC system, a shared frequency band permitted to be used in accordance with a request from the base station device (gNB 20), the RU 25, or the CU 23 on the basis of the information for identifying the base station device (gNB 20) or the RU 25 and the position information.

The capability information management unit 5012 manages or stores capability information of the base station device (gNB 20). The capability information of the base station device (gNB 20) is a supported release (for example, Release 15 and Release 16), a base station (BS) type, the number of transmission units, the number of reception units, a radio access technology (RAT) type (for example, EUTRA, NR) corresponding to each transmission unit or each reception unit, a duplex system, a configuration of an antenna including the number of antenna ports, and the like (for example, the number of transmission antennas and the number of reception antennas), a maximum number of multiple input multiple output (MIMO) transmission/reception layers, an RF parameter (for example, a list of supported NR operation frequency bands, a list of supported band combinations, maximum output power, and a channel band for each operation frequency band), and the like.

The control unit 502 is a controller that controls each unit of the management device 50. The control unit 502 is realized by, for example, a processor (hardware processor) such as a central processing unit (CPU), a micro-processing unit (MPU), or a graphics processing unit (GPU). For example, the control unit 502 is realized by the processor executing various programs stored in the storage device inside the management device 50 using a random access memory (RAM) or the like as a work area. Note that the control unit 502, the information exchange unit 503, and the network communication unit 504 may be realized by an integrated circuit such as an application specific integrated circuit (ASIC) or a field-programmable gate array (FPGA). Any of the CPU, the MPU, the GPU, the ASIC, and the FPGA can be regarded as a controller.

The control unit 502 controls the base station device (gNB 20) on the basis of the information related to the operation frequency band allocated to each operator managed by the licensed frequency band information management unit 5011 and the capability information of the base station device (gNB 20) managed by the capability information management unit 5012. Details of the control of the base station device (gNB 20) will be described later.

The information exchange unit 503 exchanges information with another device (for example, a first NGC 30-1 or a second NGC 30-2) via the network communication unit 504. Here, the information is data or control information.

The network communication unit 504 is a communication interface for communicating with other devices (for example, a first NGC 30-1 or a second NGC 30-2). For example, the network communication unit 504 is a LAN interface such as an NIC. The network communication unit 504 may be a wired interface or a wireless interface. Furthermore, the network communication unit 504 may perform virtual private network (VPN) connection when connecting to another device.

Figure 9:
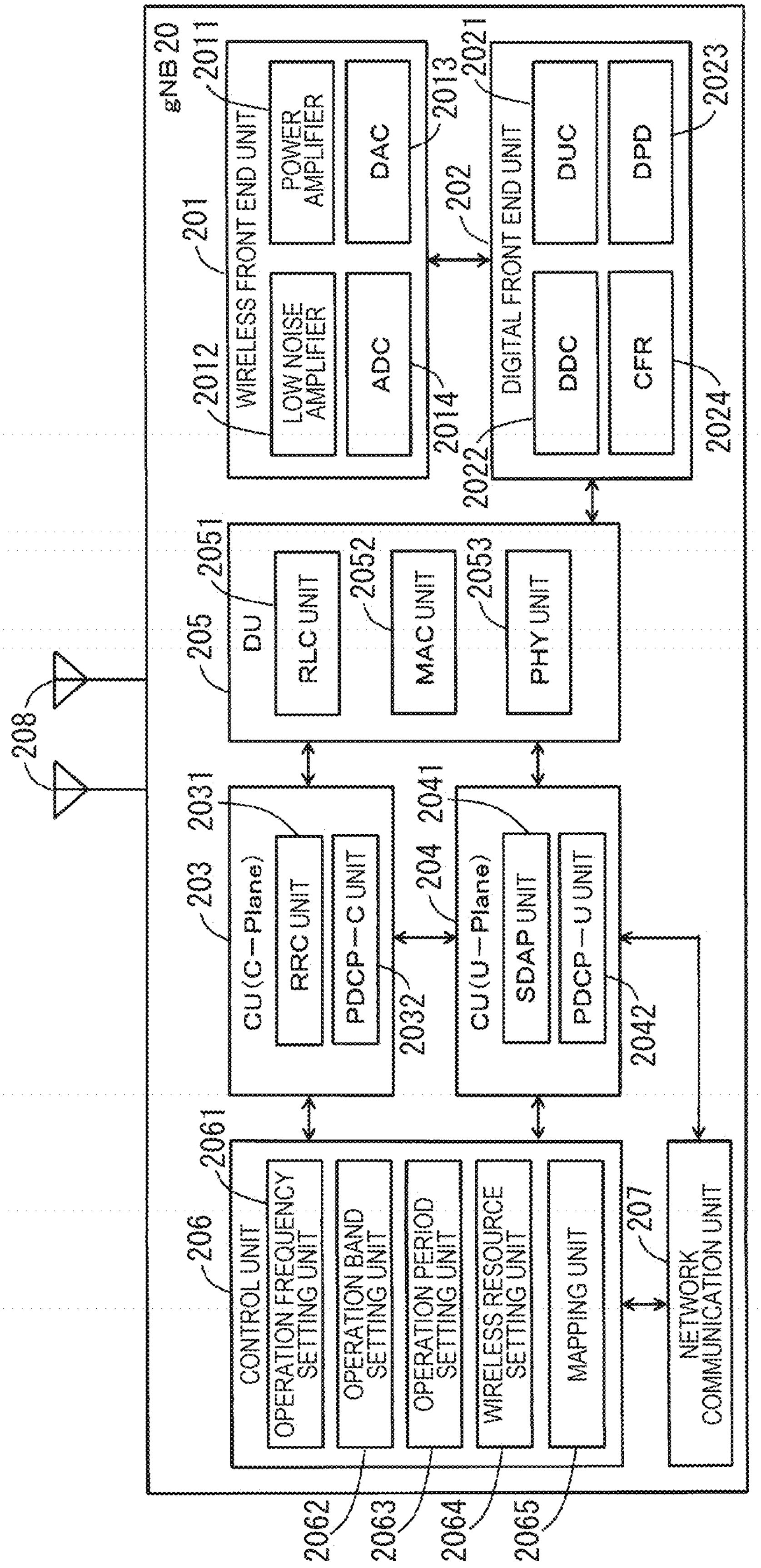
FIG. 9 is a diagram illustrating an example of a configuration of a base station device (gNB 20).

FIG. 9 is a diagram illustrating an example of a configuration of a base station device (gNB 20). The base station device (gNB 20) includes a wireless front end unit 201, a digital front end unit 202, a CU (C-Plane) 203, a CU (U-Plane) 204, a DU 205, a control unit 206, a network communication unit 207, and an antenna unit 208.

The wireless front end unit 201 includes a power amplifier 2011, a low noise amplifier 2012, a digital analog converter (DAC) 2013, and an analog digital converter (ADC) 2014. The downlink signal processed by the DAC 2013 and the power amplifier 2011 is transmitted to the wireless terminal device (UE 10) via the antenna unit 208. The uplink signal transmitted by the wireless terminal device (UE 10) and received via the antenna unit 208 is processed by a low noise amplifier 2012 and an analog digital converter (ADC) 2014.

The digital front end unit 202 includes a digital up converter (DUC) 2021, a digital down converter (DDC) 2022, a digital pre-distortion (DPD) 2023, and a crest factor reduction (CFR) 2024. The digital downlink signal input from the DU 205 is processed by the DPD 2023 and the DUC 2021 and sent to the DAC 2013. Furthermore, the digital uplink signal input from the ADC 2014 is processed by the DDC 2022 and the CFR 2024 and transmitted to the DU 205.

The DU 205 includes an RLC unit 2051 that performs processing required in the RLC sublayer, a MAC unit 2052 that performs processing required in the MAC sublayer, and a PHY unit 2053 that performs processing required in the PHY layer.

The CU (C-Plane) 203 includes an RRC unit 2031 that performs necessary processing in the RRC sublayer of the control plane and a PDCP-C unit 2032 that performs necessary processing in the PDCP sublayer of the control plane.

The CU (U-Plane) 204 includes an SDAP unit 2041 that performs necessary processing in the SDAP sublayer of the user plane and a PDCP-U unit 2042 that performs necessary processing in the PDCP sublayer of the user plane.

Hereinafter, the SDAP sublayer, the PDCP sublayer, the RRC sublayer, the RLC sublayer, the MAC sublayer, and the PHY layer will be described.

The SDAP sublayer provides a quality of service (QOS) flow to the 5GC, and processes functions or services such as mapping between the Qos flow and a data wireless bearer (data radio bearer (DRB)) and marking of a QoS flow identifier (QFI) for a downlink (DL) packet and an uplink (UL) packet.

The PDCP sublayer provides a wireless bearer to the SDAP, and processes functions or services such as transfer of user plane data or control plane data, management of PDCP sequence numbers (SNs), ciphering and deciphering, integrity protection and integrity verification, discarding of a service data unit (SDU) based on a timer, routing of a split bearer, duplication of data, and duplicate discarding.

The RRC sublayer processes a broadcast of system information related to access stratum (AS) and non-access stratum (NAS), paging activated by 5GC or NG-RAN, establishment, maintenance, or release of an RRC connection between UE and NG-RAN, a security function including management of key information, a function of mobility including establishment, configuration, maintenance, or release of signalling radio bearers (SRBs) and data radio bearers (DRBs), handover and transfer of context, UE cell selection, reselection, and control of cell selection and reselection, a QOS management function, UE measurement reporting, and control of the reporting, and detection and recovery of radio link failure (RLF), and functions or services such as NAS message transfer. Here, the RRC connection includes functions or services of adding, changing, or releasing Carrier Aggregation, and adding, changing, or releasing Dual Connectivity.

The RLC sublayer provides an RLC channel to the PDCP, and processes functions or services such as transfer of a protocol data unit (PDU) of an upper layer, assignment of independent sequence numbers to the PDCP of an unacknowledged mode (UM) and an acknowledged mode (AM), error correction through an automatic repeat request (ARQ) in AM, segmentation of the RLC SDU in UM and AM, re-segmentation in AM, UM and reassembly of the SDU in AM, detection of data replication in AM, UM, discarding of the SDU in AM, RLC reconstruction, and protocol error detection in AM.

The MAC sublayer provides logical channels to the RLC and handles functions or services such as mapping of logical channels and transport channels, error correction via hybrid ARQ (HARQ), control of priorities among UEs by dynamic scheduling, control of priorities among UEs by prioritization of logical channels, control of priorities among resources which overlap within a UE, etc.

The PHY layer provides transport channels for the MAC and handles functions or services such as cyclic redundancy check (CRC) and indication of transport block errors, forward error correction (FEC) and rate matching, data modulation, mapping to physical resources, multi-antenna processing, L1 control and support for HARQ related signaling.

The control unit 206 is a controller that controls each unit of the gNB 20. The control unit 206 is realized by, for example, a processor (hardware processor) such as a central processing unit (CPU), a micro-processing unit (MPU), or a graphics processing unit (GPU). For example, the control unit 206 is realized by the processor executing various programs stored in the storage device inside the management device 50 using a random access memory (RAM) or the like as a work area. Note that the control unit 206, the wireless front end unit 201, the digital front end unit 202, the CU (C-Plane) 203, the CU (U-Plane) 204 DU 205, and the network communication unit 207 may be realized by an integrated circuit such as an application specific integrated circuit (ASIC) or a field-programmable gate array (FPGA). Any of the CPU, the MPU, the GPU, the ASIC, and the FPGA can be regarded as a controller.

The control unit 206 includes an operation frequency setting unit 2061, an operation band setting unit 2062, an operation period setting unit 2063, a wireless resource setting unit 2064, and a mapping unit 2065.

The operation frequency setting unit 2061 sets the operation frequency, that is, the frequency band (licensed frequency band, shared frequency band, and the like to be described later) of the base station device (gNB 20) according to the instruction of the management device 50. Details of the setting of the operation frequency (frequency band) will be described later.

The operation band setting unit 2062 sets an operation band (a channel band or the like included in a licensed frequency band or a shared frequency band to be described later) of the base station device (gNB 20) according to an instruction of the management device 50. Details of the setting of the operation band will be described later.

The operation period setting unit 2063 sets an operation period (a time interval or the like in a licensed frequency band or a shared frequency band to be described later) of the base station device (gNB 20) according to an instruction of the management device 50. Details of the setting of the operation period will be described later.

The wireless resource setting unit 2064 sets allocation of wireless resources (for example, set in units of resource elements or resource blocks to be described later) of the base station device (gNB 20) according to the instruction of the management device 50. Details of the setting of the allocation of the wireless resources will be described later.

Each of the operation frequency (frequency band), the operation band, the operation period, and the wireless resource described above is an example of a resource for communication. A resource for the base station device (gNB 20) or the RU (radio unit) to perform, for example, the first communication for the local 5G (for example, transmit and receive the traffic for the non-public network) corresponds to the first resource as an example. A resource by which the base station device (gNB 20) or the RU (radio unit) performs the second communication for the public network of the PLMN (for example, transmits and receives the traffic for the public network) corresponds to the second resource as an example.

The mapping unit 2065 maps data transmitted and received via the first NGC 30-1 or data transmitted and received via the second NGC 30-2 to an appropriate operation frequency (frequency band or the like), band (channel band or the like), time interval, wireless resource, or the like. Here, the data transmitted and received via the first NGC 30-1 and the data transmitted and received via the second NGC 30-2 are distinguished by, for example, a difference in an identifier or an address allocated to a transport network layer (TNL), a core network (CN) tunnel info, a GPRS tunneling protocol (GTP)-tunnel endpoint identifier (TEID), or a protocol data unit (PDU) session. Here, CN Tunnel Info includes a TEID and an IP address used by the UPF 330 for N3 Tunnel for PDU session.

The mapping unit 2065 acquires information regarding an address regarding a transport layer between the base station device (gNB 20) and the first NGC 30-1 or the second NGC 30-2 via a next generation application protocol (NGAP) message.

The network communication unit 207 is a communication interface for communicating with a node positioned at a high level on the network (for example, a first NGC 30-1 or a second NGC 30-2). For example, the network communication unit 207 is a LAN interface such as an NIC. The network communication unit 207 can construct a backhaul compliant with an NG interface via an optical fiber or Ethernet. The network communication unit 207 constructs a first GPRS tunneling protocol for user plane (GTP-U) for the base station device (the first gNB 20-1) of the local 5G with the UPF 330-1 of the first NGC 30-1. The network communication unit 207 constructs a second GTP-U for the PLMN operator's 5G base station device (the second gNB 20-2) with the UPF 330-2 of the second NGC 30-2. The network communication unit 207 may be a wired interface or a wireless interface. Furthermore, the network communication unit 207 may perform VPN connection when connecting to another device.

Figure 10:
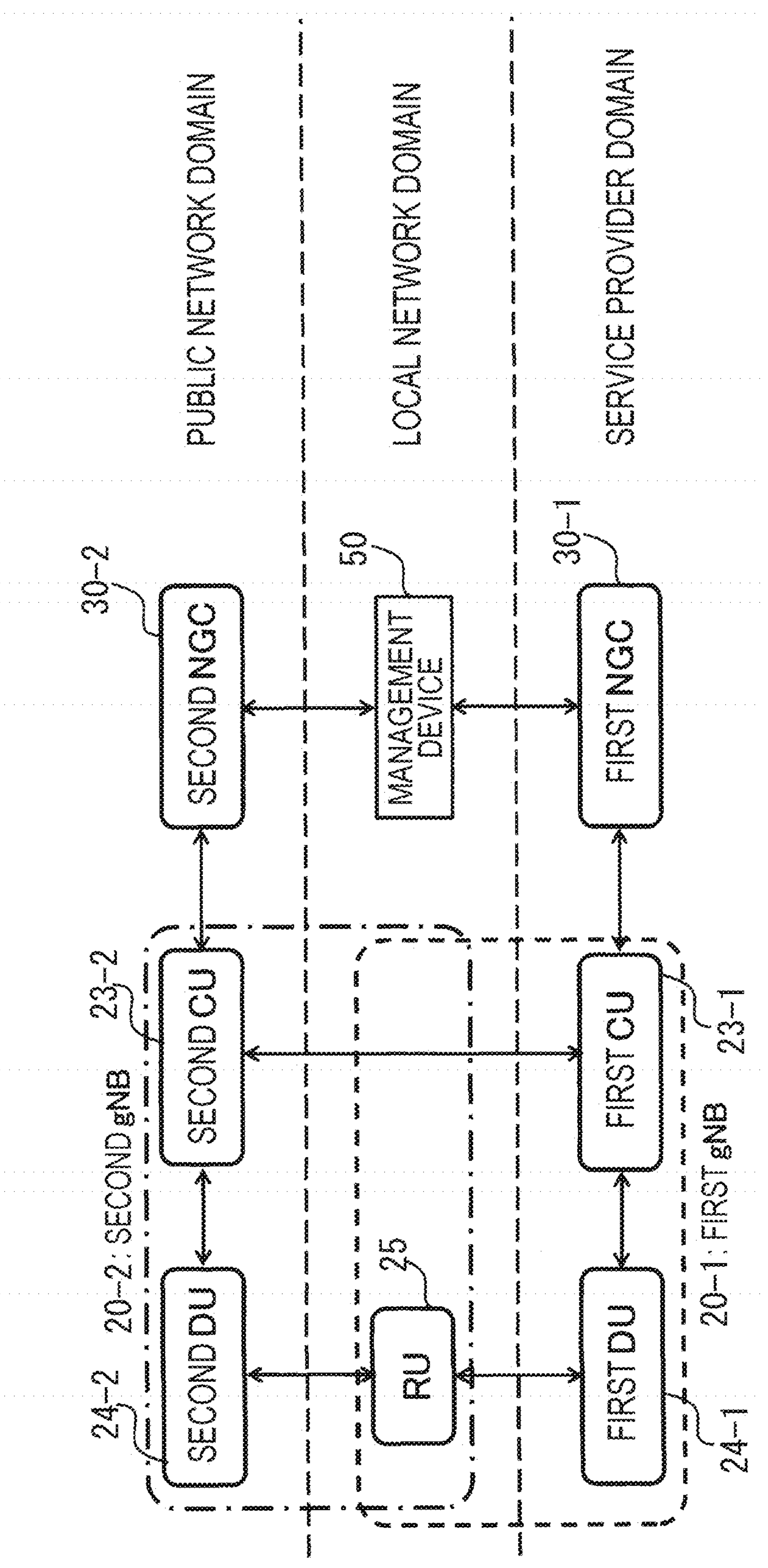
FIG. 10 is a diagram illustrating a configuration of a local 5G in a case where a business operator different from the PLMN provides operation and management services of a cloud-based core network, a central unit (CU), and a distributed unit (DU).

FIG. 10 is a diagram illustrating a configuration of the local 5G in a case where an operator different from the PLMN provides the operation and management services of the CU and the DU in addition to the cloud-based core network. The RU 25 installed, operated, and managed by the microoperator is connected to a cloud-based core network (the first NGC 30-1) provided by a service provider as NaaS to the microoperator, the first CU 23-1, and the first DU 24-1, thereby configuring the first gNB 20-1 that is a local 5G base station device.

Here, the local network domain corresponds to an area to which the device/network function operated and managed by the microoperator providing the local 5G service belongs. The service provider domain corresponds to an area to which functions of the cloud-based core network, the CU, and the DU provided as NaaS by the service provider to the PLMN operator and the microoperator belong, and the functions are operated and managed by the service provider. For example, the microoperator can assign unique addresses and identifiers only in the local network domain to devices and network functions belonging to the local network domain. The service provider may assign unique addresses and identifiers only within the service provider domain for device network functions belonging to the service provider domain. Furthermore, the service provider can assign unique addresses and identifiers only in the local network domain to the device/network functions belonging to the service provider domain according to a request from the microoperator.

The RU 25 is connected to a core network (the second NGC 30-2) operated and managed by the PLMN operator, the second CU 23-2, and the second DU 24-2, thereby configuring the second gNB 20-2 that is a 5G base station device of the PLMN operator. Here, the public network domain corresponds to a device operated and managed by a PLMN operator providing a public 5G service and an area to which a network function belongs. For example, the PLMN operator may assign a unique address or identifier only in the public network domain to the device network function belonging to the public network domain.

The management device 50 is connected to the first NGC 30-1 and controls the RU 25 that operates as a part of the local 5G base station device (the first gNB 20-1). Alternatively, management device 50 controls RU 25, which is connected with second NGC 30-2 and operates as part of the PLMN operator's 5G base station device (second gNB 20-2).

Furthermore, the management device 50 instructs the first CU 23-1 to set an information exchange unit (not illustrated herein) for exchanging information with the second CU 23-2.

Here, the capability information management unit 5012 of the management device 50 manages the capability information of the RU 25. The capability information of the RU 25 is a supported release (for example, Release 15 and Release 16), a BS type, the number of transmission units, the number of reception units, a radio access technology (RAT) type (for example, EUTRA, NR) corresponding to each transmission unit or each reception unit, a duplex system, a configuration of an antenna including the number of antenna ports (for example, the number of transmission antennas and the number of reception antennas), a maximum number of MIMO transmission/reception layers, an RF parameter (for example, a list of supported NR operation frequency bands, a list of supported band combinations, maximum output power, and a channel band for each operation frequency band), and the like.

The control unit 502 controls the RU 25 on the basis of the information related to the operable frequency band allocated to each operator managed by the licensed frequency band information management unit 5011 and the capability information of the RU 25 managed by the capability information management unit 5012. As an example, the control unit 502 controls to perform the first communication between the first DU 24-1 (first distributed unit) connected to the RU 25 (radio unit) belonging to the local network domain and the UE 10 (terminal device). In addition, as an example, the control unit 502 controls to connect the RU 25 (radio unit) belonging to the local network domain to the second DU 24-2 (second distributed unit) belonging to the public network domain, and perform the second communication between the second DU 24-2 (second distributed unit) and the UE 10 (terminal device) or another UE (another terminal device). The control unit 502 performs control such that the first communication is performed by using the first resource and the second communication is performed by using the second resource. For example, the control unit 502 performs control so that the first frequency band is used as the first resource and the second frequency band is used as the second resource. Alternatively, the control unit 502 performs control so that the first time interval of the first frequency band is used as the first resource and the second time interval of the first frequency band is used as the second resource. Alternatively, the control unit 502 performs control so that a first channel band of a first frequency band is used as the first resource and a second channel band of the first frequency band is used as the second resource. Details of the control of the RU 25 by the control unit 502 will be described later.

Figure 11:
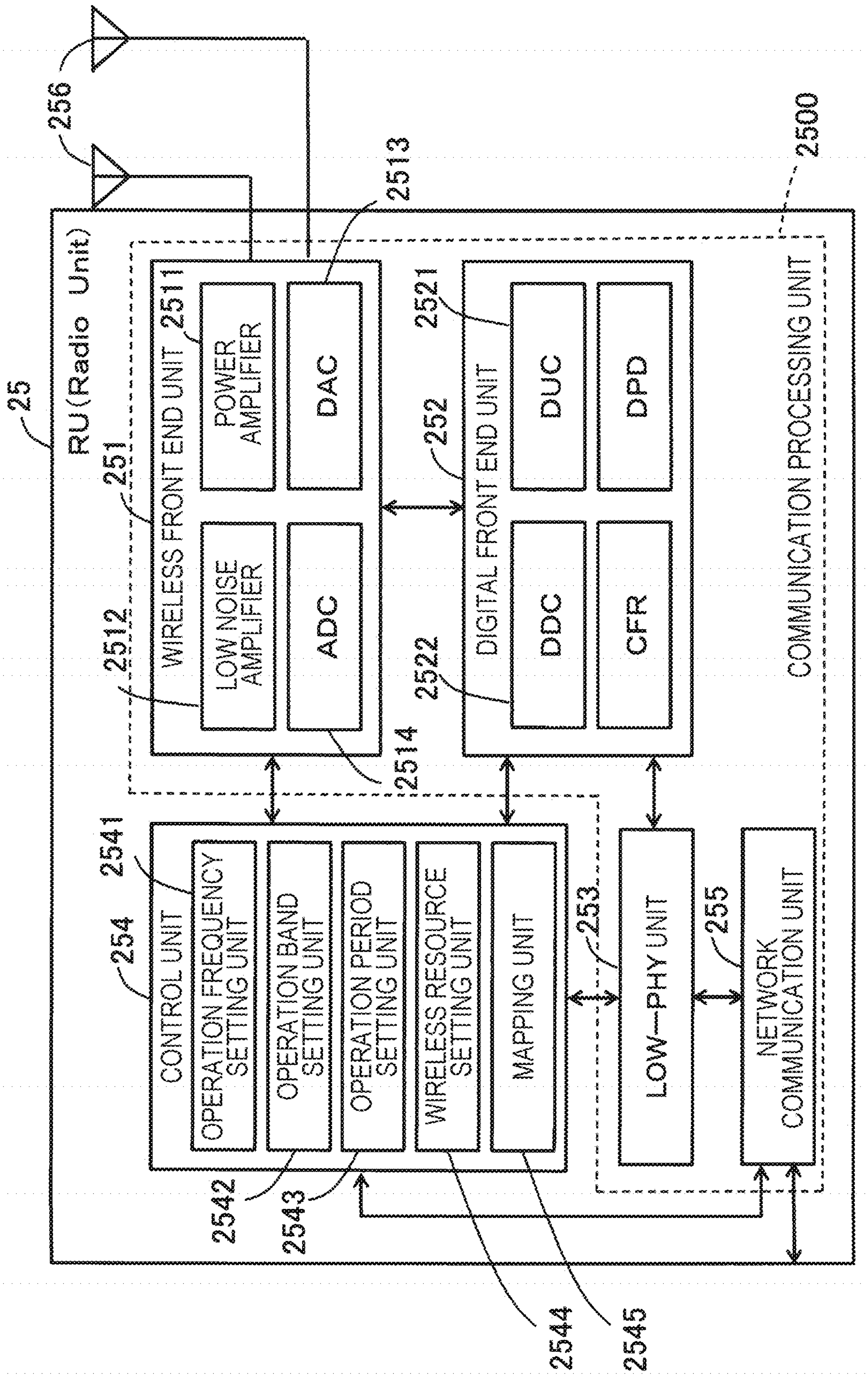
FIG. 11 is a diagram illustrating an example of a configuration of an RU 25 as a radio unit.

FIG. 11 is a diagram illustrating an example of a configuration of the RU 25. The RU 25 includes a wireless front end unit 251, a digital front end unit 252, a LOW-PHY unit 253, a control unit 254, a network communication unit 255, and an antenna unit 256. The wireless front end unit 251, the digital front end unit 252, the LOW-PHY unit 253, and the network communication unit 255 constitute a communication processing unit 250.

An overview of the RU 25 is described. Among the functions constituting the base station device (gNB 20) illustrated in FIG. 9, functions such as a CU (C-Plane) 203, a CU (U-Plane) 204, and a DU 205 can be virtualized or configured as a container on a cloud in a service based manner. However, it is currently difficult to configure all the functions of the base station device (gNB 20) on the cloud, and at least a configuration of an RU including a wireless front end unit (wireless front end unit 251 in FIG. 11) that processes the RF unit is required. As described above, in the 4G, for the purpose of reducing the installation cost of the base station, the configuration in which the RF unit is divided into the RRH that processes the RF unit and the BBU that processes the other L1/L2/L3 functions is defined on the basis of the Option 8, but in the 5G in which a higher transmission speed is required, relaxation of the transmission speed required for the fronthaul is required. Therefore, as an example, by dividing the PHY unit 2053 (see FIG. 9) that processes the L1 function on the basis of the Option 7 and mounting the LOW-PHY unit 253 (see FIG. 11) on the RU side, it is possible to relax the transmission rate required for the fronthaul. That is, the configuration of the RU enables installation of a dynamic and flexible base station, which is an effect of the cloud and the service-based architecture, and an effect of reducing the installation cost of the base station can be expected.

The wireless front end unit 251 includes a power amplifier 2511, a low noise amplifier 2512, a digital analog converter (DAC) 2513, and an analog digital converter (ADC) 2514. The downlink signal processed by the DAC 2513 and the power amplifier 2511 is transmitted to the wireless terminal device (UE 10) via the antenna unit 256. An uplink signal received from the wireless terminal device (UE10) via the antenna unit 256 is processed by a low noise amplifier 2512 and an analog digital converter (ADC) 2514.

The digital front end unit 252 includes a digital up converter (DUC) 2521, a digital down converter (DDC) 2522, a digital pre-distortion (DPD) 2523, and a crest factor reduction (CFR) 2524.

The LOW-PHY unit 253 is implemented as a field programmable gate array (FPGA) or an application specific integrated circuit (ASIC), and performs necessary signal processing such as fast Fourier transform, inverse fast Fourier transform, addition or removal of a cyclic prefix (CP), physical random access channel (PRACH) filtering, or digital beam forming.

The control unit 254 is a controller that controls each unit of the UR25. The control unit 254 is realized by, for example, a processor (hardware processor) such as a central processing unit (CPU), a micro-processing unit (MPU), or a graphics processing unit (GPU). For example, the control unit 254 is implemented by a processor executing various programs stored in a storage device inside the RU 25 using a random access memory (RAM) or the like as a work area. Note that the control unit 254, the wireless front end unit 251, the digital front end unit 252, the LOW-PHY unit 253, and the network communication unit 255 may be realized by an integrated circuit such as an application specific integrated circuit (ASIC) or a field-programmable gate array (FPGA). Any of the CPU, the MPU, the GPU, the ASIC, and the FPGA can be regarded as a controller.

The control unit 254 includes an operation frequency setting unit 2541, an operation band setting unit 2542, an operation period setting unit 2543, a wireless resource setting unit 2544, and a mapping unit 2545.

The operation frequency setting unit 2541 sets an operation frequency of the RU 25, that is, a frequency band (licensed frequency band, shared frequency band, and the like to be described later) in accordance with an instruction from the management device 50. Details of the setting of the operation frequency (frequency band) will be described later.

The operation band setting unit 2542 sets an operation band of the RU 25 (such as a channel band included in a licensed frequency band or a shared frequency band to be described later) in accordance with an instruction from the management device 50. Details of the setting of the operation band will be described later.

The operation period setting unit 2543 sets an operation period of the RU 25 (such as a time interval in a licensed frequency band or a shared frequency band to be described later) in accordance with an instruction from the management device 50. Details of the setting of the operation period will be described later.

The wireless resource setting unit 2544 sets allocation of wireless resources (for example, set in units of resource elements or resource blocks to be described later) of the RU 25 according to an instruction of the management device 50. Details of setting the allocation of the wireless resources will be described later.

Each of the operation frequency (frequency band), the operation band, the operation period, and the wireless resource described above is an example of a resource for communication. A resource for the base station device (gNB 20) or the RU (radio unit) to perform, for example, the first communication for the local 5G (for example, transmit and receive the traffic for the non-public network) corresponds to the first resource as an example. A resource by which the base station device (gNB 20) or the RU (radio unit) performs the second communication for the public network of the PLMN (for example, transmits and receives the traffic for the public network) corresponds to the second resource as an example.

The mapping unit 2545 maps data transmitted and received via the first DU 24-1 or data transmitted and received via the second DU 24-2 to an appropriate frequency band, band, time interval, wireless resource, or the like. Here, the data transmitted and received via the first DU 24-1 and the data transmitted and received via the second DU 24-2 are distinguished from each other by, for example, an identifier allocated to a wireless bearer, a TNL, or a protocol data unit (PDU) session, or a difference in an address.

The mapping unit 2545 acquires information of an address related to a transport layer between the RU 25 and the first DU 24-1 or the second DU 24-2 via a next generation application protocol (NGAP) message.

The network communication unit 255 is a communication interface for communicating with a node positioned at a high level on the network (for example, the first DU 24-1 or the second DU 24-2). For example, the network communication unit 255 is a LAN interface such as an NIC. The network communication unit 255 can construct a fronthaul compliant with evolved common public radio interface (eCPRI) via an optical fiber or Ethernet. The network communication unit 255 constructs a first fronthaul for the base station device (the first gNB 20-1) of the local 5G with the first DU 24-1. The network communication unit 255 constructs a second fronthaul for the PLMN operator's 5G base station device (the second gNB 20-2) with the second DU 24-2. The network communication unit 255 may be a wired interface or a wireless interface. Furthermore, the network communication unit 255 may perform VPN connection when connecting to another device.

The communication processing unit 250 processes communication related to the RU 25 (radio unit) belonging to the local network domain by using the wireless front end unit 251, the digital front end unit 252, the LOW-PHY unit 253, and the network communication unit 255 under the control of the control unit 254. As an example, the communication processing unit 250 is connected to the first DU 24-1 (first distributed unit), and performs the first communication between the first DU 24-1 and the UE 10 (terminal device). In addition, the communication processing unit 250 is connected to the second DU 24-2 (second distributed unit) belonging to the public network domain, and performs the second communication between the second DU 24-2 and the UE 10 (terminal device) or another UE (another terminal device). The communication processing unit 250 transmits and receives traffic for a non-public network in the first communication, and transmits and receives traffic for the public network in the second communication. The communication processing unit 250 performs communication using a band allocated to a non-public network (for example, a first licensed frequency band) in the first communication, and performs communication using a band allocated to a public network (for example, a second licensed frequency band) in the second communication. The communication processing unit 250 performs first communication using the first resource and performs second communication using the second resource. For example, the communication processing unit 250 uses the first frequency band as the first resource and the second frequency band as the second resource. Alternatively, the communication processing unit 250 uses the first time interval of the first frequency band as the first resource, and uses the second time interval of the first frequency band as the second resource. Alternatively, the communication processing unit 250 uses a first channel band included in the first frequency band as the first resource and uses a second channel band included in the first frequency band as the second resource. At least one of the first resource and the second resource may be selected based on information regarding the frequency band in which the RU 25 can operate and identification information (for example, a SNPN ID and a PLMN ID. Details will be described later) identifying a network of a microoperator or a PLMN operator. Details of the processing described in this paragraph will be described later.

Note that, although FIG. 11 illustrates an example in which the LOW-PHY unit 253 is mounted on the RU, the configuration of the RU 25 is not limited thereto. For example, the PHY unit 2053 (see FIG. 9) may be mounted on the RU. Alternatively, the MAC unit 2052 (see FIG. 9) that processes the MAC sublayer may be divided to extract the LOW-MAC unit, and the PHY unit 2053 and the LOW-MAC unit may be mounted in the RU. Alternatively, the PHY unit 2053 and the MAC unit 2052 may be mounted on the RU. Alternatively, the RLC unit 2051 that processes the RLC sublayer may be divided to extract the LOW-RLC unit, and the PHY unit 2053, the MAC unit 2052, and the LOW-RLC unit may be mounted on the RU.

Furthermore, these different configurations may be set in the RU 25 in the form of a functional unit virtualized dynamically and re-configurable or a container according to an instruction of the management device 50. For example, the management device 50 sets one of different configurations of this RU according to the load of the traffic of the fronthaul. Moreover, functions or services constituting each sublayer may be selectively set. For example, each function or service is identified by an identifier, and notification is made between network devices (for example, the gNB 20, the RU 25, the DU 24, the CU 23, the NGC 30, and the management device 50) by using an information element (IE) of an NGAP message including these identifiers. In a case where the RU 25 operates as part of the local 5G base station device (the first gNB 20-1) and as part of the PLMN operator's 5G base station device (the second gNB 20-2), the management device 50 may selectively configure a function or service that configures each sublayer of the RU 25 for each of the first gNB 20-1 and the second gNB 20-2.

Furthermore, functions or services constituting each sublayer may be selectively configured for each UE. Moreover, a function or a service configuring each sublayer selectively configured for each UE is selected according to an application or a network slice, and is notified to each UE using the IE of the NAS message.

In order to set the above-described respective different configurations in the RU 25 in the form of a functional unit virtualized dynamically and re-configurable or a container, the RU 25 may include a processing unit in which a virtualized function or a container is implemented, an acquisition unit that acquires the function implemented in the processing unit or an identifier for identifying the container from another device, and a specification unit that specifies the function or the container on the basis of the identifier, and the function or the container specified by the specification unit may be implemented in the processing unit. As an example, the processing unit, the acquisition unit, and the specification unit may be realized by causing a processor such as a central processing unit (CPU) to execute a program, or may be realized by an application specific integrated circuit (ASIC) or the like. The function implemented in the processing unit or the container is, as an example, any of a part or all functions of a PHY layer, a part or all functions of a MAC sublayer, or a part or all functions of an RLC sublayer. The acquisition unit may acquire a first identifier related to the first communication and a second identifier related to the second communication, implement a first function or a first container specified by the specification unit on the basis of the first identifier in the processing unit, and implement a second function or a second container specified by the specification unit on the basis of the second identifier in the processing unit.

[4.1.1. Setting of Operation Frequency]

First, as a precondition, a first licensed frequency band dedicated to the local 5G is allocated to the microoperator, and a second licensed frequency band dedicated to the 5G service of the PLMN is allocated to the PLMN operator. Furthermore, the wireless front end unit 201 of the base station device (gNB 20) illustrated in FIG. 9 or the wireless front end unit 251 of the RU 25 illustrated in FIG. 11 is equipped with hardware for operating in the first licensed frequency band and the second licensed frequency band. Here, the management device 50 manages, as the capability information of the base station device (gNB 20) or the RU 25, the number of transmission units, the number of reception units, the RAT type corresponding to each transmission unit or each reception unit, the duplex method, the configuration of the antenna including the number of antenna ports, the RF parameter (for example, a list of supported NR operation frequency bands, a list of supported band combinations, maximum output power, and a channel band for each operation frequency band), and the like.

The control unit 502 of the management device 50 specifies the first licensed frequency band allocated as dedicated to the local 5G of the microoperator on the basis of the licensed frequency band information managed by the licensed frequency band information management unit 5011. Moreover, the control unit 502 of the management device 50 confirms that the wireless front end unit 201 of the base station device (gNB 20) supports the operation in the first licensed frequency band on the basis of the capability information managed by the capability information management unit 5012.

The management device 50 instructs the operation frequency setting unit 2061 of the base station device (gNB 20) to set the first licensed frequency band via the core network (first NGC 30-1) of the local 5G base station device (first gNB 20-1). The base station device (gNB 20) starts operation in the first licensed frequency band as a base station device (first gNB 20-1) of local 5G.

Subsequently, the information exchange unit 503 of the management device 50 receives, from the core network (the second NGC 30-2) operated and managed by the PLMN operator, a message requesting operation of the base station device (gNB 20) as the 5G base station device (the second gNB 20-2) of the PLMN operator. This message includes, for example, a PLMN ID for identifying a PLMN operator.

The control unit 502 of the management device 50 specifies the second licensed frequency band allocated only for the 5G service of the PLMN on the basis of the PLMN ID and the licensed frequency band information managed by licensed frequency band information management unit 5011. Moreover, the control unit 502 of the management device 50 confirms that the wireless front end unit 201 of the base station device (gNB 20) supports the operation in the second licensed frequency band on the basis of the capability information managed by the capability information management unit 5012. The information exchange unit 503 of the management device 50 returns, to the second NGC 30-2, a response indicating that a request for operating the base station device (gNB 20) as the 5G base station device (second gNB 20-2) of the PLMN operator is accepted. On the other hand, in a case where the wireless front end unit 201 of the base station device (gNB 20) does not support the operation in the second licensed frequency band, the information exchange unit 503 of the management device 50 returns a response indicating rejection of the request to the second NGC 30-2. Note that, in a case where a plurality of frequency bands is allocated as the second licensed frequency band, the PLMN operator may include information regarding priorities of the plurality of frequency bands in the message described above. The control unit 502 of the management device 50 confirms that the wireless front end unit 201 of the base station device (gNB 20) supports an operation in a frequency band with a higher priority among a plurality of frequency bands on the basis of the information regarding the priority and the capability information managed by the capability information management unit 5012.

The second NGC 30-2 that has received the response indicating that the request for operating the base station device (gNB 20) as the PLMN operator's 5G base station device (second gNB 20-2) is accepted provides the management device 50 with information regarding the connection destination (for example, the UPF 330) of the second NGC 30-2. Here, the information regarding the connection destination is, for example, an IP address and a UDP port number, a transport network layer (TNL) address such as a TCP port number, a MAC address, an access point name (APN), a data network name (DNN), or the like. The management device 50 that has received the information related to the connection destination constructs a GPRS tunneling protocol for user plane (GTP-U) between the base station device (gNB 20) and the UPF 330-2 of the second NGC 30-2, for example.

Alternatively, the information exchange unit 503 of the management device 50 may include the information related to the connection destination of the base station device (gNB 20) in the response indicating that the request for operating the base station device (gNB 20) as the 5G base station device (second gNB 20-2) of the PLMN operator is accepted. The second NGC 30-2 that has received the information related to the connection destination constructs a GTP-U between the UPF 330-2 and the base station device (gNB 20), for example.

The management device 50 instructs the operation frequency setting unit 2061 to set the second licensed frequency band via the core network (first NGC 30-1) of the base station device (first gNB 20-1) of the local 5G. The operation frequency setting unit 2061 sets the second licensed frequency band as the operation frequency band of the base station device (gNB 20), and the base station device (gNB 20) starts the operation in the second licensed frequency band as the 5G base station device (second gNB 20-1) of the PLMN operator in addition to the operation in the first licensed frequency band as the base station device (first gNB 20-2) of the local 5G. Note that the base station device (gNB 20) is not allowed to operate in the second licensed frequency band as the base station device (first gNB 20-1) of the local 5G. Here, the base station device (gNB 20) operating as the local 5G base station device (first gNB 20-1) means broadcasting identification information for identifying the microoperator's network, for example, system information including the SNPN ID, and the base station device (gNB 20) operating as the PLMN operator's 5G base station device (second gNB 20-2) means broadcasting identification information for identifying the PLMN operator's network, for example, system information including the PLMN ID.

Note that the above-described message requesting the base station device (gNB 20) to operate as the 5G base station device (second gNB 20-2) of the PLMN operator may include information regarding the second licensed frequency band permitted to be used in advance. The control unit 502 of the management device 50 may determine whether to accept the request or reject the request on the basis of the information related to the second licensed frequency band included in the message and the capability information managed by the capability information management unit 5012. Here, the information related to the second licensed frequency band may be information related to one frequency band or information related to a plurality of frequency bands.

Furthermore, the core network (first NGC 30-1) of the base station device (first gNB 20-1) of the local 5G may receive the above-described message including the information related to the second licensed frequency band permitted to be used in advance from the core network (second NGC 30-2) operated and managed by the PLMN operator, and determine to accept or reject the request on the basis of the capability information of the base station device (gNB 20) managed by the first NGC 30-1. As in the modification of this embodiment, since the function of the management device 50 can be processed by another device, the management device 50 is not necessarily an essential entity.

The mapping unit 2065 of the base station device (gNB 20) performs mapping such that data transmitted and received via the first NGC 30-1 is transmitted and received using the first licensed frequency band. Furthermore, the mapping unit 2065 of the base station device (gNB 20) performs mapping such that data transmitted and received via the second NGC 30-2 is transmitted and received using the second licensed frequency band. That is, the mapping unit 2065 performs mapping between the TNL, the GTP-TEID, or the PDU session and the frequency band.

Note that in a case where the PLMN operator receives a request for using a specific network slice from the UE 10, the PLMN operator may transmit, from the second NGC 30-2 to the management device 50, a message requesting the base station device (gNB 20) to operate as the 5G base station device (second gNB 20-2) of the PLMN operator. Here, single network slice selection assistance information (S-NSSAI), which is information for assisting selection of a network slice, is allocated to each network slice, and the network slice can be identified by the S-NSSAI. The S-NSSAI is configured as a set of mandatory slice/service type (SST) including 8 bits for identifying a slice type and optional slice differentiator (SD) including 24 bits for distinguishing different slices in the same SST.

Furthermore, the management device 50 may disclose a list of network slices (list including one or more pieces of S-NSSAI) that can be supported by the base station device (gNB 20) to the second NGC 30-2. Moreover, the management device 50 may disclose information regarding the communication quality of the base station device (gNB 20), for example, parameters and load information regarding quality of service (QOS) such as a guaranteed flow bit rate (GFBR), a maximum flow bit rate (MFBR), a packet delay budget (PDB), and a packet error rate (PER) to the second NGC 30-2. Furthermore, the management device 50 may disclose information related to the installation position of the base station device (gNB 20) to the second NGC 30-2. The second NGC 30-2 can determine whether to send a message to the management device 50 requesting the base station device (gNB 20) to operate as a PLMN operator's 5G base station device (second gNB 20-2) on the basis of at least one of a published list of available network slices, information regarding communication quality, or information regarding an installation position.

From the above, the base station device (gNB 20) can operate in the first licensed frequency band as the local 5G base station device (first gNB 20-1) and operate in the second licensed frequency band as the PLMN operator's 5G base station device (second gNB 20-2).

Furthermore, the control unit 502 of the management device 50 confirms that the wireless front end unit 251 of the RU 25 supports the operation in the first licensed frequency band on the basis of the capability information managed by the capability information management unit 5012 of the management device 50.

The management device 50 instructs the operation frequency setting unit 2541 of the RU 25 to set the first licensed frequency band via the core network (the first NGC 30-1) of the base station device (the first gNB 20-1) of the local 5G. The RU 25 begins operating in the first licensed frequency band as part of the local 5G base station device (first gNB 20-1).

Subsequently, the information exchange unit 503 of the management device 50 receives a message from the core network (the second NGC 30-2) operated and managed by the PLMN operator, requesting that the RU 25 be operated as a part of the 5G base station device (the second gNB 20-2) of the PLMN operator. This message includes, for example, a PLMN ID for identifying a PLMN operator.

The control unit 502 of management device 50 specifies the second licensed frequency band allocated only for the 5G service of the PLMN on the basis of the PLMN ID and the licensed frequency band information managed by licensed frequency band information management unit 5011 of management device 50. Moreover, the control unit 502 of the management device 50 confirms that the wireless front end unit 251 of the RU 25 supports operation in the second licensed frequency band on the basis of the capability information managed by the capability information management unit 5012. After the confirmation, the information exchange unit 503 of the management device 50 returns to the second NGC 30-2 a response indicating that it accepts a request to operate the RU 25 as part of the PLMN operator's 5G base station device (the second gNB 20-2). On the other hand, in a case where the wireless front end unit 251 of the RU 25 does not support operation in the second licensed frequency band, the information exchange unit 503 of the management device 50 returns a response indicating rejection of the request to the second NGC 30-2. Note that, in a case where a plurality of frequency bands is allocated as the second licensed frequency band, the PLMN operator may include information regarding priorities of the plurality of frequency bands in the message described above. On the basis of the information regarding the priority and the capability information managed by the capability information management unit 5012, the control unit 502 of the management device 50 confirms that the wireless front end unit 251 of the RU 25 supports operation in a frequency band with a higher priority among a plurality of frequency bands.

The information regarding the priorities of the plurality of frequency bands may be dynamically changed by the PLMN operator due to load, interference, or the like of the frequency bands.

Upon receiving the response indicating that the request for operating the RU 25 as a part of the PLMN operator's 5G base station device (second gNB 20-2) is accepted, the second NGC 30-2 provides the management device 50 with information regarding the connection destination of the second DU 24-2. Here, the information regarding the connection destination is, for example, an IP address and a UDP port number, a transport network layer (TNL) address such as a TCP port number, a MAC address, an access point name (APN), a data network name (DNN), or the like. Upon receiving the information related to the connection destination, the management device 50 constructs a fronthaul between the RU 25 and the second DU 24-2, for example.

Alternatively, the information exchange unit 503 of the management device 50 may include the information related to the connection destination of the RU 25 in the response indicating that the request for operating the RU 25 as a part of the 5G base station device (second gNB 20-2) of the PLMN operator is accepted. The second NGC 30-2 that has received the information related to the connection destination constructs a fronthaul between the second DU 24-2 and the RU 25, for example.

The management device 50 instructs the operation frequency setting unit 2541 of the RU 25 to set the second licensed frequency band via the core network (first NGC 30-1) of the base station device (first gNB 20-1) of the local 5G. The operation frequency setting unit 2541 of the RU 25 sets the second licensed frequency band as the operation frequency band of the RU 25. Thus, in addition to operating in the first licensed frequency band as part of the local 5G base station device (first gNB 20-1), RU 25 starts operating in the second licensed frequency band as part of the PLMN operator's 5G base station device (second gNB 20-2). Note that the RU 25 is not allowed to operate in the second licensed frequency band as part of the local 5G base station device (the first gNB 20-1). Here, operating as part of the local 5G base station device (first gNB 20-1) means broadcasting system information including identification information for identifying the microoperator's network, for example, the SNPN ID, and operating as part of the PLMN operator's 5G base station device (second gNB 20-2) means broadcasting system information including identification information for identifying the PLMN operator's network, for example, the PLMN ID.

Note that the above-described message requesting the RU 25 to operate as a part of the 5G base station device (the second gNB 20-2) of the PLMN operator may include information regarding the second licensed frequency band permitted to be used in advance. In this case, the control unit 502 of the management device 50 may determine whether to accept the request or reject the request on the basis of the information related to the second licensed frequency band included in the message and the capability information managed by the capability information management unit 5012. Here, the information related to the second licensed frequency band may be information related to one frequency band or information related to a plurality of frequency bands.

Furthermore, the core network (first NGC 30-1) of the local 5G base station device (first gNB 20-1) may receive the above-described message including the information related to the second licensed frequency band permitted to be used in advance from the core network (second NGC 30-2) operated and managed by the PLMN operator, and determine to accept or reject the request on the basis of the capability information of the RU 25 managed by the first NGC 30-1.

The operation frequency setting unit 2541 of the RU 25 notifies, via the network communication unit 255, the first DU 24-1 that the first licensed frequency band is allocated, and notifies the second DU 24-2 that the second licensed frequency band is allocated.

Here, in a case where the second gNB 20-2 operates in a frequency band different from that of the first gNB 20-1, each of the first CUs 23-1 or the second CUs 23-2 constituting each base station (first gNB 20-1 or second gNB 20-2) can process RRC. That is, the system information of the first gNB 20-1 is controlled by the first CU 23-1, and the system information of the second gNB 20-2 is controlled by the second CU 23-2.

Figure 12:
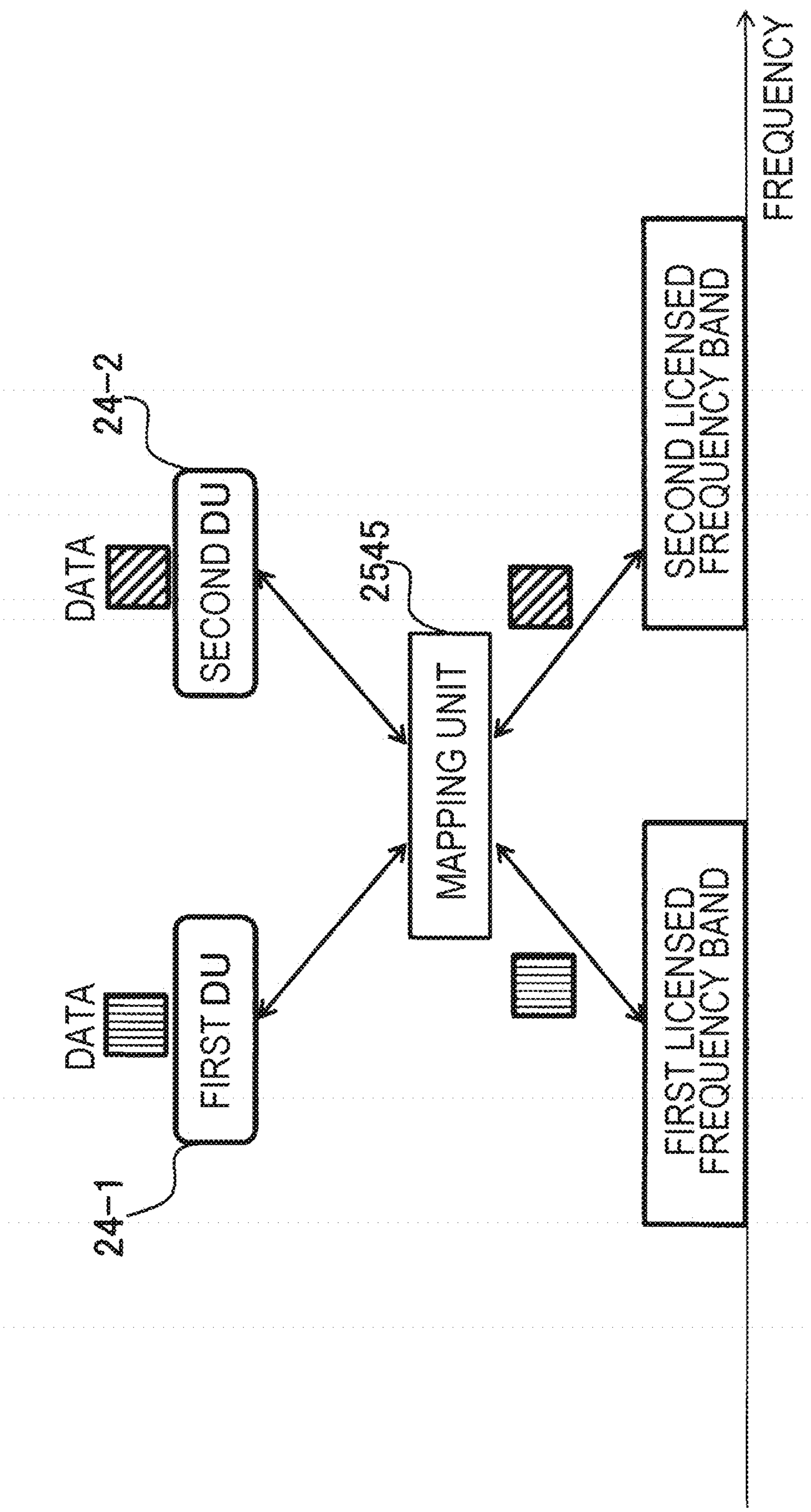
FIG. 12 is a diagram illustrating an example of processing in a mapping unit 2545.

FIG. 12 is a diagram illustrating an example of processing in the mapping unit 2545 of the RU 25. The mapping unit 2545 performs mapping such that data transmitted and received via the first DU 24-1 is transmitted and received by using the first licensed frequency band, and performs mapping such that data transmitted and received via the second DU 24-2 is transmitted and received by using the second licensed frequency band. That is, the mapping unit 2545 performs mapping between a wireless bearer, a TNL, or a PDU session and a frequency band.

Note that, in a case where the PLMN operator receives a request for using a specific network slice from the UE 10, the PLMN operator may transmit, from the second NGC 30-2 to the management device 50, a message requesting the RU 25 to operate as a part of the PLMN operator's 5G base station device (the second gNB 20-2). Here, S-NSSAI, which is information for assisting selection of a network slice, is allocated to each network slice, and the network slice can be identified by the S-NSSAI.

Furthermore, the management device 50 may disclose a list of network slices (a list including one or more S-NSSAI) that can be supported by the RU 25 to the second NGC 30-2. Moreover, the management device 50 may disclose information regarding the communication quality of the RU 25, for example, parameters regarding QoS such as a guaranteed flow bit rate (GFBR), a maximum flow bit rate (MFBR), a packet delay budget (PDB), and a packet error rate (PER), and load information to the second NGC 30-2. Furthermore, the management device 50 may disclose information related to the installation position of the RU 25 to the second NGC 30-2. The second NGC 30-2 can determine whether to send a message to the management device 50 requesting that the RU 25 be operated as part of a PLMN operator's 5G base station device (the second gNB 20-2) on the basis of at least one of a published list of available network slices, information relating to communication quality, and information relating to an installation location.

From the above, RU 25 can operate in the first licensed frequency band as part of the local 5G base station device (first gNB 20-1) and can operate in the second licensed frequency band as part of the PLMN operator's 5G base station device (second gNB 20-2).

Furthermore, in a case where the microoperator is allowed to use the first shared frequency band, RU 25 may operate on the first shared frequency band in addition to the first licensed frequency band as part of the local 5G base station device (first gNB 20-1). The shared frequency band is not a frequency band allocated to a specific microoperator or a PLMN operator, but is a frequency band in which any of a plurality of microoperators or PLMN operators can be used. Therefore, the shared frequency band may include an unlicensed frequency band. Note that the shared frequency band may be permitted to be used with an area, a period, or the like limited.

Furthermore, in a case where the PLMN operator is allowed to use the second shared frequency band, RU 25 may operate on the second shared frequency band in addition to the second licensed frequency band as part of the PLMN operator's 5G base station device (second gNB 20-2).

[4.1.2. Setting of Operation Band]

First, as a precondition, a first licensed frequency band dedicated to local 5G is allocated to the microoperator, and the RU 25 illustrated in FIG. 11 can operate on the first licensed frequency band.

The control unit 502 of the management device 50 confirms that the wireless front end unit 251 of the RU 25 supports operation in the first licensed frequency band on the basis of the capability information managed by the capability information management unit 5012.

The management device 50 instructs the operation frequency setting unit 2541 of the RU 25 to set the first licensed frequency band via the core network (the first NGC 30-1) of the base station device (the first gNB 20-1) of the local 5G. The RU 25 begins operating in the first licensed frequency band as part of the local 5G base station device (first gNB 20-1).

Subsequently, the information exchange unit 503 of the management device 50 receives a message from the core network (the second NGC 30-2) operated and managed by the PLMN operator, requesting that the RU 25 be operated as a part of the 5G base station device (the second gNB 20-2) of the PLMN operator. This message includes, for example, a PLMN ID for identifying a PLMN operator.

The control unit 502 of the management device 50 specifies the second licensed frequency band allocated only for the 5G service of the PLMN on the basis of the PLMN ID and the licensed frequency band information managed by licensed frequency band information management unit 5011. The control unit 502 confirms that the wireless front end unit 251 of the RU 25 does not support operation in the second licensed frequency band on the basis of the capability information managed by the capability information management unit 5012. After the checking, the control unit 502 checks whether or not the operation band setting unit 2542 of the RU 25 can divide the channel band in the first licensed frequency band. In a case where the operation band setting unit 2542 of the RU 25 can divide the channel band, the information exchange unit 503 of the management device 50 returns, to the second NGC 30-2, a response indicating that a request for operating the RU 25 as part of the PLMN operator's 5G base station device (the second gNB 20-2) is accepted. On the other hand, in a case where the operation band setting unit 2542 cannot divide the channel band, the information exchange unit 503 of the management device 50 returns a response indicating rejection of the request to the second NGC 30-2. Here, each of the divided channel bands is treated as a component carrier (CC). Note that, in a case where a plurality of frequency bands is allocated as the second licensed frequency band, the PLMN operator may include information regarding priorities of the plurality of frequency bands in the message described above. On the basis of the information regarding the priority and the capability information managed by the capability information management unit 5012, the control unit 502 of the management device 50 confirms that the wireless front end unit 251 of the RU 25 supports operation in a frequency band with a higher priority among a plurality of frequency bands.

In a case where the management device 50 receives a request to operate the RU 25 as a part of the PLMN operator's 5G base station device (the second gNB 20-2), the management device 50 instructs the operation band setting unit 2542 to set the first channel band and the second channel band via the core network (the first NGC 30-1) of the local 5G base station device (the first gNB 20-1). Here, the first channel band is a channel band for the RU 25 operating as a part of the local 5G base station device (the first gNB 20-1). Furthermore, the second channel band is a channel band for the RU 25 that operates as a part of the PLMN operator's 5G base station device (the second gNB 20-2). The first channel band and the second channel band are channel bands obtained by dividing the first licensed frequency band, and are both included in the first licensed frequency band. The first channel band and the second channel band are frequency bands that do not overlap each other.

The operation band setting unit 2542 notifies, via the network communication unit 255, that the first channel band of the first licensed frequency band is allocated to the first DU 24-1, and notifies that the second channel band of the first licensed frequency band is allocated to the second DU 24-2.

Here, in a case where the second gNB 20-2 operates in the same frequency band as the first gNB 20-1, the first CU 23-1 constituting the first gNB 20-1 processes the RRC of the second gNB 20-2 in addition to the first gNB 20-1. Therefore, the second CU 23-2 constituting the second gNB 20-2 provides the first CU 23-1 with information necessary for processing the RRC of the second gNB 20-2. The information necessary for processing the RRC is, for example, information regarding system information. Furthermore, the first CU 23-1 may permit the second CU 23-2 to process the RRC of the second gNB 20-2 within the second channel band. Here, the information necessary for processing the RRC of the second gNB 20-2 is acquired by a request to the second CU 23-2 and a response to the first CU 23-1, or by a procedure of registration/subscription to the second CU 23-2 and notification to the first CU 23-1, or update.

Figure 13:
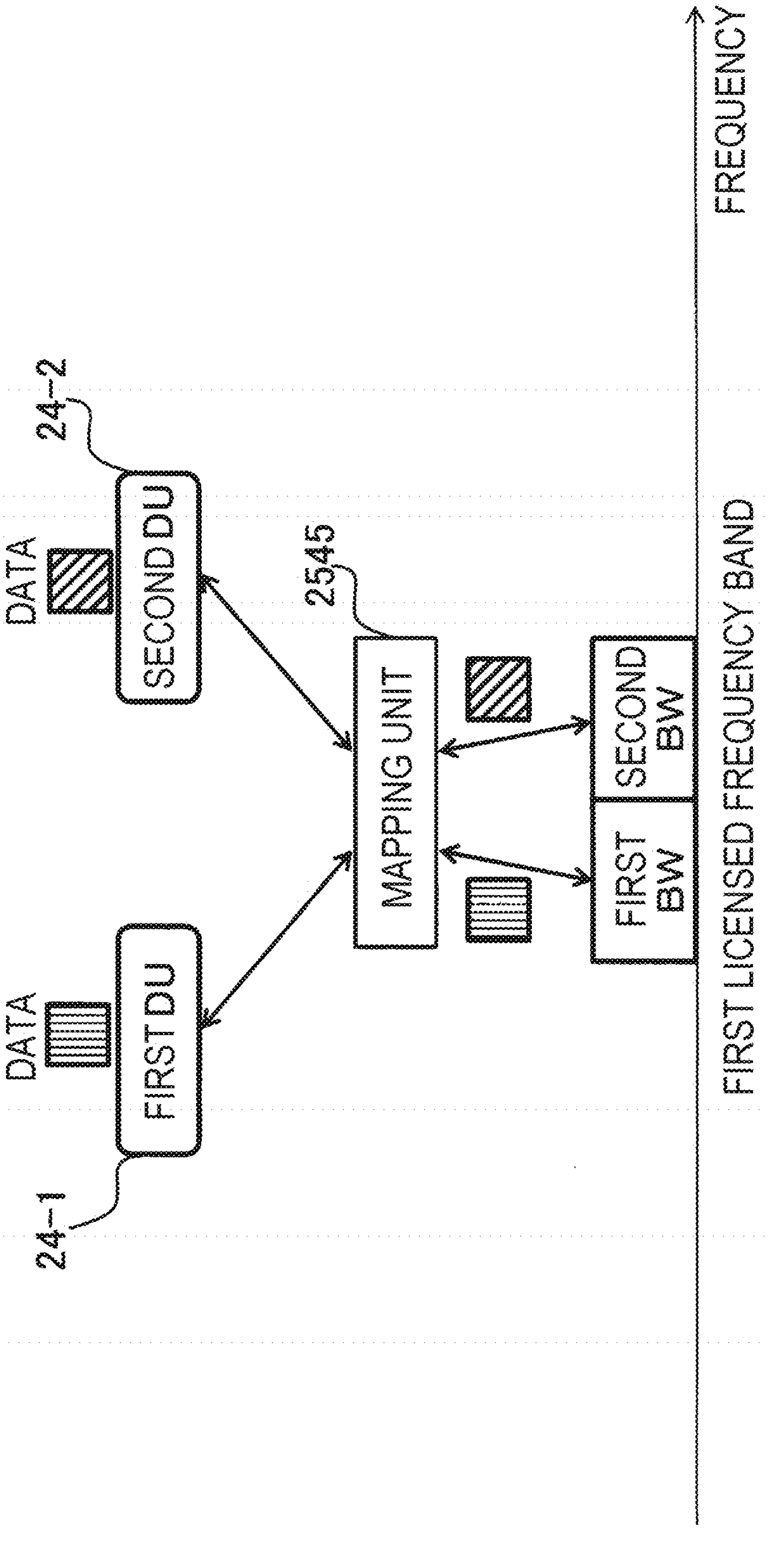
FIG. 13 is a diagram illustrating an example of processing in the mapping unit 2545.

FIG. 13 is a diagram illustrating an example of processing in the mapping unit 2545 of the RU 25. The mapping unit 2545 performs mapping such that data transmitted and received via the first DU 24-1 is transmitted and received using the first channel band (BW), and performs mapping such that data transmitted and received via the second DU

24-2 is transmitted and received using the second channel band (BW). That is, the mapping unit 2545 performs mapping between a wireless bearer, a TNL, or a PDU session and a channel band.

From the above, RU 25 can operate in the first channel band of the first licensed frequency band as part of the local 5G base station device (first gNB 20-1), and can operate in the second channel band of the first licensed frequency band as part of the PLMN operator's 5G base station device (second gNB 20-2). Although the embodiment in which the RU 25 is operated in the second channel band of the first licensed frequency band as a part of the PLMN operator's 5G base station device (the second gNB 20-2) has been described here, the base station device (gNB 20) can be operated in the second channel band of the first licensed frequency band as the PLMN operator's 5G base station device (the second gNB 20-2) in a similar manner.

Furthermore, in a case where the microoperator is permitted to use the first shared frequency band, the management device 50 may instruct the operation band setting unit 2542 to set the third channel band and the fourth channel band within the first shared frequency band. In this case, the mapping unit 2545 of the RU 25 performs mapping such that data transmitted and received via the first DU 24-1 is transmitted and received using the third channel band, and performs mapping such that data transmitted and received via the second DU 24-2 is transmitted and received using the fourth channel band. That is, RU 25 can operate in the third channel band of the first shared frequency band as part of the local 5G base station device (first gNB 20-1) and can operate in the fourth channel band of the first shared frequency band as part of the PLMN operator's 5G base station device (second gNB 20-2).

Note that, in a case where the use of the first licensed frequency band or the first shared frequency band is not allowed by the PLMN operator in the legal system, the PLMN operator can enter into a roaming agreement as a service level agreement (SLA) with the microoperator, and use the RU 25 operating in the first licensed frequency band or the first shared frequency band as the RU 25 of the roaming destination. That is, the RU 25 can operate in the first channel band of the first licensed frequency band or the third channel band of the first shared frequency band as a part of the base station device (the first gNB 20-1) of the local 5G, and operate in the second channel band of the first licensed frequency band or the fourth channel band of the first shared frequency band as a part of the base station device (the second gNB 20-2) of the 5G visitor PLMN (that is, the microoperator).

Furthermore, the operation band setting unit 2542 may further set a bandwidth part (BWP) in each channel band (first to fourth channel bands). The UE 10 does not necessarily need to use the entire channel band depending on the size of data transmitted and received via the RU 25. A set of BWPs configured by dividing each channel band into a plurality of BWPs is defined in advance, and the operation band setting unit 2542 of the RU 25 can adaptively set one BWP from the set of BWPs of each channel band as the Active BWP for each UE 10.

[4.1.3. Setting of Operation Period]

First, as a precondition, a first licensed frequency band dedicated to local 5G is allocated to the microoperator, and the RU 25 illustrated in FIG. 11 can operate on the first licensed frequency band.

The control unit 502 of the management device 50 confirms that the wireless front end unit 251 of the RU 25 supports operation in the first licensed frequency band on the basis of the capability information managed by the capability information management unit 5012.

The management device 50 instructs the operation frequency setting unit 2541 of the RU 25 to set the first licensed frequency band via the core network (the first NGC 30-1) of the base station device (the first gNB 20-1) of the local 5G. The RU 25 begins operating in the first licensed frequency band as part of the local 5G base station device (first gNB 20-1).

Subsequently, the information exchange unit 503 of the management device 50 receives a message from the core network (the second NGC 30-2) operated and managed by the PLMN operator, requesting that the RU 25 be operated as a part of the 5G base station device (the second gNB 20-2) of the PLMN operator. This message includes, for example, a PLMN ID for identifying a PLMN operator.

The control unit 502 of the management device 50 specifies the second licensed frequency band allocated only for the 5G service of the PLMN on the basis of the PLMN ID and the licensed frequency band information managed by licensed frequency band information management unit 5011. The control unit 502 confirms that the wireless front end unit 251 of the RU 25 does not support operation in the second licensed frequency band on the basis of the capability information managed by the capability information management unit 5012. After the checking, the control unit 502 checks whether or not the operation period setting unit 2543 of the RU 25 can divide the time interval in the first licensed frequency band. Here, the operation period setting unit 2543 of the RU 25 determines that the division is possible, for example, in a case where the time interval after the division is longer than or equal to a preset time interval. In a case where the operation period setting unit 2543 can divide the time interval, the information exchange unit 503 of the management device 50 returns, to the second NGC 30-2, a response indicating that a request for operating the RU 25 as a part of the 5G base station device (the second gNB 20-2) of the PLMN operator is accepted. On the other hand, in a case where the operation period setting unit 2543 cannot divide the time interval, the information exchange unit 503 of the management device 50 returns a response indicating rejection of the request to the second NGC 30-2. Here, each time interval is set, for example, in units of slots. Note that, in a case where a plurality of frequency bands is allocated as the second licensed frequency band, the PLMN operator may include information regarding priorities of the plurality of frequency bands in the message described above. On the basis of the information regarding the priority and the capability information managed by the capability information management unit 5012, the control unit 502 of the management device 50 confirms that the wireless front end unit 251 of the RU 25 supports operation in a frequency band with a higher priority among a plurality of frequency bands.

In a case where management device 50 receives a request to operate RU 25 as part of a PLMN operator's 5G base station device (second gNB 20-2), management device 50 instructs, via the core network (first NGC 30-1) of the local 5G base station device (first gNB 20-1), operation period setting unit 2543 to set the first time interval and the second time interval. Here, the first time interval is a time interval for the RU 25 operating as part of the local 5G base station device (the first gNB 20-1). Furthermore, the second time interval is the time interval for the RU 25 operating as part of the PLMN operator's 5G base station device (the second gNB 20-2).

The operation period setting unit 2543 of the RU 25 notifies, through the network communication unit 255, the first DU 24-1 that the first time interval of the first licensed frequency band is allocated, and notifies the second DU 24-2 that the second time interval of the first licensed frequency band is allocated.

Here, in a case where the second gNB 20-2 operates in the same frequency band as the first gNB 20-1, the first CU 23-1 constituting the first gNB 20-1 processes the RRC of the second gNB 20-2 in addition to the first gNB 20-1. Therefore, the second CU 23-2 constituting the second gNB 20-2 provides the first CU 23-1 with information necessary for processing the RRC of the second gNB 20-2. The information necessary for processing the RRC is, for example, information regarding system information. Here, the information necessary for processing the RRC of the second gNB 20-2 is acquired by a request to the second CU 23-2 and a response to the first CU 23-1, or by a procedure of registration/subscription to the second CU 23-2 and notification to the first CU 23-1, or update.

Figure 14:
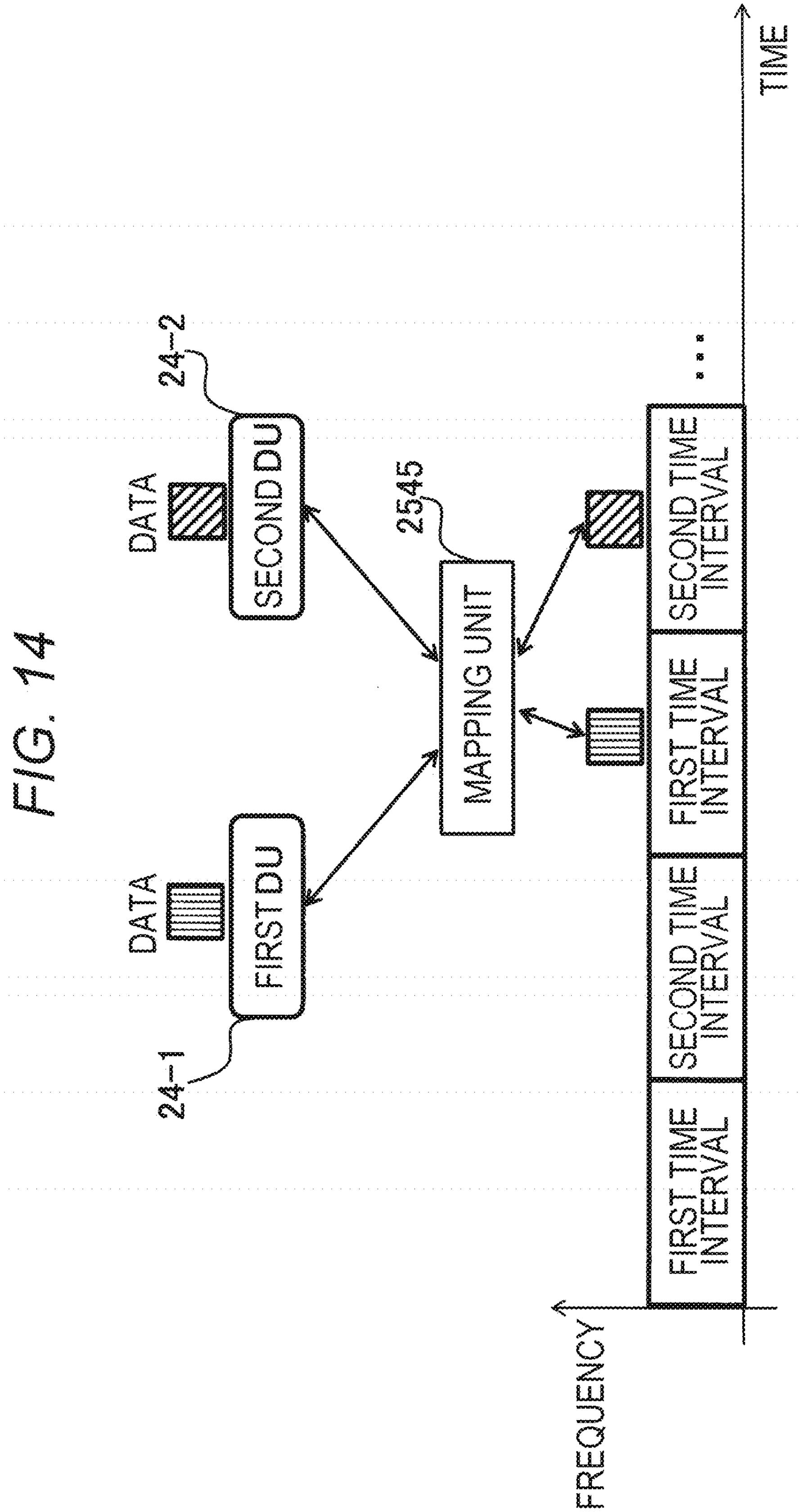
FIG. 14 is a diagram illustrating an example of processing in the mapping unit 2545.

FIG. 14 is a diagram illustrating an example of processing in the mapping unit 2545 of the RU 25. The mapping unit 2545 performs mapping such that data transmitted and received via the first DU 24-1 is transmitted and received by using the first time interval, and performs mapping such that data transmitted and received via the second DU 24-2 is transmitted and received by using the second time interval. That is, the mapping unit 2545 performs mapping between the wireless bearer, the TNL, or the PDU session and the time interval.

From the above, RU 25 can operate in the first time interval of the first licensed frequency band as part of the local 5G base station device (first gNB 20-1), and operate in the second time interval of the first licensed frequency band as part of the PLMN operator's 5G base station device (second gNB 20-2). Although the embodiment in which the RU 25 is operated as part of the PLMN operator's 5G base station device (second gNB 20-2) at the second time interval of the first licensed frequency band has been described here, the base station device (gNB 20) can be operated as the PLMN operator's 5G base station device (second gNB 20-2) at the second time interval of the first licensed frequency band in a similar manner.

Furthermore, in a case where the microoperator is allowed to use the first shared frequency band, the management device 50 may instruct the operation period setting unit 2543 of the RU 25 to set the third time interval and the fourth time interval in the first shared frequency band. The mapping unit 2545 performs mapping so that data transmitted and received via the first DU 24-1 is transmitted and received by using the third time interval of the first shared frequency band, and performs mapping so that data transmitted and received via the second DU 24-2 is transmitted and received by using the fourth time interval of the first shared frequency band. That is, RU 25 can operate in the third time interval of the first shared frequency band as part of the local 5G base station device (first gNB 20-1) and operate in the fourth time interval of the first shared frequency band as part of the PLMN operator's 5G base station device (second gNB 20-2).

Note that, in a case where the use of the first licensed frequency band or the first shared frequency band is not allowed by the PLMN operator in the legal system, the PLMN operator can enter into a roaming agreement with the microoperator as an SLA, and use the RU 25 operating in the first licensed frequency band or the first shared frequency band as the RU 25 of the roaming destination. That is, the RU 25 can operate at the first time interval of the first licensed frequency band or the third time interval of the first shared frequency band as part of the base station device of the local 5G (the first gNB 20-1), and operate at the second time interval of the first licensed frequency band or the fourth time interval of the first shared frequency band as part of the base station device of the 5G visitor PLMN (that is, the microoperator) (the second gNB 20-2).

Furthermore, the RU 25 supports a frequency division duplex (FDD) or time division duplex (TDD) duplex system according to an operation frequency band. In the case of FDD, the same time interval (a first time interval, or a second time interval) is set in the transmission band and the reception band, and the time intervals of the transmission band and the reception band are synchronized in timing. In the case of TDD, since the ratio between the transmission period and the reception period is variable according to the traffic, time intervals (a first time interval or a second time interval that is set in the sending period, and a first time interval or a second time interval that is set in the receiving period) set to the transmission period and the reception period can be set to different periods.

[4.1.4. Wireless Resource Setting]

First, as a precondition, a first licensed frequency band dedicated to local 5G is allocated to the microoperator, and the RU 25 illustrated in FIG. 11 can operate on the first licensed frequency band.

The control unit 502 of the management device 50 confirms that the wireless front end unit 251 of the RU 25 supports operation in the first licensed frequency band on the basis of the capability information managed by the capability information management unit 5012.

The management device 50 instructs the operation frequency setting unit 2541 of the RU 25 to set the first licensed frequency band via the core network (the first NGC 30-1) of the base station device (the first gNB 20-1) of the local 5G. The RU 25 begins operating in the first licensed frequency band as part of the local 5G base station device (first gNB 20-1).

Subsequently, the information exchange unit 503 of the management device 50 receives a message from the core network (the second NGC 30-2) operated and managed by the PLMN operator, requesting that the RU 25 be operated as a part of the 5G base station device (the second gNB 20-2) of the PLMN operator. This message includes, for example, a PLMN ID for identifying a PLMN operator.

The control unit 502 of the management device 50 specifies the second licensed frequency band allocated only for the 5G service of the PLMN on the basis of the PLMN ID and the licensed frequency band information managed by licensed frequency band information management unit 5011. The control unit 502 confirms that the wireless front end unit 251 of the RU 25 does not support operation in the second licensed frequency band on the basis of the capability information managed by the capability information management unit 5012. After the checking, the control unit 502 checks whether the wireless resource setting unit 2544 of the RU 25 can divide the wireless resources in the first licensed frequency band. Here, the wireless resource setting unit 2544 of the RU 25 determines that the division is possible, for example, in a case where the divided wireless resources are more than or equal to the number of wireless resources set in advance. In a case where the wireless resource setting unit 2544 can divide the wireless resources, the information exchange unit 503 of the management device 50 returns a response indicating that a request for operating the RU 25 as a part of the 5G base station device (the second gNB 20-2)

of the PLMN operator is accepted to the second NGC 30-2. On the other hand, in a case where the wireless resource setting unit 2544 cannot divide the wireless resources, the information exchange unit 503 of the management device 50 returns a response indicating rejection of the request to the second NGC 30-2. Here, each wireless resource is set, for example, in units of resource elements (REs) or resource blocks (RBs). Note that, in a case where a plurality of frequency bands is allocated as the second licensed frequency band, the PLMN operator may include information regarding priorities of the plurality of frequency bands in the message described above. On the basis of the information regarding the priority and the capability information managed by the capability information management unit 5012, the control unit 502 of the management device 50 confirms that the wireless front end unit 251 of the RU 25 supports operation in a frequency band with a higher priority among a plurality of frequency bands.

In a case where the management device 50 receives a request to operate the RU 25 as part of the PLMN operator's 5G base station device (the second gNB 20-2), the management device 50 instructs the wireless resource setting unit 2544 of the RU 25 to configure the first wireless resource and the second wireless resource via the core network (the first NGC 30-1) of the local 5G base station device (the first gNB 20-1). Here, the first wireless resource is a wireless resource for the RU 25 operating as a part of the local 5G base station device (the first gNB 20-1). Furthermore, the second wireless resource is also a wireless resource for the RU 25 operating as part of the PLMN operator's 5G base station device (second gNB 20-2).

The wireless resource setting unit 2544 of the RU 25 notifies, via the network communication unit 255, the first DU 24-1 that the first wireless resource of the first licensed frequency band is allocated, and notifies the second DU 24-2 that the second wireless resource of the first licensed frequency band is allocated.

Here, in a case where the second gNB 20-2 operates in the same frequency band as the first gNB 20-1, the first CU 23-1 constituting the first gNB 20-1 processes the RRC of the second gNB 20-2 in addition to the first gNB 20-1. Therefore, the second CU 23-2 constituting the second gNB 20-2 provides the first CU 23-1 with information necessary for processing the RRC of the second gNB 20-2. The information necessary for processing the RRC is, for example, information regarding system information. Here, the information necessary for processing the RRC of the second gNB 20-2 is acquired by a request to the second CU 23-2 and a response to the first CU 23-1, or by a procedure of registration/subscription to the second CU 23-2 and notification to the first CU 23-1, or update.

Figure 15:
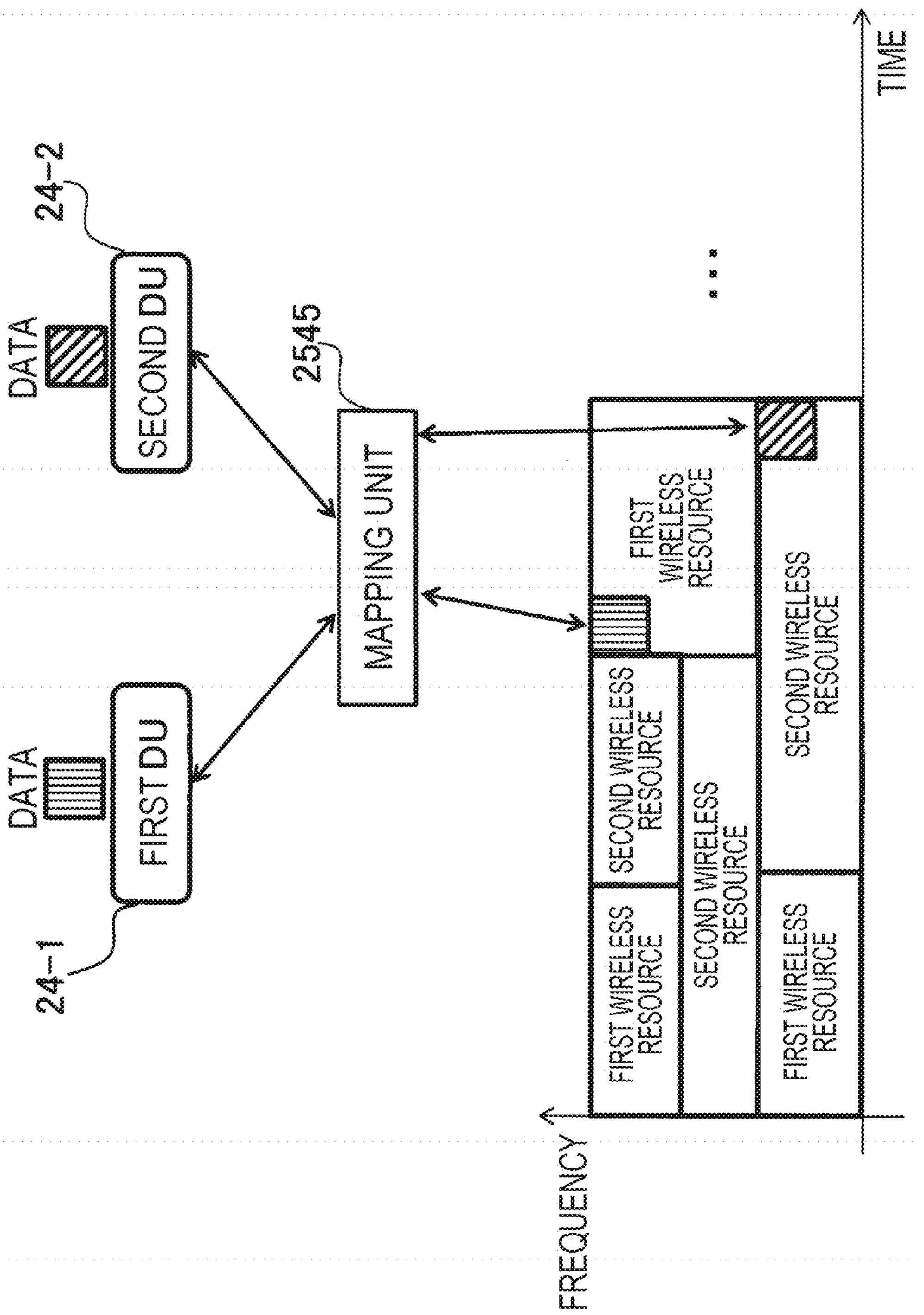
FIG. 15 is a diagram illustrating an example of processing in the mapping unit 2545.

FIG. 15 is a diagram illustrating an example of processing in the mapping unit 2545 of the RU 25. The mapping unit 2545 performs mapping such that data transmitted and received via the first DU 24-1 is transmitted and received by using the first wireless resource, and performs mapping such that data transmitted and received via the second DU 24-2 is transmitted and received by using the second wireless resource. That is, the mapping unit 2545 performs mapping between a radio bearer, a TNL, or a PDU session and a wireless resource.

From the above, RU 25 can operate on the first wireless resource of the first licensed frequency band as part of the local 5G base station device (first gNB 20-1) and can operate on the second wireless resource of the first licensed frequency band as part of the PLMN operator's 5G base station device (second gNB 20-2). Although the embodiment in which the RU 25 as part of the PLMN operator's 5G base station device (second gNB 20-2) is operated on the second wireless resource of the first licensed frequency band has been described here, the base station device (gNB 20) as the PLMN operator's 5G base station device (second gNB 20-2) can be operated on the second wireless resource of the first licensed frequency band in a similar manner.

Furthermore, in the present embodiment, an example of the processing of the mapping unit in the RU 25 has been described. However, in a case where the wireless resources are divided, the processing of the mapping unit may be performed on the DU 24 side. This is because a scheduling function may be provided on the DU 24 side, and mapping in the DU 24 can allocate wireless resources more efficiently. For example, the second DU 24-2 may obtain information related to this mapping from the first DU 24-1.

Furthermore, in a case where the microoperator is permitted to use the first shared frequency band, the management device 50 may instruct the wireless resource setting unit 2544 to set the third wireless resource and the fourth wireless resource in the first shared frequency band. The mapping unit 2545 performs mapping such that data transmitted and received via the first DU 24-1 is transmitted and received by using the third wireless resource, and performs mapping such that data transmitted and received via the second DU 24-2 is transmitted and received by using the fourth wireless resource. That is, RU 25 can operate on the third wireless resource of the first shared frequency band as part of the local 5G base station device (first gNB 20-1) and can operate on the fourth wireless resource of the first shared frequency band as part of the PLMN operator's 5G base station device (second gNB 20-2).

Note that, in a case where the use of the first licensed frequency band or the first shared frequency band is not allowed by the PLMN operator in the legal system, the PLMN operator can enter into a roaming agreement with the microoperator as an SLA, and use the RU 25 operating in the first licensed frequency band or the first shared frequency band as the RU 25 of the roaming destination. That is, the RU 25 can operate on the first wireless resource of the first licensed frequency band or the third wireless resource of the first shared frequency band as part of the base station device of the local 5G (the first gNB 20-1), and operate on the second wireless resource of the first licensed frequency band or the fourth wireless resource of the first shared frequency band as part of the base station device of the 5G visitor PLMN (that is, the microoperator) (the second gNB 20-2).

[4.1.5. Real-Time Control for Dynamic Setting]

The setting of the operation band, the setting of the operation period, and the setting of the wireless resource described above are dynamically set according to the traffic volume of the microoperator or the PLMN operator or QoS. Therefore, in a case where the management device 50 controls the operation band setting unit 2542, the operation period setting unit 2543, or the wireless resource setting unit 2544 via the core network (first NGC 30-1) of the base station device (first gNB 20-1) of the local 5G, it is assumed that the delay increases. Therefore, the management device 50 can perform setting such that the first CU 23-1 dynamically controls the operation band setting unit 2542, the operation period setting unit 2543, or the wireless resource setting unit 2544 of the RU 25.

Figure 16:
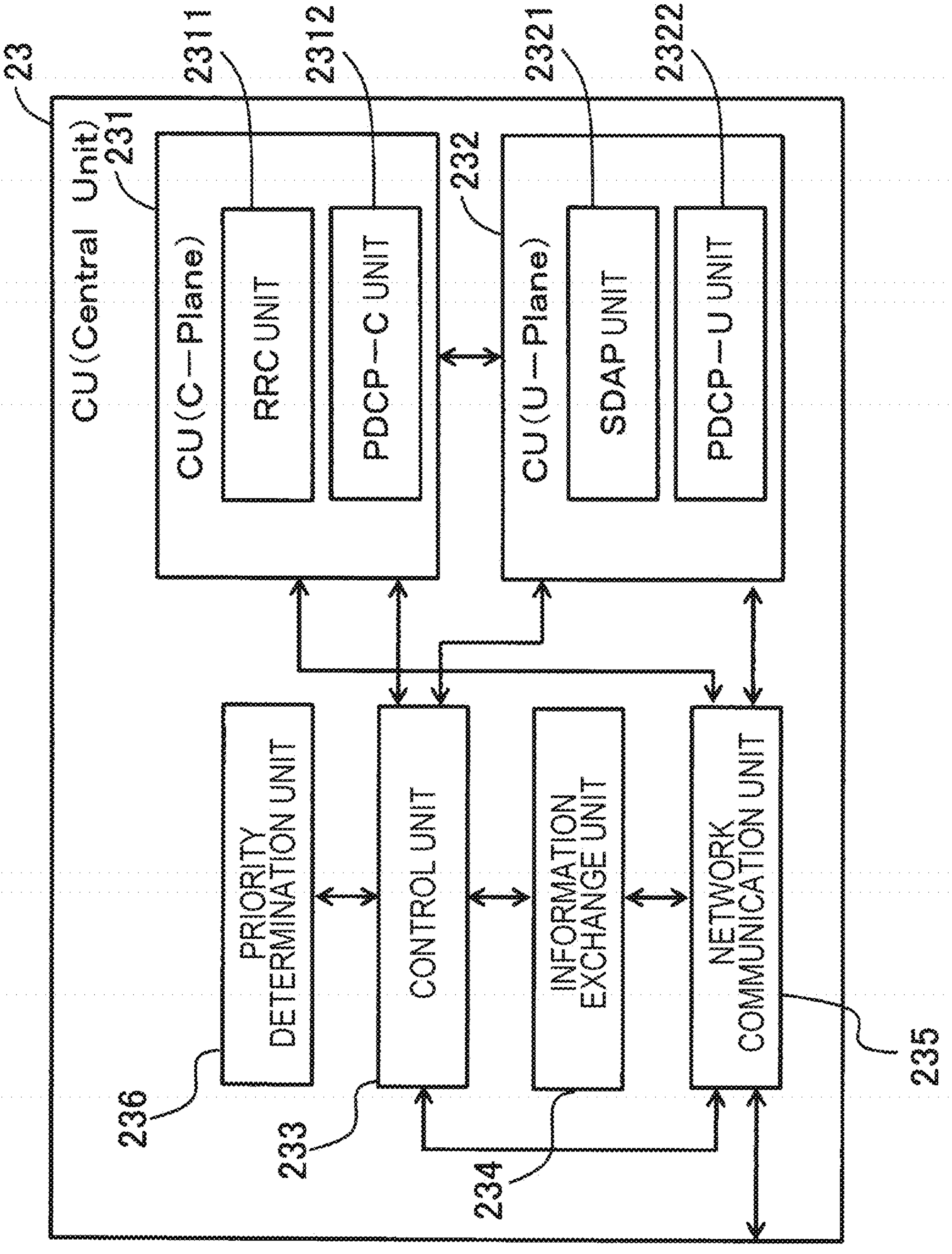
FIG. 16 is a diagram illustrating an example of a configuration of a central unit (CU) 23.

FIG. 16 is a diagram illustrating an example of a configuration of a central unit (CU) 23. The CU 23 includes a CU (C-Plane) 231, a CU (U-Plane) 232, a control unit 233, an information exchange unit 234, a network communication unit 235, and a priority order determination unit 236.

Both the first CU 23-1 and the second CU 23-2 have the configuration illustrated in FIG. 16. In the following description, when an element included in the first CU 23-1 is described, "-1" is added to the end of the reference numeral, and when an element included in the second CU 23-2 is described, "-2" is added to the end of the reference numeral. It is assumed that the description of an element having neither "-1" nor "-2" at the end is commonly applied to both the first CU 23-1 and the second CU 23-2.

The CU (C-Plane) 231 includes an RRC unit 2311 that performs necessary processing in the RRC sublayer of the control plane and a PDCP-C unit 2312 that performs necessary processing in the PDCP sublayer of the control plane. The CU (C-Plane) 231 corresponds to the CU (C-Plane) 203 of the base station device (gNB 20) illustrated in FIG. 9.

The CU (U-Plane) 232 includes an SDAP unit 2321 that performs necessary processing in the SDAP sublayer of the user plane and a PDCP-U unit 2322 that performs necessary processing in the PDCP sublayer of the user plane. The CU (U-Plane) 232 corresponds to the CU (U-Plane) 204 of the base station device (gNB 20) illustrated in FIG. 9.

The control unit 233 is a controller that controls each unit of the CU 23. The control unit 233 is realized by, for example, a processor (hardware processor) such as a central processing unit (CPU), a micro-processing unit (MPU), or a graphics processing unit (GPU). For example, the control unit 233 is implemented by a processor executing various programs stored in a storage device inside the CU 23 using a random access memory (RAM) or the like as a work area. Note that the control unit 233, the CU (C-Plane) 231, the CU (U-Plane) 232, the information exchange unit 234, the priority order determination unit 236, and the network communication unit 207 may be realized by an integrated circuit such as an application specific integrated circuit (ASIC) or a field-programmable gate array (FPGA). Any of the CPU, the MPU, the GPU, the ASIC, and the FPGA can be regarded as a controller.

As an example, the control unit 233 of the first CU 23-1 performs control such that the first communication is performed between the first DU 24-1 (first distributed unit) connected to the RU 25 (radio unit) belonging to the local network domain and the UE 10 (terminal device), the RU 25 (radio unit) is connected to the second DU 24-2 (second distributed unit) belonging to the public network domain, and the second communication is performed between the second DU and the UE 10 (terminal device) or another UE (another terminal device).

The control unit 233-1 of the first CU 23-1 dynamically controls the operation band setting unit 2542, the operation period setting unit 2543, or the wireless resource setting unit 2544 of the RU 25 according to the setting from the management device 50.

For example, the control unit 233-1 of the first CU 23-1 dynamically controls the first channel band and the second channel band of the operation band setting unit 2542 of the RU 25, the first time interval and the second time interval of the operation period setting unit 2543 of the RU 25, or the ratio of the first wireless resource and the second wireless resource of the wireless resource setting unit 2544 on the basis of the amount of traffic processed by the CU (U-Plane) 232-1 of the own device.

Management device 50 sets one or more threshold values in priority order determination unit 236-1 of first CU 23-1 in advance. When detecting that the amount of traffic processed by the CU (U-Plane) 232-1 exceeds one threshold, the priority order determination unit 236-1 controls the RU 25 via the control unit 233-1 so that the second channel band is narrowed with respect to the first channel band, the second time interval is shortened with respect to the first time interval, or the second wireless resource is reduced with respect to the first wireless resource.

The control unit 233-1 of the first CU 23-1 sets the maximum value of traffic that can be processed by the RU 25 as part of the 5G base station device (the second gNB 20-2) of the PLMN operator on the basis of the set first and second channel bands, the first and second time intervals, or the ratio of the first and second wireless resources. The control unit 233-1 notifies the information exchange unit 234-1 of information related to the set maximum value of the traffic. The information exchange unit 234-1 notifies the second CU 23-2 of the information on the maximum value of the traffic acquired from the control unit 233-1 via the network communication unit 235-1.

The second CU 23-2 controls the amount of traffic to be processed by the CU (U-Plane) 232-2 of the second CU 23 on the basis of the information regarding the maximum value of traffic notified from the first CU 23-1. Note that the control unit 233-1 of the first CU 23-1 may notify the information exchange unit 234-1 of information regarding the second channel band, the second time interval, or the amount of the second wireless resource to the information exchange unit 234-1, and the information exchange unit 234-1 may notify the second CU 23-2 of information regarding the second channel band, the second time interval, or the amount of the second wireless resource via the network communication unit 235-1. Here, the control unit 233 may include the function of the near-real time RIC 22.

As described above, in a case where the second gNB 20-2 operates in a frequency band different from that of the first gNB 20-1, each of the second CUs 23-2 or the first CUs 23-1 constituting each base station (Second gNB 20-2 or first gNB 20-1) processes RRC. Therefore, the RRC unit 2311-2 of the second CU 23-2 processes the RRC of the second gNB 20-2, and the RRC unit 2311-1 of the first CU 23-1 processes the RRC of the first gNB 20-1.

On the other hand, in a case where the second gNB 20-2 operates in the same frequency band as the first gNB 20-1, the first CU 23-1 constituting the first gNB 20-1 processes the RRC of the second gNB 20-2 in addition to the first gNB 20-1. Therefore, the RRC unit 2311-1 of the first CU 23-1 processes the RRC of the second gNB 20-2 and the first gNB 20-1. Therefore, the information exchange unit 234-1 of the first CU 23-1 acquires information (for example, information regarding system information) necessary for processing the RRC of the second gNB 20-2 from the information exchange unit 234-2 of the second CU 23-2. Here, the information necessary for processing the RRC of the second gNB 20-2 is acquired by a request to the second CU 23-2 and a response to the first CU 23-1, or by a procedure of registration/subscription to the second CU 23-2 and notification to the first CU 23-1, or update.

Furthermore, the priority order determination unit 236-1 of the first CU 23-1 may dynamically control the first channel band and the second channel band of the operation band setting unit 2542 of the RU 25, the first time interval and the second time interval of the operation period setting unit 2543 of the RU 25, or the ratio of the first wireless resource and the second wireless resource of the wireless resource setting unit 2544 on the basis of a 5G QOS identifier (5QI) allocated to a radio bearer or a quality of service (QOS) flow or an allocation and retention priority (ARP).

The network communication unit 235 is a communication interface for communicating with a node positioned at a high level on the network (for example, the core network (first NGC 30-1) or the core network (second NGC 30-2)). Furthermore, the network communication unit 235 is a communication interface for communicating with a node (first DU 24-1 or second DU 24-2) positioned at a lower level on the network. For example, the network communication unit 235 is a LAN interface such as an NIC. The network communication unit 235 can construct an F1 interface with the DU 24 via an optical fiber or Ethernet. The network communication unit 235 may be a wired interface or a wireless interface. Furthermore, the network communication unit 235 may perform VPN connection when connecting to another device.

The CU (U-Plane) 232 receives the user plane data from the UPF 330 of the core network 30 via the network communication unit 235. Furthermore, the CU (U-Plane) 232 transmits the user plane data to the UPF 330 of the core network 30 via the network communication unit 235, and receives the user plane data from the UPF 330 of the core network 30. The CU (U-Plane) 232 transmits a protocol data unit (PDU) processed by the PDCP-U unit 2322 to a distributed unit (DU) 24 via the network communication unit 235. Furthermore, the CU (U-Plane) 232 receives the PDU processed by the RLC sublayer from the DU 24 via the network communication unit 235.

Moreover, the information exchange unit 234-1 of the first CU 23-1 exchanges information processed by the SDAP sublayer of another CU 23 (for example, the second CU 23-2) connected via the network communication unit 235-1. Here, the information processed by the SDAP sublayer is, for example, a correspondence between a Qos flow and a data wireless bearer, a QOS flow ID (QFI) allocated to downlink and uplink packets, information related to each configured PDU session, and the like. As a result, the SDAP unit 2321-1 of the first CU 23-1 and the SDAP unit 2321-2 of the second CU 23-2 can operate in cooperation. Information exchange between the first CU 23-1 and another CU 23 (for example, the second CU 23-2) may be performed via an Xn interface or may be performed via a near-real time RIC 22 connected via an E2 interface.

Figure 17:
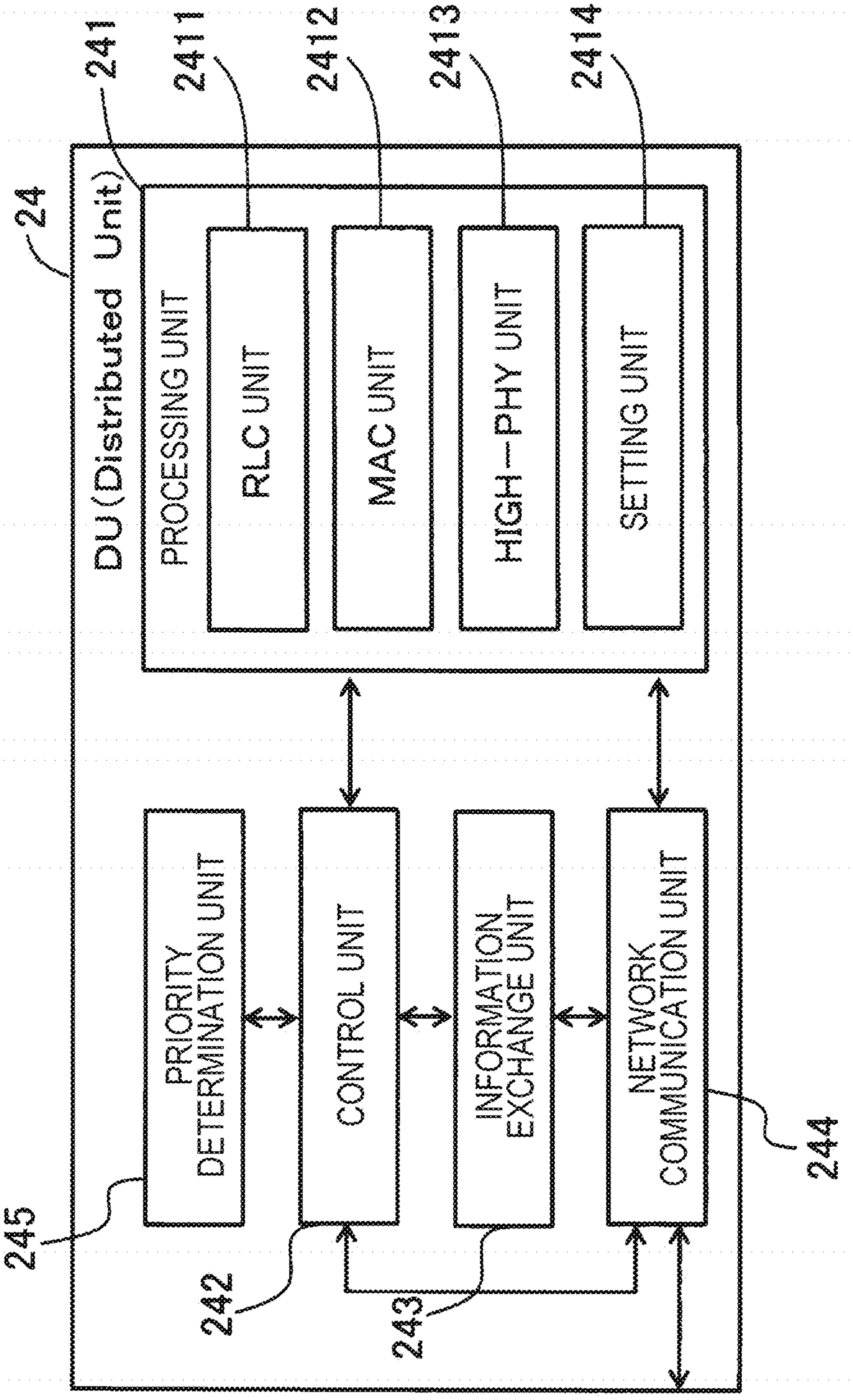
FIG. 17 is a diagram illustrating an example of a configuration of a distributed unit (DU) 24.

FIG. 17 is a diagram illustrating an example of a configuration of a distributed unit (DU) 24. The DU 24 includes a processing unit 241, a control unit 242, an information exchange unit 243, a network communication unit 244, and a priority order determination unit 245. Both the first DU 24-1 and the second DU 24-2 have the configuration illustrated in FIG. 17. In the following description, in particular, when an element included in the first DU 24-1 is described, "-1" is added to the end of the reference numeral, and when an element included in the second DU 24-2 is described, "-2" is added to the end of the reference numeral. It is assumed that the description of the element having neither "-1" nor "-2" at the end applies to both the first DU 24-1 and the second DU 24-2 in common.

The processing unit 241 includes an RLC unit 2411 that performs processing required in the RLC sublayer, a MAC unit 2412 that performs processing required in the MAC sublayer, a HIGH-PHY unit 2413 that performs processing other than the processing performed by the LOW-PHY unit 253 of the RU 25 among the processing required in the PHY, and a setting unit 2414. Here, the processing performed by the HIGH-PHY unit 2413 is, for example, downlink encoding, scrambling, modulation, layer mapping, precoding, and resource element (RE) mapping, and uplink RE demapping, equivalent processing, inverse discrete Fourier transform (IDFT), channel estimation, demodulation, descrambling, and decoding. The setting unit 2414 sets a policy necessary for ensuring compatibility between different DUs 24 (for example, the first DU 24-1 and the second DU 24-2) provided from the management device 50. For example, a QoS policy for the scheduler is set. Furthermore, the setting unit 2414 may set a function that requires compatibility in the form of a virtualized functional unit or a container.

The control unit 242 is a controller that controls each unit of the DU 24. The control unit 242 is realized by, for example, a processor (hardware processor) such as a central processing unit (CPU), a micro-processing unit (MPU), or a graphics processing unit (GPU). For example, the control unit 242 is realized by the processor executing various programs stored in the storage device inside the DU 24 using a random access memory (RAM) or the like as a work area. Note that the control unit 242, the processing unit 241, the information exchange unit 243, the network communication unit 244, and the priority order determination unit 245 may be realized by an integrated circuit such as an application specific integrated circuit (ASIC) or a field-programmable gate array (FPGA). Any of the CPU, the MPU, the GPU, the ASIC, and the FPGA can be regarded as a controller.

In order to improve the real-time property, the control unit 233-1 of the first CU 23-1 may instruct the control unit 242-1 of the first DU 24-1 to dynamically control the operation band setting unit 2542, the operation period setting unit 2543, or the wireless resource setting unit 2544 of the RU 25. For example, the control unit 242-1 of the first DU 24-1 dynamically controls the first channel band and the second channel band of the operation band setting unit 2542 of the RU 25, the first time interval and the second time interval of the operation period setting unit 2543 of the RU 25, or the ratio of the first wireless resource and the second wireless resource of the wireless resource setting unit 2544 on the basis of the amount of traffic processed by the processing unit 241-1 of its own device.

The control unit 233-1 of the first CU 23-1 sets one or more threshold values in advance in the priority order determination unit 245-1 of the first DU 24-1. When detecting that the amount of traffic processed by the processing unit 241-1 exceeds one threshold, the priority order determination unit 245-1 controls the RU 25 via the control unit 242-1 so that the second channel band is narrowed with respect to the first channel band, the second time interval is shortened with respect to the first time interval, or the second wireless resource is reduced with respect to the first wireless resource.

The control unit 242-1 of the first DU 24-1 sets the maximum value of traffic that can be processed by the RU 25 as part of the 5G base station device (the second gNB 20-2) of the PLMN operator on the basis of the set first channel band and second channel band, the first time interval and second time interval, or the ratio of the first wireless resource and the second wireless resource. The control unit 242-1 notifies the information exchange unit 243-1 of information related to the set maximum value of the traffic. The information exchange unit 243-1 notifies the second DU 24-2 of the information on the maximum value of the traffic acquired from the control unit 242-1 via the network communication unit 244-1. The second DU 24-2 controls the amount of traffic to be processed by the processing unit 241-2 of the second DU 24-2 on the basis of the information related to the maximum value of the traffic notified from the first DU 24-1. Note that the control unit 242-1 of the first DU 24-1 may notify the information exchange unit 243-1 of the information regarding the second channel band, the second time interval, or the amount of the second wireless resource, and the information exchange unit 243-1 may notify the second DU 24-2 of the information regarding the second channel band, the second time interval, or the amount of the second wireless resource via the network communication unit 244-1. Here, the control unit 242 may include the function of the near-real time RIC 22.

Furthermore, the priority order determination unit 245-1 of the first DU 24-1 may dynamically control the first channel band and the second channel band of the operation band setting unit 2542 of the RU 25, the first time interval and the second time interval of the operation period setting unit 2543 of the RU 25, or the ratio of the first wireless resource and the second wireless resource of the wireless resource setting unit 2544 on the basis of a 5G QOS identifier (5QI) allocated to a radio bearer or a quality of service (QOS) flow or an allocation and retention priority (ARP).

The network communication unit 244 is a communication interface for communicating with a node positioned at a high level on the network (for example, the first CU 23-1 or the second CU 23-2). Furthermore, the network communication unit 244 is a communication interface for communicating with a node (RU 25) positioned at a lower level on the network. For example, the network communication unit 244 is a LAN interface such as an NIC. The network communication unit 244 can construct an F1 interface with the CU 23 or a front hole compliant with the eCPRI with the RU 25 via an optical fiber or Ethernet. The network communication unit 244 may be a wired interface or a wireless interface. Furthermore, the network communication unit 244 may construct a communication interface for communicating with another DU 24. Note that the network communication unit 244 may perform VPN connection when connecting to another device.

The processing unit 241 receives the PDU processed by the PDCP sublayer from the CU 23 via the network communication unit 244. The processing unit 241 transmits the PDU processed by the RLC unit 2411 to the CU 23 via the network communication unit 244. Furthermore, the processing unit 241 receives an IQ sample string of orthogonal frequency division multiplexing (OFDM) in the frequency domain to which FFT is applied from the RU 25 via the network communication unit 244. The processing unit 241 transmits the OFDM IQ sample sequence in the frequency domain subjected to the RE mapping by the HIGH-PHY unit 2413 to the RU 25.

The embodiment in which the PLMN shares the local 5G base station device in a case where a service of operation and management of the cloud-based core network for the local 5G base station device is provided by an operator different from the PLMN has been described above. The management device 50 dynamically unifies (orchestrates) a setting necessary for sharing the base station device (gNB 20) installed by the microoperator or the RU 25 between the microoperator and the PLMN operator, on the basis of the information such as the capability of the base station device (gNB 20) installed by the microoperator or the RU 25, the license frequency or the shared frequency allocated to the PLMN operator or the microoperator, or the traffic volume processed by the base station device (gNB 20) or the RU 25, or the QoS, among the base station devices (gNB 20), or between the devices of the RU 25, the DU 24, and the CU 23 and different domains of the microoperator, the service provider, and the PLMN operator. Although FIG. 7 or 10 illustrates an example in which the microoperator manages and operates the management device 50, the service provider may manage and operate the management device 50. Moreover, the service provider may configure the functions of management device 50 as one or more NFs of the core network (first NGC 30-1).

[4.2. In a Case where a PLMN Operator Provides Cloud-Based Core Network Operation and Management Services]

Figure 18:
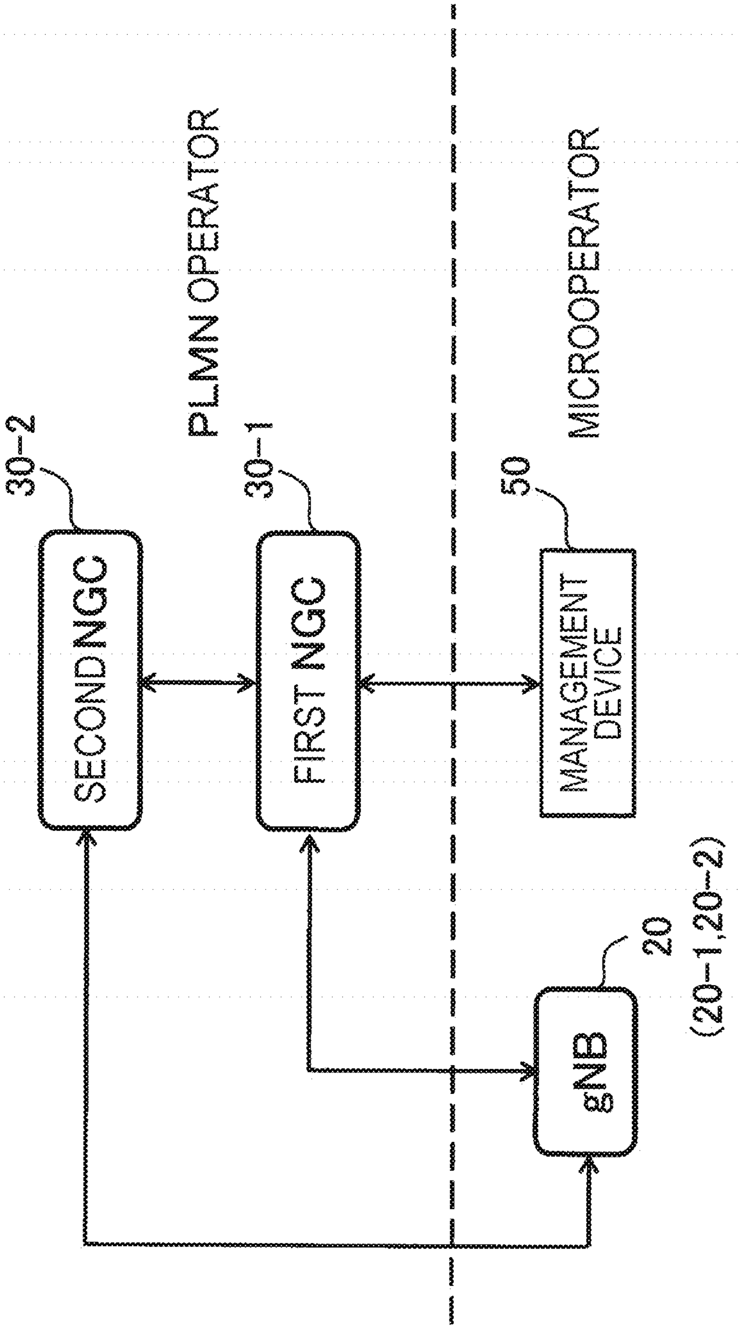
FIG. 18 is a diagram illustrating a configuration of a local 5G in a case where a PLMN operator provides services of operation and management of a cloud-based core network.

FIG. 18 is a diagram illustrating a configuration of the local 5G in a case where a PLMN operator provides a cloud-based core network operation and management service. The base station device (gNB 20) installed by the microoperator is connected to a cloud-based core network (first NGC 30-1) provided by the PLMN as NaaS to the microoperator to constitute a first gNB 20-1 that is a local 5G base station device. Here, the PLMN operator may construct a local network independent of the public network for the microoperator in the public network domain. Moreover, the PLMN operator may construct a respective independent local network for one or more microoperators in the public network domain. A local network independent of the public network can be assigned an independent identifier or address without depending on the public network. Each independent local network can be assigned an independent identifier or an address without depending on another local network. Furthermore, the base station device (gNB 20) is connected to a core network (second NGC 30-2) operated and managed by the PLMN operator, and configures a second gNB 20-2 which is a 5G base station device of the PLMN operator. The microoperator enters into an SLA with the PLMN operator so that the first NGC 30-1 is connected with the second NGC 30-2 within the scope of the SLA conditions. The management device 50 is connected to the first NGC 30-1 and controls a base station device (gNB 20) that operates as a local 5G base station device (first gNB 20-1) or a base station device (gNB 20) that operates as a PLMN operator's 5G base station device (second gNB 20-2).

The network communication unit 207 of the base station device (gNB 20) constructs a first GTP-U (GPRS Tunneling Protocol for User Plane) for the local 5G base station device (first gNB 20-1) with the UPF 330-1 of the first NGC 30-1, and constructs a second GTP-U for the PLMN operator's 5G base station device (second gNB 20-2) with the UPF 330-2 of the second NGC 30-2.

Figure 19:
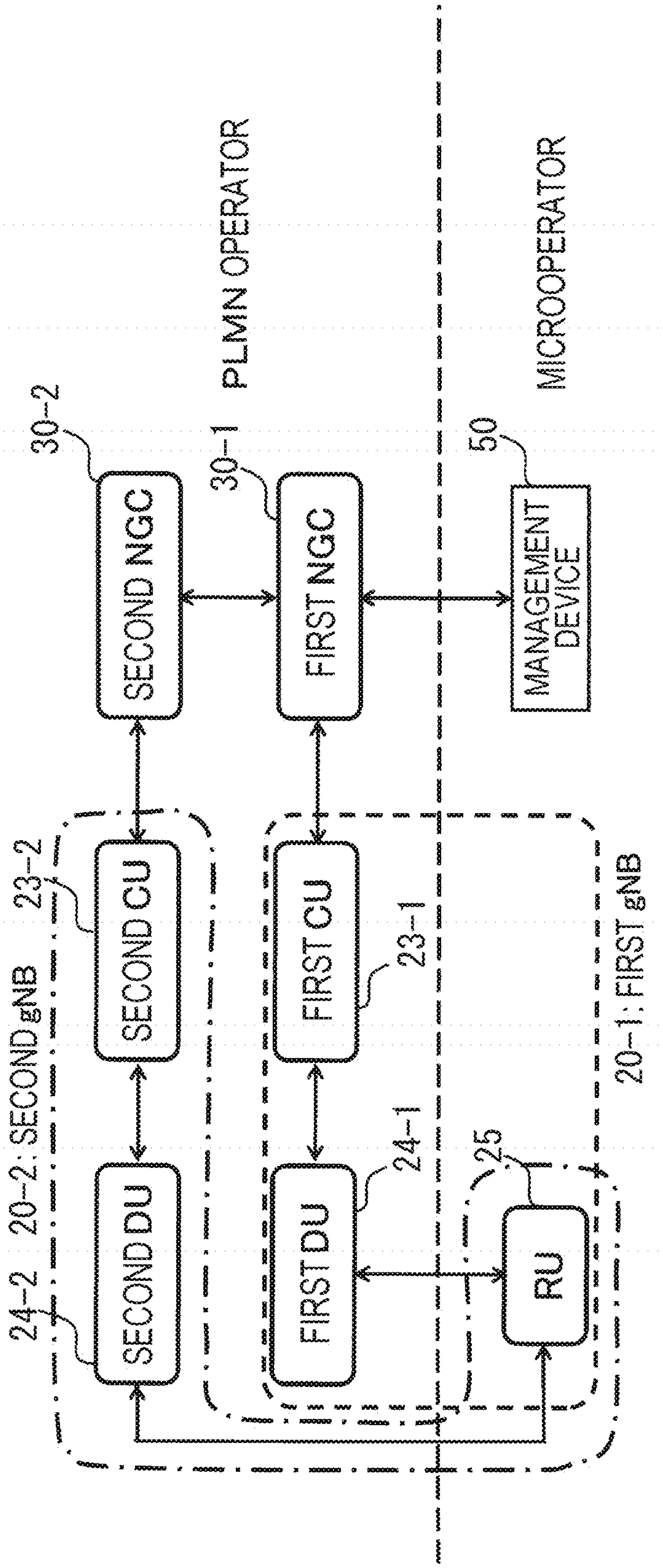
FIG. 19 is a diagram illustrating a configuration of a local 5G in a case where a PLMN operator provides services of operation and management of a cloud-based core network, a CU, and a DU.

FIG. 19 is a diagram illustrating a configuration of the local 5G in a case where a PLMN operator provides services of operation and management of a cloud-based core network, a CU, and a DU. The RU 25 installed by the microoperator is connected to a cloud-based core network (the first NGC 30-1) that the PLMN provides as NaaS to the microoperator, the first CU 23-1, and the first DU 24-1 to constitute the first gNB 20-1 that is a base station device of the local 5G.

Furthermore, the RU 25 is connected to a core network (the second NGC 30-2) operated and managed by the PLMN operator, the second CU 23-2, and the second DU 24-2, and constitutes the second gNB 20-2 which is a 5G base station device of the PLMN operator.

The microoperator enters into an SLA with the PLMN operator so that the first NGC 30-1 is connected with the second NGC 30-2 within the scope of the SLA conditions. The management device 50 is connected to the first NGC 30-1 and controls the RU 25 operating as part of the local 5G base station device (the first gNB 20-1) or the RU 25 operating as part of the PLMN operator's 5G base station device (the second gNB 20-2).

Furthermore, the management device 50 instructs the first CU 23-1 to set an information exchange unit (not illustrated herein) for exchanging information with the second CU 23-2.

The network communication unit 255 of the RU 25 constructs a first fronthaul for the local 5G base station device (the first gNB 20-1) with the first DU 24-1 and a second fronthaul for the PLMN operator's 5G base station device (the second gNB 20-2) with the second DU 24-2.

Note that the UE 10 has a subscription with at least a microoperator or a PLMN operator, and can use a local 5G service or a public 5G service.

[4.2.1. Setting of Operation Frequency]

First, as a precondition, a first licensed frequency band dedicated to the local 5G is allocated to the microoperator, and a second licensed frequency band dedicated to the 5G service of the PLMN is allocated to the PLMN operator. Furthermore, the wireless front end unit 201 of the base station device (gNB 20) illustrated in FIG. 9 or the wireless front end unit 251 of the RU 25 illustrated in FIG. 11 is equipped with hardware for operating in the first licensed frequency band and the second licensed frequency band. Here, the management device 50 manages, as the capability information of the base station device (gNB 20) or the RU 25, the number of transmission units, the number of reception units, the RAT type corresponding to each transmission unit or each reception unit, the duplex method, the configuration of the antenna including the number of antenna ports, the RF parameter (for example, a list of supported NR operation frequency bands, a list of supported band combinations, maximum output power, and a channel band for each operation frequency band), and the like.

The control unit 502 of the management device 50 specifies the first licensed frequency band allocated as dedicated to the local 5G of the microoperator on the basis of the licensed frequency band information managed by the licensed frequency band information management unit 5011. Moreover, the control unit 502 confirms that the wireless front end unit 201 of the base station device (gNB 20) supports the operation in the first licensed frequency band on the basis of the capability information managed by the capability information management unit 5012.

The management device 50 instructs the operation frequency setting unit 2061 of the base station device (gNB 20) to set the first licensed frequency band via the core network (first NGC 30-1) of the local 5G base station device (first gNB 20-1). The base station device (gNB 20) starts operation in the first licensed frequency band as a base station device (first gNB 20-1) of local 5G.

Subsequently, the information exchange unit 503 of the management device 50 receives a message requesting the base station device (gNB 20) to operate as the 5G base station device (second gNB 20-2) of the PLMN operator from the core network (second NGC 30-2) operated and managed by the PLMN operator. This message includes, for example, a PLMN ID for identifying a PLMN operator.

The control unit 502 of the management device 50 specifies the second licensed frequency band allocated only for the 5G service of the PLMN on the basis of the PLMN ID and the licensed frequency band information managed by licensed frequency band information management unit 5011. Moreover, the control unit 502 confirms that the wireless front end unit 201 of the base station device (gNB 20) supports the operation in the second licensed frequency band on the basis of the capability information managed by the capability information management unit 5012. After the confirmation, the information exchange unit 503 of the management device 50 returns a response indicating that a request for operating the base station device (gNB 20) as the 5G base station device (second gNB 20-2) of the PLMN operator is accepted to the second NGC 30-2. On the other hand, in a case where the wireless front end unit 201 of the base station device (gNB 20) does not support the operation in the second licensed frequency band, the information exchange unit 503 of the management device 50 returns a response indicating rejection of the request to the second NGC 30-2. Note that, in a case where a plurality of frequency bands is allocated as the second licensed frequency band, the PLMN operator may include information regarding priorities of the plurality of frequency bands in the message described above. The control unit 502 of the management device 50 confirms that the wireless front end unit 201 of the base station device (gNB 20) supports an operation in a frequency band with a higher priority among a plurality of frequency bands on the basis of the information regarding the priority and the capability information managed by the capability information management unit 5012.

The second NGC 30-2 that has received the response indicating that the request for operating the base station device (gNB 20) as the PLMN operator's 5G base station device (second gNB 20-2) is accepted provides the management device 50 with information regarding the connection destination (for example, the UPF 330) of the second NGC 30-2. Here, the information regarding the connection destination is, for example, an IP address and a UDP port number, a transport network layer (TNL) address such as a TCP port number, a MAC address, an access point name (APN), a data network name (DNN), or the like. The management device 50 that has received the information related to the connection destination constructs a GPRS tunneling protocol for user plane (GTP-U) between the base station device (gNB 20) and the UPF 330-2 of the second NGC 30-2, for example.

Alternatively, the information exchange unit 503 of the management device 50 may include the information related to the connection destination of the base station device (gNB 20) in the response indicating that the request for operating the base station device (gNB 20) as the 5G base station device (second gNB 20-2) of the PLMN operator is accepted. The second NGC 30-2 that has received the information related to the connection destination constructs a GTP-U between the UPF 330-2 and the base station device (gNB 20), for example.

The management device 50 instructs the operation frequency setting unit 2061 to set the second licensed frequency band to the base station device (gNB 20) via the core network (first NGC 30-1) of the local 5G base station device (first gNB 20-1). The operation frequency setting unit 2061 sets the second licensed frequency band as the operating frequency band of the base station device (gNB 20), and the base station device (gNB 20) starts operation in the second licensed frequency band as the 5G base station device (second gNB 20-1) of the PLMN operator, in addition to operation in the first licensed frequency band as the local 5G base station device (first gNB 20-2). Note that the base station device (gNB 20) is not allowed to operate in the second licensed frequency band as the base station device (first gNB 20-1) of the local 5G. Here, operating as the local 5G base station device (first gNB 20-1) means broadcasting identification information for identifying the microoperator's network, for example, system information including the SNPN ID, and operating as the PLMN operator's 5G base station device (second gNB 20-2) means broadcasting identification information for identifying the PLMN operator's network, for example, system information including the PLMN ID.

Note that the above-described message requesting the base station device (gNB 20) to operate as the 5G base station device (second gNB 20-2) of the PLMN operator may include information regarding the second licensed frequency band permitted to be used in advance. In this case, the control unit 502 of the management device 50 may determine whether to accept the request or reject the request on the basis of the information related to the second licensed frequency band included in the message and the capability information managed by the capability information management unit 5012. Here, the information related to the second licensed frequency band may be information related to one frequency band or information related to a plurality of frequency bands.

Furthermore, the core network (first NGC 30-1) of the base station device (first gNB 20-1) of the local 5G may receive the above-described message including the information related to the second licensed frequency band permitted to be used in advance from the core network (second NGC 30-2) operated and managed by the PLMN operator, and determine to accept or reject the request on the basis of the capability information of the base station device (gNB 20) managed by the first NGC 30-1. As in the modification of this embodiment, since the function of the management device 50 can be processed by another device, the management device 50 is not necessarily an essential entity.

The mapping unit 2065 of the base station device (gNB 20) performs mapping so that data transmitted and received via the first NGC 30-1 is transmitted and received using the first licensed frequency band, and performs mapping so that data transmitted and received via the second NGC 30-2 is transmitted and received using the second licensed frequency band. That is, the mapping unit 2065 performs mapping between the TNL, the GTP-TEID, or the PDU session and the frequency band.

Note that in a case where the PLMN operator receives a request for using a specific network slice from the UE 10, the PLMN operator may transmit, from the second NGC 30-2 to the management device 50, a message requesting the base station device (gNB 20) to operate as the 5G base station device (second gNB 20-2) of the PLMN operator. Here, S-NSSAI, which is information for assisting selection of a network slice, is allocated to each network slice, and the network slice can be identified by the S-NSSAI. The S-NSSAI is configured as a set of mandatory (mandatory) slice/service type (SST) including 8 bits for identifying a slice type (slice type) and optional (optional) slice differentiator (SD) including 24 bits for distinguishing different slices in the same SST.

Furthermore, the management device 50 may disclose a list of network slices (list including one or more pieces of S-NSSAI) that can be supported by the base station device (gNB 20) to the second NGC 30-2. Moreover, the management device 50 may disclose information regarding the communication quality of the base station device (gNB 20), for example, parameters and load information regarding QoS such as a guaranteed flow bit rate (GFBR), a maximum flow bit rate (MFBR), a packet delay budget (PDB), and a packet error rate (PER) to the second NGC 30-2. Furthermore, the management device 50 may disclose information related to the installation position of the base station device (gNB 20) to the second NGC 30-2. The second NGC 30-2 can determine whether to send a message to the management device 50 requesting the base station device (gNB 20) to operate as a PLMN operator's 5G base station device (second gNB 20-2) on the basis of at least one of a published list of available network slices, information regarding communication quality, or information regarding an installation position.

From the above, the base station device (gNB 20) can operate in the first licensed frequency band as the local 5G base station device (first gNB 20-1) and operate in the second licensed frequency band as the PLMN operator's 5G base station device (second gNB 20-2).

Furthermore, the control unit 502 of the management device 50 confirms that the wireless front end unit 251 of the RU 25 supports the operation in the first licensed frequency band on the basis of the capability information managed by the capability information management unit 5012.

The management device 50 instructs the operation frequency setting unit 2541 of the RU 25 to set the first licensed frequency band via the core network (the first NGC 30-1) of the base station device (the first gNB 20-1) of the local 5G. The RU 25 begins operating in the first licensed frequency band as part of the local 5G base station device (first gNB 20-1).

Subsequently, the information exchange unit 503 of the management device 50 receives a message from the core network (the second NGC 30-2) operated and managed by the PLMN operator, requesting that the RU 25 be operated as a part of the 5G base station device (the second gNB 20-2) of the PLMN operator. This message includes, for example, a PLMN ID for identifying a PLMN operator.

The control unit 502 of the management device 50 specifies the second licensed frequency band allocated only for the 5G service of the PLMN on the basis of the PLMN ID and the licensed frequency band information managed by licensed frequency band information management unit 5011. Moreover, the control unit 502 confirms that the wireless front end unit 251 of the RU 25 supports operation in the second licensed frequency band on the basis of the capability information managed by the capability information management unit 5012. After the confirmation, the information exchange unit 503 of the management device 50 returns to the second NGC 30-2 a response indicating that it accepts a request to operate the RU 25 as part of the PLMN operator's 5G base station device (the second gNB 20-2). On the other hand, in a case where the wireless front end unit 251 of the RU 25 does not support operation in the second licensed frequency band, the information exchange unit 503 of the management device 50 returns a response indicating rejection of the request to the second NGC 30-2. Note that, in a case where a plurality of frequency bands is allocated as the second licensed frequency band, the PLMN operator may include information regarding priorities of the plurality of frequency bands in the message described above. On the basis of the information regarding the priority and the capability information managed by the capability information management unit 5012, the control unit 502 of the management device 50 confirms that the wireless front end unit 251 of the RU 25 supports operation in a frequency band with a higher priority among a plurality of frequency bands.

Upon receiving the response indicating that the request for operating the RU 25 as a part of the PLMN operator's 5G base station device (second gNB 20-2) is accepted, the second NGC 30-2 provides the management device 50 with information regarding the connection destination of the second DU 24-2. Here, the information regarding the connection destination is, for example, an IP address and a UDP port number, a transport network layer (TNL) address such as a TCP port number, a MAC address, an access point name (APN), a data network name (DNN), or the like. Upon receiving the information related to the connection destination, the management device 50 constructs a fronthaul between the RU 25 and the second DU 24-2, for example.

Alternatively, the information exchange unit 503 of the management device 50 may include the information related to the connection destination of the RU 25 in the response indicating that the request for operating the RU 25 as a part of the 5G base station device (second gNB 20-2) of the PLMN operator is accepted. The second NGC 30-2 that has received the information related to the connection destination constructs a fronthaul between the second DU 24-2 and the RU 25, for example.

The management device 50 instructs the operation frequency setting unit 2541 of the RU 25 to set the second licensed frequency band via the core network (first NGC 30-1) of the base station device (first gNB 20-1) of the local 5G. The operation frequency setting unit 2541 sets the second licensed frequency band as the operation frequency band of RU 25, and RU 25 starts operating in the second licensed frequency band as part of the 5G base station device (second gNB 20-1) of the PLMN operator, in addition to operating in the first licensed frequency band as part of the local 5G base station device (first gNB 20-2). Note that the RU 25 is not allowed to operate in the second licensed frequency band as part of the local 5G base station device (the first qNB 20-1). Here, operating as part of the local 5G base station device (first gNB 20-1) means broadcasting system information including identification information for identifying the microoperator's network, for example, the SNPN ID, and operating as part of the PLMN operator's 5G base station device (second gNB 20-2) means broadcasting system information including identification information for identifying the PLMN operator's network, for example, the PLMN ID.

Note that the above-described message requesting the RU 25 to operate as a part of the PLMN operator's 5G base station device (the second gNB 20-2) may include information regarding the second licensed frequency band permitted to be used in advance. In this case, the control unit 502 of the management device 50 may determine whether to accept the request or reject the request on the basis of the information related to the second licensed frequency band included in the message and the capability information managed by the capability information management unit 5012. Here, the information related to the second licensed frequency band may be information related to one frequency band or information related to a plurality of frequency bands.

Furthermore, the core network (first NGC 30-1) of the local 5G base station device (first gNB 20-1) may receive the above-described message including the information related to the second licensed frequency band permitted to be used in advance from the core network (second NGC 30-2) operated and managed by the PLMN operator, and determine to accept or reject the request on the basis of the capability information of the RU 25 managed by the first NGC 30-1.

The operation frequency setting unit 2541 notifies the first DU 24-1 that the first licensed frequency band is allocated and notifies the second DU 24-2 that the second licensed frequency band is allocated via the network communication unit 255.

Here, in a case where the second gNB 20-2 operates in a frequency band different from that of the first gNB 20-1, each of the second CUs 23-2 or the first CUs 23-1 constituting each base station (second gNB 20-2 or first gNB 20-1) can process RRC. That is, the system information of the second gNB 20-2 is controlled by the second CU 23-2, and the system information of the first gNB 20-1 is controlled by the first CU 23-1.

In accordance with the processing of the mapping unit illustrated in FIG. 12 described above, the mapping unit 2545 of the RU 25 performs mapping so that data transmitted and received via the first DU 24-1 is transmitted and received by using the first licensed frequency band, and performs mapping so that data transmitted and received via the second DU 24-2 is transmitted and received by using the second licensed frequency band. That is, the mapping unit 2545 performs mapping between a wireless bearer, a TNL, or a PDU session and a frequency band.

Note that, in a case where the PLMN operator receives a request for using a specific network slice from the UE 10, the PLMN operator may transmit, from the second NGC 30-2 to the management device 50, a message requesting the RU 25 to operate as a part of the PLMN operator's 5G base station device (the second qNB 20-2). Here, S-NSSAI, which is information for assisting selection of a network slice, is allocated to each network slice, and the network slice can be identified by the S-NSSAI.

Furthermore, the management device 50 may disclose a list of network slices (a list including one or more S-NSSAI) that can be supported by the RU 25 to the second NGC 30-2. Moreover, the management device 50 may disclose information regarding the communication quality of the RU 25, for example, parameters regarding QoS such as a guaranteed flow bit rate (GFBR), a maximum flow bit rate (MFBR), a packet delay budget (PDB), and a packet error rate (PER), and load information to the second NGC 30-2. Furthermore, the management device 50 may disclose information related to the installation position of the RU 25 to the second NGC 30-2. The second NGC 30-2 can determine whether to send a message to the management device 50 requesting that the RU 25 be operated as part of a PLMN operator's 5G base station device (the second gNB 20-2) on the basis of at least one of a published list of available network slices, information relating to communication quality, and information relating to an installation location.

From the above, RU 25 can operate in the first licensed frequency band as part of the local 5G base station device (first gNB 20-1) and can operate in the second licensed frequency band as part of the PLMN operator's 5G base station device (second gNB 20-2).

Furthermore, in a case where the microoperator is allowed to use the first shared frequency band, RU 25 may operate on the first shared frequency band in addition to the first licensed frequency band as part of the local 5G base station device (first gNB 20-1).

Furthermore, in a case where the PLMN operator is allowed to use the second shared frequency band, RU 25 may operate on the second shared frequency band in addition to the second licensed frequency band as part of the PLMN operator's 5G base station device (second gNB 20-2).

[4.2.2. Setting of Operation Band]

First, as a precondition, a first licensed frequency band dedicated to local 5G is allocated to the microoperator, and the RU 25 may operate on this first licensed frequency band.

The control unit 502 of the management device 50 confirms that the wireless front end unit 251 of the RU 25 supports operation in the first licensed frequency band on the basis of the capability information managed by the capability information management unit 5012.

The management device 50 instructs the operation frequency setting unit 2541 of the RU 25 to set the first licensed frequency band via the core network (the first NGC 30-1) of the base station device (the first gNB 20-1) of the local 5G. The RU 25 begins operating in the first licensed frequency band as part of the local 5G base station device (first gNB 20-1).

Subsequently, the information exchange unit 503 of the management device 50 receives a message from the core network (the second NGC 30-2) operated and managed by the PLMN operator, requesting that the RU 25 be operated as a part of the 5G base station device (the second gNB 20-2) of the PLMN operator. This message includes, for example, a PLMN ID for identifying a PLMN operator.

The control unit 502 of the management device 50 specifies the second licensed frequency band allocated only for the 5G service of the PLMN on the basis of the PLMN ID and the licensed frequency band information managed by licensed frequency band information management unit 5011. The control unit 502 confirms that the wireless front end unit 251 of the RU 25 does not support operation in the second licensed frequency band on the basis of the capability information managed by the capability information management unit 5012. After the checking, the control unit 502 checks whether the operation band setting unit 2542 of the RU 25 can divide the channel band in the first licensed frequency band. In a case where the operation band setting unit 2542 can divide the channel band, the information exchange unit 503 of the management device 50 returns, to the second NGC 30-2, a response indicating that a request for operating the RU 25 as a part of the 5G base station device (the second gNB 20-2) of the PLMN operator is accepted. On the other hand, in a case where the operation band setting unit 2542 cannot divide the channel band, the information exchange unit 503 of the management device 50 returns a response indicating rejection of the request to the second NGC 30-2. Here, each of the divided channel bands is treated as a component carrier (CC). Note that, in a case where a plurality of frequency bands is allocated as the second licensed frequency band, the PLMN operator may include information regarding priorities of the plurality of frequency bands in the message described above. On the basis of the information regarding the priority and the capability information managed by the capability information management unit 5012, the control unit 502 of the management device 50 confirms that the wireless front end unit 251 of the RU 25 supports operation in a frequency band with a higher priority among a plurality of frequency bands.

In a case where the management device 50 receives a request to operate the RU 25 as part of the PLMN operator's 5G base station device (the second gNB 20-2), the operation band setting unit 2542 of the RU 25 is instructed to set the first channel band and the second channel band via the core network (the first NGC 30-1) of the local 5G base station device (the first gNB 20-1). Here, the first channel band is a channel band for the RU 25 operating as a part of the local 5G base station device (the first gNB 20-1). Furthermore, the second channel band is a channel band for the RU 25 that operates as a part of the PLMN operator's 5G base station device (the second gNB 20-2).

The operation band setting unit 2542 of the RU 25 notifies, via the network communication unit 255, the first DU 24-1 that the first channel band of the first licensed frequency band is allocated, and notifies the second DU 24-2 that the second channel band of the first licensed frequency band is allocated.

Here, in a case where the second gNB 20-2 operates in the same frequency band as the first gNB 20-1, the first CU 23-1 constituting the first gNB 20-1 processes the RRC of the second gNB 20-2 in addition to the first gNB 20-1. Therefore, the second CU 23-2 constituting the second gNB 20-2 provides the first CU 23-1 with information necessary for processing the RRC of the second gNB 20-2. The information necessary for processing the RRC is, for example, information regarding system information. Furthermore, the first CU 23-1 may permit the second CU 23-2 to process the RRC of the second gNB 20-2 within the second channel band. Here, the information necessary for processing the RRC of the second gNB 20-2 is acquired by a request to the second CU 23-2 and a response to the first CU 23-1, or by a procedure of registration/subscription to the second CU 23-2 and notification to the first CU 23-1, or update.

In accordance with the processing of the mapping unit illustrated in FIG. 13 described above, the mapping unit 2545 of the RU 25 performs mapping such that data transmitted and received via the first DU 24-1 is transmitted and received using the first channel band, and performs mapping such that data transmitted and received via the second DU 24-2 is transmitted and received using the second channel band. That is, the mapping unit 2545 performs mapping between a wireless bearer, a TNL, or a PDU session and a channel band.

From the above, RU 25 can operate in the first channel band of the first licensed frequency band as part of the local 5G base station device (first gNB 20-1), and can operate in the second channel band of the first licensed frequency band as part of the PLMN operator's 5G base station device (second gNB 20-2). Although the embodiment in which the RU 25 is operated in the second channel band of the first licensed frequency band as a part of the PLMN operator's 5G base station device (the second gNB 20-2) has been described here, the base station device (gNB 20) can be operated in the second channel band of the first licensed frequency band as the PLMN operator's 5G base station device (the second gNB 20-2) in a similar manner.

Furthermore, in a case where the microoperator is allowed to use the first shared frequency band, the management device 50 may instruct the operation band setting unit 2542 of the RU 25 to set the third channel band and the fourth channel band in the first shared frequency band. The mapping unit 2545 performs mapping such that data transmitted and received via the first DU 24-1 is transmitted and received using the third channel band, and performs mapping such that data transmitted and received via the second DU 24-2 is transmitted and received using the fourth channel band. That is, RU 25 can operate in the third channel band of the first shared frequency band as part of the local 5G base station device (first gNB 20-1) and can operate in the fourth channel band of the first shared frequency band as part of the PLMN operator's 5G base station device (second gNB 20-2).

Note that, in a case where the use of the first licensed frequency band or the first shared frequency band is not allowed by the PLMN operator in the legal system, the PLMN operator can enter into a roaming agreement as a service level agreement (SLA) with the microoperator, and use the RU 25 operating in the first licensed frequency band or the first shared frequency band as the RU 25 of the roaming destination. That is, the RU 25 can operate in the first channel band of the first licensed frequency band or the third channel band of the first shared frequency band as a part of the base station device (the first gNB 20-1) of the local 5G, and operate in the second channel band of the first licensed frequency band or the fourth channel band of the first shared frequency band as a part of the base station device (the second gNB 20-2) of the 5G visitor PLMN (that is, the microoperator).

Furthermore, the operation band setting unit 2542 of the RU 25 may further set a bandwidth part (BWP) in each channel band. The UE 10 does not necessarily need to use the entire channel band depending on the size of data transmitted and received via the RU 25. A set of BWPs configured by dividing each channel band into a plurality of BWPs is defined in advance, and the operation band setting unit 2542 can adaptively set one BWP from the set of BWPs of each channel band as the Active BWP for each UE 10.

[4.2.3. Setting of Operation Period]

First, as a precondition, a first licensed frequency band dedicated to local 5G is allocated to the microoperator, and the RU 25 may operate on this first licensed frequency band.

The control unit 502 of the management device 50 confirms that the wireless front end unit 251 of the RU 25 supports operation in the first licensed frequency band on the basis of the capability information managed by the capability information management unit 5012.

The management device 50 instructs the operation frequency setting unit 2541 of the RU 25 to set the first licensed frequency band via the core network (the first NGC 30-1) of the base station device (the first gNB 20-1) of the local 5G. The RU 25 begins operating in the first licensed frequency band as part of the local 5G base station device (first gNB 20-1).

Subsequently, the information exchange unit 503 of the management device 50 receives a message from the core network (the second NGC 30-2) operated and managed by the PLMN operator, requesting that the RU 25 be operated as a part of the 5G base station device (the second gNB 20-2) of the PLMN operator. This message includes, for example, a PLMN ID for identifying a PLMN operator.

The control unit 502 of the management device 50 specifies the second licensed frequency band allocated only for the 5G service of the PLMN on the basis of the PLMN ID and the licensed frequency band information managed by licensed frequency band information management unit 5011. The control unit 502 confirms that the wireless front end unit 251 of the RU 25 does not support operation in the second licensed frequency band on the basis of the capability information managed by the capability information management unit 5012. After the checking, the control unit 502 checks whether the operation period setting unit 2543 of the RU 25 can divide the time interval in the first licensed frequency band. Here, the operation period setting unit 2543 of the RU 25 determines that the division is possible, for example, in a case where the time interval after the division is longer than or equal to a preset time interval. In a case where the operation period setting unit 2543 can divide the time interval, the information exchange unit 503 of the management device 50 returns, to the second NGC 30-2, a response indicating that a request for operating the RU 25 as a part of the 5G base station device (the second gNB 20-2) of the PLMN operator is accepted. On the other hand, in a case where the operation period setting unit 2543 cannot divide the time interval, the information exchange unit 503 of the management device 50 returns a response indicating rejection of the request to the second NGC 30-2. Here, each time interval is set, for example, in units of slots. Note that, in a case where a plurality of frequency bands is allocated as the second licensed frequency band, the PLMN operator may include information regarding priorities of the plurality of frequency bands in the message described above. On the basis of the information regarding the priority and the capability information managed by the capability information management unit 5012, the control unit 502 of the management device 50 confirms that the wireless front end unit 251 of the RU 25 supports operation in a frequency band with a higher priority among a plurality of frequency bands.

In a case where management device 50 receives a request to operate RU 25 as part of a PLMN operator's 5G base station device (second gNB 20-2), it instructs, via the core network (first NGC 30-1) of the local 5G base station device (first gNB 20-1), operation period setting unit 2543 of RU 25 to set the first time interval and the second time interval. Here, the first time interval is a time interval for the RU 25 operating as part of the local 5G base station device (the first gNB 20-1). Furthermore, the second time interval is the time interval for the RU 25 operating as part of the PLMN operator's 5G base station device (the second gNB 20-2).

The operation period setting unit 2543 of the RU 25 notifies, through the network communication unit 255, the first DU 24-1 that the first time interval of the first licensed frequency band is allocated, and notifies the second DU 24-2 that the second time interval of the first licensed frequency band is allocated.

Here, in a case where the second gNB 20-2 operates in the same frequency band as the first gNB 20-1, the first CU 23-1 constituting the first gNB 20-1 processes the RRC of the second gNB 20-2 in addition to the first gNB 20-1. Therefore, the second CU 23-2 constituting the second gNB 20-2 provides the first CU 23-1 with information necessary for processing the RRC of the second gNB 20-2. The information necessary for processing the RRC is, for example, information regarding system information. Here, the information necessary for processing the RRC of the second gNB 20-2 is acquired by a request to the second CU 23-2 and a response to the first CU 23-1, or by a procedure of registration/subscription to the second CU 23-2 and notification to the first CU 23-1, or update.

In accordance with the processing of the mapping unit illustrated in FIG. 14 described above, the mapping unit 2545 of the RU 25 performs mapping so that data transmitted and received via the first DU 24-1 is transmitted and received by using the first time interval, and performs mapping so that data transmitted and received via the second DU 24-2 is transmitted and received by using the second time interval. That is, the mapping unit 2545 performs mapping between the wireless bearer, the TNL, or the PDU session and the time interval.

From the above, RU 25 can operate in the first time interval of the first licensed frequency band as part of the local 5G base station device (first gNB 20-1), and operate in the second time interval of the first licensed frequency band as part of the PLMN operator's 5G base station device (second gNB 20-2). Although the embodiment in which the RU 25 is operated as part of the PLMN operator's 5G base station device (second gNB 20-2) at the second time interval of the first licensed frequency band has been described here, the base station device (gNB 20) can be operated as the PLMN operator's 5G base station device (second gNB 20-2) at the second time interval of the first licensed frequency band in a similar manner.

Furthermore, in a case where the microoperator is allowed to use the first shared frequency band, the management device 50 may instruct the operation period setting unit 2543 of the RU 25 to set the third time interval and the fourth time interval. The mapping unit 2545 performs mapping such that data transmitted and received via the first DU 24-1 is transmitted and received by using a third time interval, and performs mapping such that data transmitted and received via the second DU 24-2 is transmitted and received by using a fourth time interval. That is, RU 25 can operate in the third time interval of the first shared frequency band as part of the local 5G base station device (first gNB 20-1) and operate in the fourth time interval of the first shared frequency band as part of the PLMN operator's 5G base station device (second gNB 20-2).

Note that, in a case where the use of the first licensed frequency band or the first shared frequency band is not allowed by the PLMN operator in the legal system, the PLMN operator can enter into a roaming agreement with the microoperator as an SLA, and use the RU 25 operating in the first licensed frequency band or the first shared frequency band as the RU 25 of the roaming destination. That is, the RU 25 can operate at the first time interval of the first licensed frequency band or the third time interval of the first shared frequency band as part of the base station device of the local 5G (the first gNB 20-1), and operate at the second time interval of the first licensed frequency band or the fourth time interval of the first shared frequency band as part of the base station device of the 5G visitor PLMN (that is, the microoperator) (the second gNB 20-2).

Furthermore, the RU 25 supports a frequency division duplex (FDD) or time division duplex (TDD) duplex system according to an operation frequency band. In the case of FDD, the same time interval (a first time interval, or a second time interval) is set in the transmission band and the reception band, and the time intervals of the transmission band and the reception band are synchronized in timing. In the case of TDD, since the ratio between the transmission period and the reception period is variable according to the traffic, time intervals (a first time interval or a second time interval that is set in the sending period, and a first time interval or a second time interval that is set in the receiving period) set to the transmission period and the reception period can be set to different periods.

[4.2.4. Wireless Resource Setting]

First, as a precondition, a first licensed frequency band dedicated to local 5G is allocated to the microoperator, and the RU 25 may operate on this first licensed frequency band.

The control unit 502 of the management device 50 confirms that the wireless front end unit 251 of the RU 25 supports operation in the first licensed frequency band on the basis of the capability information managed by the capability information management unit 5012.

The management device 50 instructs the operation frequency setting unit 2541 of the RU 25 to set the first licensed frequency band via the core network (the first NGC 30-1) of the base station device (the first gNB 20-1) of the local 5G. The RU 25 begins operating in the first licensed frequency band as part of the local 5G base station device (first gNB 20-1).

Subsequently, the information exchange unit 503 of the management device 50 receives a message from the core network (the second NGC 30-2) operated and managed by the PLMN operator, requesting that the RU 25 be operated as a part of the 5G base station device (the second gNB 20-2) of the PLMN operator. This message includes, for example, a PLMN ID for identifying a PLMN operator.

The control unit 502 of the management device 50 specifies the second licensed frequency band allocated only for the 5G service of the PLMN on the basis of the PLMN ID and the licensed frequency band information managed by licensed frequency band information management unit 5011. The control unit 502 confirms that the wireless front end unit 251 of the RU 25 does not support operation in the second licensed frequency band on the basis of the capability information managed by the capability information management unit 5012. After the checking, the control unit 502 of the management device 50 checks whether the wireless resource setting unit 2544 of the RU 25 can divide the wireless resources in the first licensed frequency band. Here, the wireless resource setting unit 2544 of the RU 25 determines that the division is possible, for example, in a case where the divided wireless resources are more than or equal to the number of wireless resources set in advance. In a case where the wireless resource setting unit 2544 can divide the wireless resources, the information exchange unit 503 of the management device 50 returns a response indicating that a request for operating the RU 25 as a part of the 5G base station device (the second gNB 20-2) of the PLMN operator is accepted to the second NGC 30-2. On the other hand, in a case where the wireless resource setting unit 2544 cannot divide the wireless resources, the information exchange unit 503 of the management device 50 returns a response indicating rejection of the request to the second NGC 30-2. Here, each wireless resource is set, for example, in units of resource elements (REs) or resource blocks (RBs). Note that, in a case where a plurality of frequency bands is allocated as the second licensed frequency band, the PLMN operator may include information regarding priorities of the plurality of frequency bands in the message described above. On the basis of the information regarding the priority and the capability information managed by the capability information management unit 5012, the control unit 502 of the management device 50 confirms that the wireless front end unit 251 of the RU 25 supports operation in a frequency band with a higher priority among a plurality of frequency bands.

In a case where the management device 50 receives a request to operate the RU 25 as part of the PLMN operator's 5G base station device (the second gNB 20-2), the management device 50 instructs the wireless resource setting unit 2544 of the RU 25 to configure the first wireless resource and the second wireless resource via the core network (the first NGC 30-1) of the local 5G base station device (the first gNB 20-1). Here, the first wireless resource is a wireless resource for the RU 25 operating as a part of the local 5G base station device (the first gNB 20-1). Furthermore, the second wireless resource is also a wireless resource for the RU 25 operating as part of the PLMN operator's 5G base station device (second gNB 20-2).

The wireless resource setting unit 2544 notifies, via the network communication unit 255, that the first wireless resource of the first licensed frequency band is allocated to the first DU 24-1, and notifies that the second wireless resource of the first licensed frequency band is allocated to the second DU 24-2.

Here, in a case where the second gNB 20-2 operates in the same frequency band as the first gNB 20-1, the first CU 23-1 constituting the first gNB 20-1 processes the RRC of the second gNB 20-2 in addition to the first gNB 20-1. Therefore, the second CU 23-2 constituting the second gNB 20-2 provides the first CU 23-1 with information necessary for processing the RRC of the second gNB 20-2. The information necessary for processing the RRC of the second gNB 20-2 is, for example, information regarding system information. Here, the acquisition of information necessary for processing RRC is performed by a procedure of a request to the second CU 23-2 and a response to the first CU 23-1, or registration/subscription to the second CU 23-2 and notification to the first CU 23-1, or update.

In accordance with the processing of the mapping unit illustrated in FIG. 15 described above, the mapping unit 2545 of the RU 25 performs mapping so that data transmitted and received via the first DU 24-1 is transmitted and received by using the first wireless resource, and performs mapping so that data transmitted and received via the second DU 24-2 is transmitted and received by using the second wireless resource. That is, the mapping unit 2545 performs mapping between a radio bearer, a TNL, or a PDU session and a wireless resource.

From the above, RU 25 can operate on the first wireless resource of the first licensed frequency band as part of the local 5G base station device (first gNB 20-1) and can operate on the second wireless resource of the first licensed frequency band as part of the PLMN operator's 5G base station device (second gNB 20-2). Although the embodiment in which the RU 25 as part of the PLMN operator's 5G base station device (second gNB 20-2) is operated on the second wireless resource of the first licensed frequency band has been described here, the base station device (gNB 20) as the PLMN operator's 5G base station device (second gNB 20-2) can be operated on the second wireless resource of the first licensed frequency band in a similar manner.

Furthermore, in a case where the microoperator is permitted to use the first shared frequency band, the management device 50 may instruct the wireless resource setting unit 2544 to set the third wireless resource and the fourth wireless resource in the first shared frequency band. The mapping unit 2545 performs mapping such that data transmitted and received via the first DU 24-1 is transmitted and received by using the third wireless resource, and performs mapping such that data transmitted and received via the second DU 24-2 is transmitted and received by using the fourth wireless resource. That is, RU 25 can operate on the third wireless resource of the first shared frequency band as part of the local 5G base station device (first gNB 20-1) and can operate on the fourth wireless resource of the first shared frequency band as part of the PLMN operator's 5G base station device (second gNB 20-2).

Note that, in a case where the use of the first licensed frequency band or the first shared frequency band is not allowed by the PLMN operator in the legal system, the PLMN operator can enter into a roaming agreement with the microoperator as an SLA, and use the RU 25 operating in the first licensed frequency band or the first shared frequency band as the RU 25 of the roaming destination. That is, the RU 25 can operate on the first wireless resource of the first licensed frequency band or the third wireless resource of the first shared frequency band as part of the base station device of the local 5G (the first gNB 20-1), and operate on the second wireless resource of the first licensed frequency band or the fourth wireless resource of the first shared frequency band as part of the base station device of the 5G visitor PLMN (that is, the microoperator) (the second gNB 20-2).

[4.2.5. Real-Time Control for Dynamic Setting]

The setting of the operation band, the setting of the operation period, and the setting of the wireless resource described above are dynamically set according to the traffic volume of the microoperator or the PLMN operator or QoS. Therefore, in a case where the management device 50 controls the operation band setting unit 2542, the operation period setting unit 2543, or the wireless resource setting unit 2544 of the RU 25 via the core network (the first NGC 30-1) of the base station device (the first gNB 20-1) of the local 5G, it is assumed that the delay increases. Therefore, the management device 50 can perform setting such that the first CU 23-1 dynamically controls the operation band setting unit 2542, the operation period setting unit 2543, or the wireless resource setting unit 2544 of the RU 25.

The control unit 233-1 (see FIG. 16) of the first CU 23-1 dynamically controls the operation band setting unit 2542, the operation period setting unit 2543, or the wireless resource setting unit 2544 of the RU 25 according to the setting from the management device 50. For example, the control unit 233-1 of the first CU 23-1 dynamically controls the first channel band and the second channel band of the operation band setting unit 2542 of the RU 25, the first time interval and the second time interval of the operation period setting unit 2543 of the RU 25, or the ratio of the first wireless resource and the second wireless resource of the wireless resource setting unit 2544 on the basis of the amount of traffic processed by the CU (U-Plane) 232-1 of the own device.

Management device 50 sets one or more threshold values in priority order determination unit 236-1 of first CU 23-1 in advance. When detecting that the amount of traffic processed by the CU (U-Plane) 232-1 exceeds the one threshold value, the priority order determination unit 236-1 controls the second channel band to be narrower than the first channel band, the second time interval to be shorter than the first time interval, or the second wireless resource to be reduced with respect to the first wireless resource via the control unit 233-1.

The control unit 233-1 of the first CU 23-1 sets the maximum value of traffic that can be processed by the RU 25 as part of the 5G base station device (the second gNB 20-2) of the PLMN operator on the basis of the set first and second channel bands, the first and second time intervals, or the ratio of the first and second wireless resources. The control unit 233-1 notifies the information exchange unit 234-1 of information related to the set maximum value of the traffic. The information exchange unit 234-1 notifies the second CU 23-2 of the information on the maximum value of the traffic acquired from the control unit 233-1 via the network communication unit 235-1. The second CU 23-2 controls the amount of traffic to be processed by the CU (U-Plane) 232-2 of the second CU 23 on the basis of the information regarding the maximum value of traffic notified from the first CU 23-1.

Note that the control unit 233-1 of the first CU 23-1 may notify the information exchange unit 234-1 of the information regarding the second channel band, the second time interval, or the amount of the second wireless resource, and the information exchange unit 234-1 may notify the second CU 23-2 of the information regarding the second channel band, the second time interval, or the amount of the second wireless resource via the network communication unit 235-1. Here, the control unit 233 may include the function of the near-real time RIC 22.

As described above, in a case where the second gNB 20-2 operates in a frequency band different from that of the first gNB 20-1, each of the second CUs 23-2 or the first CUs 23-1 constituting each base station (Second gNB 20-2 or first gNB 20-1) processes RRC. Therefore, the RRC unit 2311-2 of the second CU 23-2 processes the RRC of the second gNB 20-2, and the RRC unit 2311-1 of the first CU 23-1 processes the RRC of the first gNB 20-1.

On the other hand, in a case where the second gNB 20-2 operates in the same frequency band as the first gNB 20-1, the first CU 23-1 constituting the first gNB 20-1 processes the RRC of the second gNB 20-2 in addition to the first gNB 20-1. Therefore, the RRC unit 2311-1 of the first CU 23-1 processes the RRC of the second gNB 20-2 and the first gNB 20-1. Therefore, the information exchange unit 234-1 of the first CU 23-1 acquires information (for example, information regarding system information) necessary for processing the RRC of the second gNB 20-2 from the information exchange unit 234-2 of the second CU 23-2. Here, the information necessary for processing the RRC of the second gNB 20-2 is acquired by a request to the second CU 23-2 and a response to the first CU 23-1, or by a procedure of registration/subscription to the second CU 23-2 and notification to the first CU 23-1, or update.

Furthermore, the priority order determination unit 236-1 of the first CU 23-1 may dynamically control the first channel band and the second channel band of the operation band setting unit 2542 of the RU 25, the first time interval and the second time interval of the operation period setting unit 2543 of the RU 25, or the ratio of the first wireless resource and the second wireless resource of the wireless resource setting unit 2544 on the basis of a 5G QOS identifier (5QI) allocated to a radio bearer or a quality of service (QOS) flow or an allocation and retention priority (ARP).

Moreover, the information exchange unit 234-1 of the first CU 23-1 exchanges information processed by the SDAP sublayer of another CU 23 (for example, the second CU 23-2) connected via the network communication unit 235-1. Here, the information processed by the SDAP sublayer is, for example, a correspondence between a Qos flow and a data wireless bearer, a Qos flow ID (QFI) allocated to downlink and uplink packets, information related to each configured PDU session, and the like. As a result, the SDAP unit 2321-1 of the first CU 23-1 and the SDAP unit 2321-2 of the second CU 23-2 can operate in cooperation.

In order to improve the real-time property, the control unit 233-1 of the first CU 23-1 may instruct the control unit 242-1 of the first DU 24-1 to dynamically control the operation band setting unit 2542, the operation period setting unit 2543, or the wireless resource setting unit 2544 of the RU 25.

For example, the control unit 242-1 of the first DU 24-1 dynamically controls the first channel band and the second channel band of the operation band setting unit 2542 of the RU 25, the first time interval and the second time interval of the operation period setting unit 2543 of the RU 25, or the ratio of the first wireless resource and the second wireless resource of the wireless resource setting unit 2544 on the basis of the amount of traffic processed by the processing unit 241-1 of its own device.

The control unit 233-1 of the first CU 23-1 sets one or more threshold values in advance in the priority order determination unit 245-1 of the first DU 24-1. When detecting that the amount of traffic processed by the processing unit 241-1 exceeds the one threshold value, the priority order determination unit 245-1 performs control such that the second channel band is narrowed with respect to the first channel band, the second time interval is shortened with respect to the first time interval, or the second wireless resource is reduced with respect to the first wireless resource.

The control unit 242-1 of the first DU 24-1 sets the maximum value of traffic that can be processed by the RU 25 as part of the 5G base station device (the second gNB 20-2) of the PLMN operator on the basis of the set first channel band and second channel band, the first time interval and second time interval, or the ratio of the first wireless resource and the second wireless resource. The control unit 242-1 notifies the information exchange unit 243-1 of information related to the set maximum value of the traffic. The information exchange unit 243-1 notifies the second DU 24-2 of the information on the maximum value of the traffic acquired from the control unit 242-1 via the network communication unit 244-1. The second DU 24-2 controls the amount of traffic to be processed by the processing unit 241-2 of the second DU 24-2 on the basis of the information related to the maximum value of the traffic notified from the first DU 24-1.

Note that the control unit 242-1 of the first DU 24-1 may notify the information exchange unit 243-1 of the information regarding the second channel band, the second time interval, or the amount of the second wireless resource, and the information exchange unit 243-1 may notify the second DU 24-2 of the information regarding the second channel band, the second time interval, or the amount of the second wireless resource via the network communication unit 244-1. Here, the control unit 242 may include the function of the near-real time RIC 22.

Furthermore, the priority order determination unit 245-1 of the first DU 24-1 may dynamically control the first channel band and the second channel band of the operation band setting unit 2542 of the RU 25, the first time interval and the second time interval of the operation period setting unit 2543 of the RU 25, or the ratio of the first wireless resource and the second wireless resource of the wireless resource setting unit 2544 on the basis of a 5G QOS identifier (5QI) allocated to a radio bearer or a quality of service (QOS) flow or an allocation and retention priority (ARP).

The embodiment in which the PLMN shares the local 5G base station device in a case where the PLMN operator provides the cloud-based core network operation and management service has been described above. Although FIG. 18 or 19 illustrates an example in which the microoperator manages and operates the management device 50, the PLMN operator may manage and operate the management device 50. The management device 50 dynamically orchestrates a setting necessary for sharing the base station device (gNB 20) installed by the microoperator or the RU 25 between the microoperator and the PLMN operator on the basis of the information such as the capability of the base station device (gNB 20) installed by the microoperator or the RU 25, the license frequency or the shared frequency allocated to the PLMN operator or the microoperator, or the traffic volume processed by the base station device (gNB 20) or the RU 25, or the QoS, or a service level agreement (SLA), among the base station devices (gNB 20), or between the devices of the RU 25, the DU 24, and the CU 23, and different service domains such as the microoperator, the service provider, and the PLMN operator. Moreover, the PLMN operator may configure the functions of the management device 50 as one or more NFs of the core network (first NGC 30-1).

Furthermore, the core network of the microoperator (first NGC 30-1) and the core network of the PLMN operator (second NGC 30-2), the first CU 23-1 and the second CU 23-2, and the first DU 24-1 and the second DU 24-2 illustrated in FIG. 18 or 19 may be configured to be physically separated, or may be configured to be logically separated in units of functional units or containers virtualized in one device.

[4.3. Utilization of Local 5G Base Station as Capacity Booster Cell]

Figure 20:
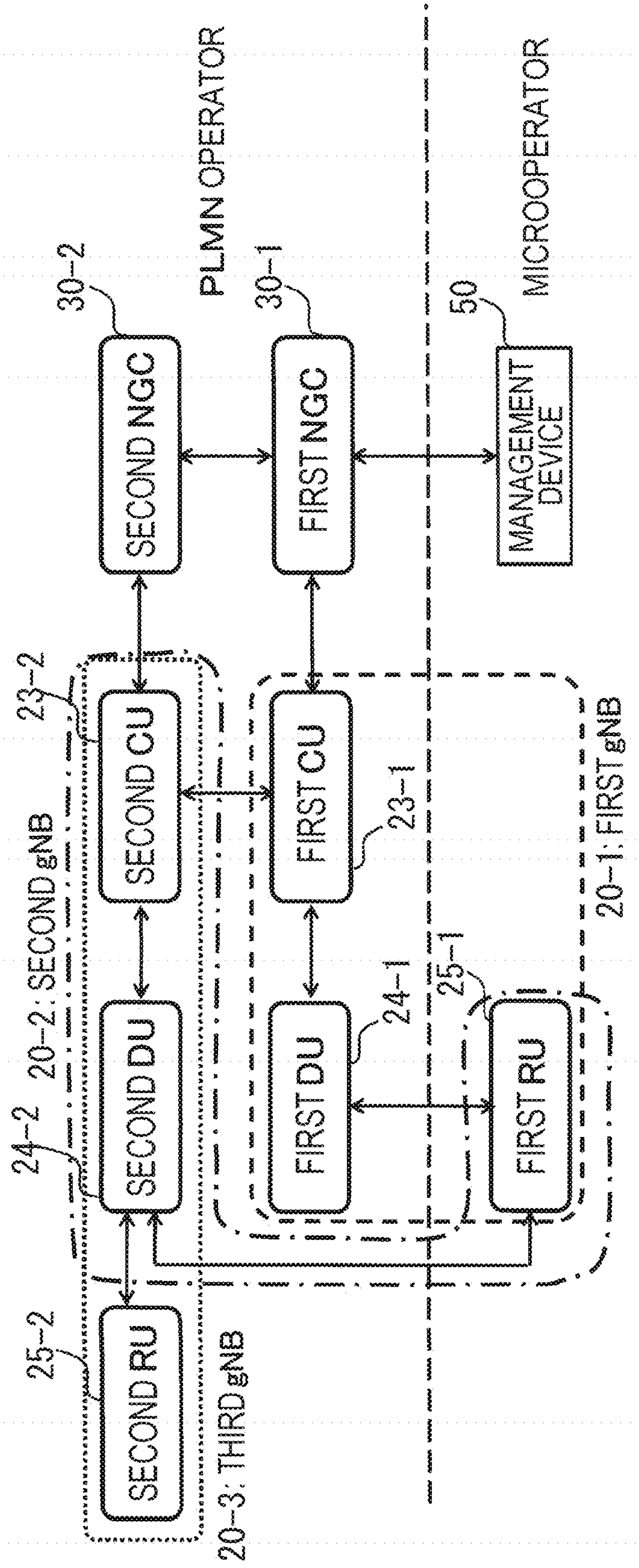
FIG. 20 is a diagram illustrating an example of utilization of a local 5G base station as a Capacity booster cell by a PLMN.

FIG. 20 is a diagram illustrating an example in which the PLMN utilizes a local 5G base station as a Capacity booster cell. That is, an example of improving the capacity or capability of the cell of the PLMN by using the local 5G base station will be described. The first RU 25-1 installed by the microoperator is connected to a cloud-based core network (the first NGC 30-1) provided by the PLMN operator to the microoperator, the first CU 23-1, and the first DU 24-1 to constitute a first gNB 20-1 that is a local 5G base station device. Furthermore, the first RU 25-1 is connected to a core network (the second NGC 30-2) operated and managed by the PLMN operator, the second CU 23-2, and the second DU 24-2 to constitute the second gNB 20-2 that is a 5G base station device of the PLMN operator.

Moreover, the second RU 25-2 installed by the PLMN operator is connected to a core network (the second NGC 30-2) operated and managed by the PLMN operator, the second CU 23-2, and the second DU 24-2 to constitute a third gNB 20-3 that is a 5G base station device of the PLMN operator.

The microoperator enters into an SLA with the PLMN operator so that the first NGC 30-1 is connected with the second NGC 30-2 within the scope of the SLA conditions. Management device 50 is connected with first NGC 30-1 and controls a first RU 25-1 operating as part of a local 5G base station device (first gNB 20-1) or a first RU 25-1 operating as part of a PLMN operator's 5G base station device (second gNB 20-2).

Furthermore, the management device 50 instructs the first CU 23-1 to set an information exchange unit (not illustrated herein) for exchanging information with the second CU 23-2.

[4.3.1. In a Case of Operating on Different Licensed Frequency Bands]

A first licensed frequency band dedicated to the local 5G is allocated to the microoperator, and a second licensed frequency band and a third licensed frequency band dedicated to the 5G service of the PLMN are allocated to the PLMN operator. Furthermore, as illustrated in FIG. 11 described above, the first RU 25-1 is equipped with a wireless front end unit 251, and the wireless front end unit 251 is equipped with hardware for operating on the first licensed frequency band and the second licensed frequency band.

Here, the capability information management unit 5012 of the management device 50 manages, as the capability information of the first RU 25-1, a supported release (for example, Release 15 and Release 16), a BS type, the number of transmission units, the number of reception units, a radio access technology (RAT) type (for example, EUTRA, NR) corresponding to each transmission unit or reception unit, a duplex system, a configuration of an antenna including the number of antenna ports (for example, the number of transmission antennas and the number of reception antennas), the maximum number of MIMO transmission/reception layers, an RF parameter (for example, a list of supported NR operation frequency bands, a list of supported band combinations, maximum output power, and a channel band for each operation frequency band), and the like.

While avoiding redundancy with the above description, the first RU 25-1 may operate in the first licensed frequency band as part of the local 5G base station device (the first gNB 20-1) and in the second licensed frequency band as part of the PLMN operator's 5G base station device (the second gNB 20-2).

The second RU 25-2 installed by the PLMN operator operates as a part of the third gNB 20-3 as a Basic coverage cell. Here, the second RU 25-2 operates on a frequency band lower than the second licensed frequency band, for example, a third licensed frequency band dedicated to 5G services of a PLMN belonging to a frequency band of 700 MHz to 900 MHz referred to as a platinum band. Then, the PLMN operator can leverage the first RU 25-1 operating in the second licensed frequency band as part of the PLMN operator's 5G base station device (second gNB 20-2) as a Capacity booster cell.

Figure 21:
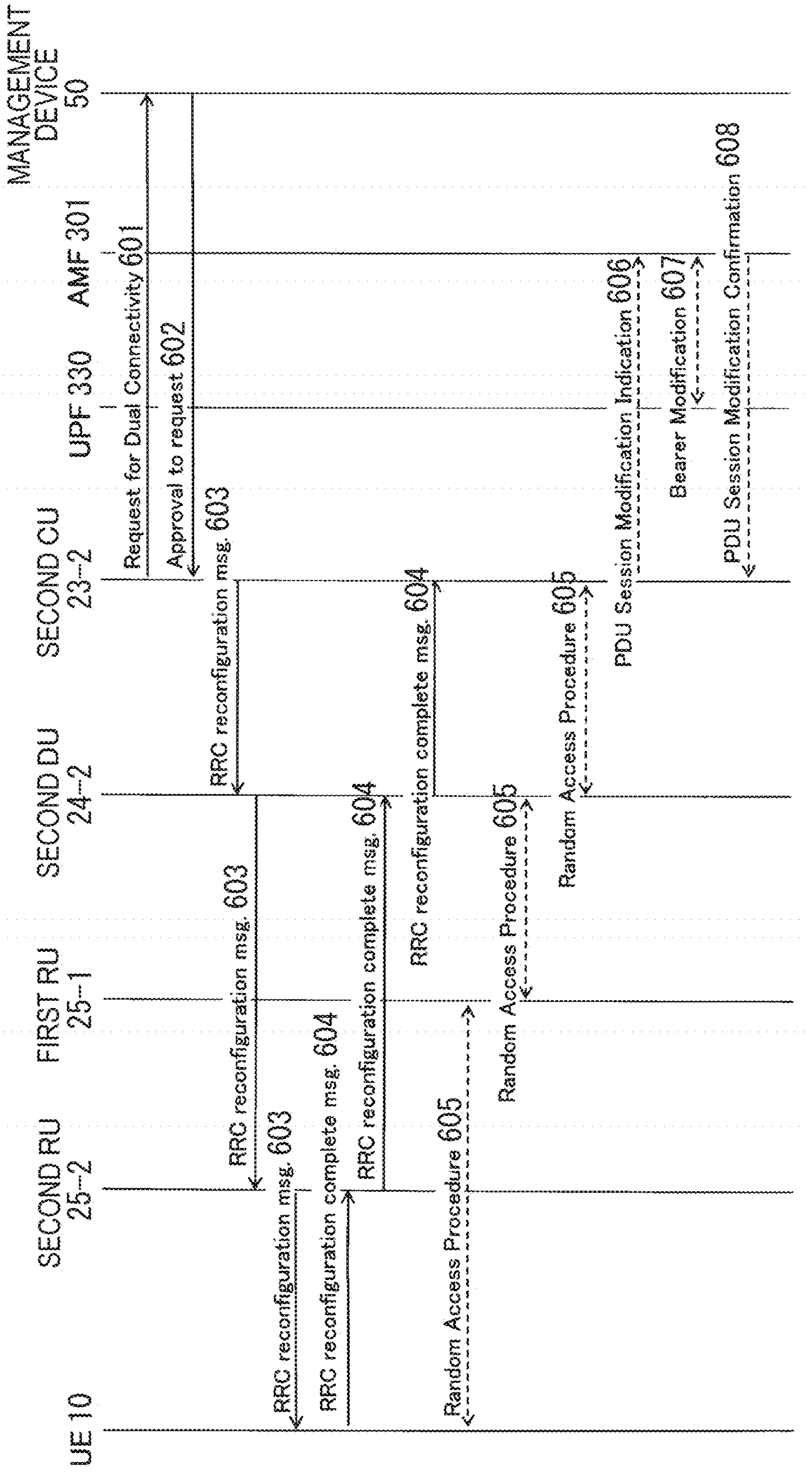
FIG. 21 is a diagram illustrating an example of a Dual Connectivity setting procedure for a local 5G base station by a PLMN.

FIG. 21 is a diagram illustrating an example of a Dual Connectivity configuration procedure for the local 5G base station by the PLMN. The second CU 23-2 determines the setting of the Dual Connectivity for adding a Capacity booster cell to the second RU 25-2 that is a Basic coverage cell according to measurement reporting from the UE 10. Here, the added Capacity booster cell is the first RU 25-1 operating in the second licensed frequency band as part of the PLMN operator's 5G base station device (second gNB 20-2). The second CU 23-2 transmits the Dual Connectivity request message 601 to the management device 50.

The management device 50 determines whether or not the Dual Connectivity request can be made on the basis of the SLA that is entered into between the PLMN operator and the microoperator. If the SLA includes a condition that approves the Dual Connectivity to the first RU 25-1 operating on the second licensed frequency band, the management device 50 responds with a message 602 that approves the request for the Dual Connectivity.

The second CU 23-2 that has received the permission of the Dual Connectivity from the management device 50 transmits an RRC reconfiguration message 603 for adding the first RU 25-1 that operates on the second licensed frequency band as a part of the PLMN operator's 5G base station device (the second gNB 20-2) as a secondary cell group (SCG) to the UE 10 via the second DU 24-2 and the second RU 25-2.

The UE 10 performs necessary configuration according to the RRC reconfiguration message 603, and responds to the second CU 23-2 via the second RU 25-2 and the second DU 24-2 with the RRC reconfiguration complete message 604.

Subsequently, the UE 10 executes the Random Access procedure 605 with the second CU 23-2 via the first RU 25-1 operating on the second licensed frequency band which is the SCG.

When the Random Access succeeds, the second CU 23-2 issues the PDU Session Modification Indication message 606 to the AMF 301. The AMF 301 performs Bearer Modification 607 with the UPF 330. When the Bearer Modification is completed, the AMF 301 responds to the second CU 23-2 with the PDU Session Modification Confirmation message 608, and the Dual Connectivity setting is completed.

Here, in any one of the following cases (1) and (2), the second CU 23-2 may determine the setting of Carrier Aggregation for adding a Capacity booster cell to the second RU 25-2 which is a Basic coverage cell.

(1) In a case where the frame timing of the second RU 25-2, which is a Basic coverage cell, and the system frame number (SFN) are aligned with the frame timing of the first RU 25-1 operating on the second licensed frequency band as a part of the 5G base station device (the second gNB 20-2) of the PLMN operator, which is a Capacity booster cell, and the system frame number (SFN)

(2) In a case where the offset of the frame timing between the second RU 25-2 and the first RU 25-1 is known for the second CU 23-2

In the configuration of FIG. 20, a core network (that is, the first NGC 30-1 and the second NGC 30-2), a central unit (that is, the first CU 23-1 and the second CU 23-2) and a distributed unit (that is, the first DU 24-1 and the second DU 24-2) are provided by the same PLMN operator. Therefore, for example, the first CU 23-1 and the second CU 23-2 can control the first DU 24-1 and the second DU 24-2 so that frame timings of the second RU 25-2 and the first RU 25-1 are aligned. Alternatively, the second CU 23-2 may obtain information pertaining to the frame timing (for example, correspondence between a timing specified by an arbitrary SFN, a slot number, and a symbol number, and coordinated universal time (UTC)) of the first RU 25-1 from the first CU 23-1 and calculate the offset of the frame timing between the second RU 25-2 and the first RU 25-1. Furthermore, in a case where an interface is established between the first DU 24-1 and the second DU 24-2, the second CU 23-2 may obtain information related to the frame timing of the first RU 25-1 through the interface, and calculate the offset of the frame timing between the second RU 25-2 and the first RU 25-1.

In FIG. 21, the second CU 23-2 transmits a Carrier Aggregation request message to the management device 50 instead of the Dual Connectivity request message 601. Upon receiving the Carrier Aggregation permission from the management device 50, the second CU 23-2 transmits an RRC reconfiguration message 603 for adding the first RU 25-1 operating in the second licensed frequency band as part of the PLMN operator's 5G base station device (the second gNB 20-2) as a Secondary Cell (SCell) to the UE 10 via the second DU 24-2 and the second RU 25-2.

Here, in the case of the Dual Connectivity, the bearers are separated in the PDCP sublayer, and three types of bearers of a master cell group (MCG) bearer, an SCG bearer, and a split bearer are prepared.

The data of the MCG bearer is processed in the PDCP sublayer of the base station device operating as the MCG or the SCG, and then the data is further processed in each sublayer below the RLC sublayer of the base station device operating as the MCG.

The data of the SCG bearer is processed in the PDCP sublayer of the MCG or the base station device operating as the SCG, and then the data is further processed in each sublayer below the RLC sublayer of the base station device operating as the SCG.

The data of the split bearer is processed in the PDCP sublayer of the base station device that operates as the MCG, and then split, the data of the first split bearer is processed in each sublayer below the RLC sublayer of the base station device that operates as the MCG, and the data of the second split bearer is processed in each sublayer below the RLC sublayer of the base station device that operates as the SCG. Alternatively, the data of the split bearer is processed in the PDCP sublayer of the base station device that operates as the SCG and then split, the data of the first split bearer is processed in each sublayer below the RLC sublayer of the base station device that operates as the MCG, and the data of the second split bearer is processed in each sublayer below the RLC sublayer of the base station device that operates as the SCG.

Therefore, the data of the MCG bearer is scheduled by the MAC sublayer of the base station device operating as the MCG, and the data of the SCG bearer is scheduled by the MAC sublayer of the base station device operating as the SCG. Furthermore, the data of the first split bearer is scheduled by the MAC sublayer of the base station device that operates as the MCG, and the data of the second split bearer is scheduled by the MAC sublayer of the base station device that operates as the SCG.

In the case of Carrier Aggregation, the MAC sublayer divides data, and the divided first data is transmitted via a first component carrier (CC) that is a PCell and the divided second data is transmitted via a second CC that is an SCell.

Furthermore, in a case where the PLMN operator is permitted to use the second shared frequency band, the first RU 25-1 operating as a Capacity booster cell can operate on the second shared frequency band in addition to the second licensed frequency band as a part of the PLMN operator's 5G base station device (the second gNB 20-2).

Here, in a case where the second gNB 20-2 operates in a frequency band different from that of the first gNB 20-1, each of the second CUs 23-2 or the first CUs 23-1 constituting each base station (second gNB 20-2 or first gNB 20-1) can process RRC. However, in a case where the Capacity booster cell is added in the Dual Connectivity, the RRC unit 2311-2 of the second CU 23-2 is only required to process RRC only via the third gNB 20-3 which is a Basic coverage cell operating as a master cell group (MCG). Furthermore, in a case where a Capacity booster cell is added by Carrier Aggregation, the RRC unit 2311-2 of the second CU 23-2 is only required to process only RRC via the third gNB 20-3 which is a Basic coverage cell operating as a primary cell (PCell). Therefore, the first CU 23-1 processes only the RRC of the first gNB 20-1.

In the above-described embodiment, an example has been described in which in a case where the first gNB 20-1 and the second gNB 20-2 operate on different frequencies, that is, the first licensed frequency band dedicated to the local 5G or the second license frequency dedicated to the 5G service of the PLMN, a Basic coverage cell by the third gNB 20-3 operating on the third license frequency dedicated to the 5G service of the PLMN adds a Capacity booster cell by the second gNB 20-2 by using Dual Connectivity or Carrier Aggregation. However, the embodiment in which the third gNB 20-3 utilizes the second gNB 20-2 is not limited thereto.

For example, in a case where the third gNB 20-3 operates at the third license frequency and the second license frequency to provide a Basic coverage cell and a first Capacity booster cell, the third gNB 20-3 may perform control to utilize the second Capacity booster cell by the second gNB 20-2 operating at the second license frequency in the form of transmission and reception points (Multi-TRP).

The third gNB 20-3 and the second DU 24-2 constituting the second gNB 20-2 control cooperative transmission and reception by the first Capacity booster cell and the second Capacity booster cell in the form of Multi-TRP at the second license frequency.

For example, the cooperative transmission and reception by the first Capacity booster cell and the second Capacity booster cell in the form of Multi-TRP at the second license frequency is diversity transmission and reception by the first Capacity booster cell and the second Capacity booster cell.

For example, the cooperative transmission and reception by the first Capacity booster cell and the second Capacity booster cell in the form of Multi-TRP at the second license frequency is spatial multiplex transmission and reception by the first Capacity booster cell and the second Capacity booster cell.

The second DU 24 acquires, from the UE 10 via the second RU 25-2 and the first RU 25-1, information related to inter-cell interference (ICI) occurring between the third gNB 20-3 and the second gNB 20-2. The second DU 24 allocates transmission/reception data of the first Capacity booster cell and the second Capacity booster cell to wireless resources so as to reduce interference between the third gNB 20-3 and the second gNB 20-2 on the basis of the acquired information related to ICI. Here, the allocation to the wireless resources is to specify the frequency and time direction position of the wireless resources.

Furthermore, the second DU 24 acquires a measurement report related to cross link interference (CLI) measurement executed by the UE 10 via the second RU 25-2 and the first RU 25-1. The second DU 24 adjusts the DL-UL setting of TDD used between the first Capacity booster cell and the second Capacity booster cell to reduce CLI on the basis of the acquired measurement result related to CLI. Here, the CLI measurement is a sounding reference signal (SRS)-reference signal received power (RSRP) measured over SRS resources, or a received signal strength indicator (CLI-RSSI) measured over CLI-RSSI resources. Here, the measurement report includes the measurement result of the SRS-RSRP for each SRS resource and the index value of the SRS resource, or the measurement result of the CLI-RSSI for each CLI-RSSI resource and the index value of the CLI-RSSI resource.

Furthermore, the second DU 24 acquires channel status information (CSI) between the UE 10 and the third gNB 20-3 and CSI between the UE 10 and the second gNB 20-2 via the second RU 25-2 and the first RU 25-1. The second DU 24 determines parameters necessary for spatially multiplexing transmission and reception of data of the first Capacity booster cell and the second Capacity booster cell on the basis of the acquired CSI. Here, the parameter necessary for spatial multiplexing transmission and reception is, for example, the number of antenna ports and layers.

[4.3.2. In a Case of Operating in Different Bands of the Same Licensed Frequency Band]

A microoperator is allocated a first licensed frequency band dedicated to local 5G, and a PLMN operator is allocated a second licensed frequency band dedicated to the 5G service of the PLMN. Furthermore, as illustrated in the foregoing FIG. 11, the first RU 25-1 is equipped with a wireless front end unit 251, and the wireless front end unit 251 is equipped with hardware for operating in the first licensed frequency band.

Here, the capability information management unit 5012 of the management device 50 manages, as the capability information of the first RU 25-1, a supported release (for example, Release 15 and Release 16), a BS type, the number of transmission units, the number of reception units, a radio access technology (RAT) type (for example, EUTRA, NR) corresponding to each transmission unit or reception unit, a duplex system, a configuration of an antenna including the number of antenna ports (for example, the number of transmission antennas and the number of reception antennas), the maximum number of MIMO transmission/reception layers, an RF parameter (for example, a list of supported NR operation frequency bands, a list of supported band combinations, maximum output power, and a channel band for each operation frequency band), and the like.

While avoiding redundancy with the above description, the first RU 25-1 may operate in the first channel band of the first licensed frequency band as part of the local 5G base station device (the first gNB 20-1) and in the second channel band of the first licensed frequency band as part of the PLMN operator's 5G base station device (the second gNB 20-2). The first CU 23-1 and the second CU 23-2 share information related to the first channel band and the second channel band.

The second RU 25-2 installed by the PLMN operator operates as a part of the third gNB 20-3 as a Basic coverage cell. Here, the second RU 25-2 operates on the second licensed frequency band dedicated to the 5G service of the PLMN. Then, the PLMN operator can leverage the first RU 25-1 operating in the second channel band of the first licensed frequency band as part of the PLMN operator's 5G base station device (second gNB 20-2) as a Capacity booster cell.

According to the Dual Connectivity setting procedure for the local 5G base station by the PLMN illustrated in FIG. 21, the second CU 23-2 determines the Dual Connectivity setting for adding the Capacity booster cell to the second RU 25-2 that is a Basic coverage cell. Here, the added Capacity booster cell is the first RU 25-1 operating in the second channel band of the first licensed frequency band as part of the PLMN operator's 5G base station device (second gNB 20-2). The second CU 23-2 transmits the Dual Connectivity request message 601 to the management device 50.

The management device 50 determines whether or not the Dual Connectivity request can be made on the basis of the SLA that is entered into between the PLMN operator and the microoperator. If the SLA includes a condition that approves the Dual Connectivity to the first RU 25-1 operating in the second channel band of the first licensed frequency band, the management device 50 responds with a message 602 that approves the Dual Connectivity request.

The second CU 23-2 that has received the permission of the Dual Connectivity from the management device 50 transmits an RRC reconfiguration message 603 for adding the first RU 25-1 that operates on the second channel band of the first licensed frequency band as a part of the base station device (second gNB 20-2) of 5G of the PLMN operator as the SCG to the UE 10 via the second DU 24-2 and the second RU 25-2.

The UE 10 performs necessary configuration according to the RRC reconfiguration message 603, and responds to the second CU 23-2 via the second RU 25-2 and the second DU 24-2 with the RRC reconfiguration complete message 604.

Subsequently, the UE 10 executes the Random Access procedure 605 with the second CU 23-2 via the first RU 25-1 operating in the second channel band of the first licensed frequency band that is the SCG. When the Random Access succeeds, the second CU 23-2 issues the PDU Session Modification Indication message 606 to the AMF 301. The AMF 301 performs Bearer Modification 607 with the UPF 330. When the Bearer Modification is completed, the AMF 301 responds to the second CU 23-2 with the PDU Session Modification Confirmation message 608, and the Dual Connectivity setting is completed.

Here, the second CU 23-2 may add the first RU 25-1 operating in the first licensed frequency band constituting the CC as the SCG, and then set the second channel band for the first RU 25-1 operating as a part of the 5G base station device (the second gNB 20-2) of the PLMN operator.

Furthermore, in any one of the following cases (1) and (2), the second CU 23-2 may determine the setting of Carrier Aggregation for adding a Capacity booster cell to the second RU 25-2 which is a Basic coverage cell.

(1) In a case where the frame timing of the second RU 25-2 which is a Basic coverage cell and the SFN are aligned with the frame timing of the first RU 25-1 operating in the second channel band of the first licensed frequency band as a part of the 5G base station device (the second gNB 20-2) of the PLMN operator which is a Capacity booster cell (2) In a case where the offset of the frame timing between the second RU 25-2 and the first RU 25-1 is known for the second CU 23-2

In the configuration of FIG. 20, because the core network (that is, the first NGC 30-1 and the second NGC 30-2), the central unit (that is, the first CU 23-1 and the second CU 23-2), and the distributed unit (that is, the first DU 24-1 and the second DU 24-2) are provided by the same PLMN operator, for example, the first CU 23-1 and the second CU 23-2 can control the first DU 24-1 and the second DU 24-2 so that frame timings of the second RU 25-2 and the first RU 25-1 are aligned. Alternatively, the second CU 23-2 may obtain information pertaining to the frame timing (for example, correspondence between a timing specified by an arbitrary SFN, a slot number, and a symbol number, and coordinated universal time (UTC)) of the first RU 25-1 from the first CU 23-1 and calculate the offset of the frame timing between the second RU 25-2 and the first RU 25-1. Furthermore, in a case where an interface is established between the first DU 24-1 and the second DU 24-2, the second CU 23-2 may obtain information related to the frame timing of the first RU 25-1 through the interface, and calculate the offset of the frame timing between the second RU 25-2 and the first RU 25-1.

In FIG. 21, the second CU 23-2 transmits a Carrier Aggregation request message to the management device 50 instead of the Dual Connectivity request message 601. Upon receiving the Carrier Aggregation permission from the management device 50, the second CU 23-2 transmits an RRC reconfiguration message 603 for adding the first RU 25-1 operating on the second channel band of the first licensed frequency band as a part of the PLMN operator's 5G base station device (the second gNB 20-2) as a Secondary Cell (SCell) to the UE 10 via the second DU 24-2 and the second RU 25-2.

Note that, in a case where the PLMN operator is not allowed to use the first licensed frequency band by law, the PLMN operator can enter into a roaming agreement with the microoperator as an SLA, and use the first RU 25-1 operating on the first licensed frequency band as the first RU 25-1 to which the PLMN operator is roaming. That is, the first RU 25-1 can operate in the first channel band of the first licensed frequency band as part of the local 5G base station device (the first gNB 20-1) and operate in the second channel band of the first licensed frequency band as part of the 5G base station device (the second gNB 20-2) of the Visitor PLMN (that is, the microoperator).

Here, in a case where the second gNB 20-2 operates in the same frequency band as the first gNB 20-1, the first CU 23-1 constituting the first gNB 20-1 can process the RRC of the second gNB 20-2 in addition to the first gNB 20-1. However, in a case where the Capacity booster cell is added in the Dual Connectivity, the RRC unit 2311-2 of the second CU 23-2 is only required to process only the RRC via the third gNB 20-3 which is a Basic coverage cell operating as the MCG. Furthermore, in a case where a Capacity booster cell is added by Carrier Aggregation, the RRC unit 2311-2 of the second CU 23-2 is only required to process only the RRC via the third gNB 20-3 which is a Basic coverage cell operating as a PCell. Therefore, the first CU 23-1 processes only the RRC of the first gNB 20-1.

[4.3.3. In a Case of Operating in Different Periods of the Same Licensed Frequency Band]

A microoperator is allocated a first licensed frequency band dedicated to local 5G, and a PLMN operator is allocated a second licensed frequency band dedicated to the 5G service of the PLMN. Furthermore, as illustrated in the foregoing FIG. 11, the first RU 25-1 is equipped with a wireless front end unit 251, and the wireless front end unit 251 is equipped with hardware for operating in the first licensed frequency band.

Here, the capability information management unit 5012 of the management device 50 manages, as the capability information of the first RU 25-1, a supported release (for example, Release 15 and Release 16), a BS type, the number of transmission units, the number of reception units, a radio access technology (RAT) type (for example, EUTRA, NR) corresponding to each transmission unit or reception unit, a duplex system, a configuration of an antenna including the number of antenna ports (for example, the number of transmission antennas and the number of reception antennas), the maximum number of MIMO transmission/reception layers, an RF parameter (for example, a list of supported NR operation frequency bands, a list of supported band combinations, maximum output power, and a channel band for each operation frequency band), and the like.

While avoiding redundancy with the above description, the first RU 25-1 may operate in the first time interval of the first licensed frequency band as part of the local 5G base station device (the first gNB 20-1) and in the second time interval of the first licensed frequency band as part of the PLMN operator's 5G base station device (the second gNB 20-2). The first CU 23-1 and the second CU 23-2 share information related to the first time interval and the second time interval.

The second RU 25-2 installed by the PLMN operator operates as a part of the third gNB 20-3 as a Basic coverage cell. Here, the second RU 25-2 operates on the second licensed frequency band dedicated to the 5G service of the PLMN. Then, the PLMN operator can leverage the first RU 25-1 operating at the second time interval of the first licensed frequency band as part of the PLMN operator's 5G base station device (second gNB 20-2) as a Capacity booster cell.

According to the Dual Connectivity setting procedure for the local 5G base station by the PLMN illustrated in FIG. 21, the second CU 23-2 determines the Dual Connectivity setting for adding the Capacity booster cell to the second RU 25-2 that is a Basic coverage cell. Here, the added Capacity booster cell is the first RU 25-1 that operates in the second time interval of the first licensed frequency band as part of the PLMN operator's 5G base station device (second gNB 20-2). The second CU 23-2 transmits the Dual Connectivity request message 601 to the management device 50.

The management device 50 determines whether or not the Dual Connectivity request can be made on the basis of the SLA that is entered into between the PLMN operator and the microoperator. If the SLA includes a condition that approves the Dual Connectivity to the first RU 25-1 operating in the second time interval of the first licensed frequency band, the management device 50 responds with a message 602 that approves the Dual Connectivity request.

Upon receiving the permission for the Dual Connectivity from the management device 50, the second CU 23-2 transmits, to the UE 10 via the second DU 24-2 and the second RU 25-2, an RRC reconfiguration message 603 for adding the first RU 25-1 that operates in the second time interval of the first licensed frequency band as a part of the base station device (second gNB 20-2) of the PLMN operator's 5G as the SCG.

The UE 10 performs necessary configuration according to the RRC reconfiguration message 603, and responds to the second CU 23-2 via the second RU 25-2 and the second DU 24-2 with the RRC reconfiguration complete message 604.

Subsequently, the UE 10 executes the Random Access procedure 605 with the second CU 23-2 through the first RU 25-1 operating in the second time interval of the first licensed frequency band that is the SCG.

When the Random Access succeeds, the second CU 23-2 issues the PDU Session Modification Indication message 606 to the AMF 301. The AMF 301 performs Bearer Modification 607 with the UPF 330. When the Bearer Modification is completed, the AMF 301 responds to the second CU 23-2 with the PDU Session Modification Confirmation message 608, and the Dual Connectivity setting is completed.

Here, the second CU 23-2 may add the first RU 25-1 operating in the first licensed frequency band constituting the CC as the SCG, and then set the second time interval for the first RU 25-1 operating as a part of the 5G base station device (the second gNB 20-2) of the PLMN operator.

Furthermore, in any one of the following cases (1) and (2), the second CU 23-2 may determine the setting of Carrier Aggregation for adding a Capacity booster cell to the second RU 25-2 which is a Basic coverage cell.

(1) In a case where the frame timing of the second RU 25-2, which is a Basic coverage cell, and the SFN are aligned with the frame timing of the first RU 25-1 operating at the second time interval of the first licensed frequency band as part of the 5G base station device (the second gNB 20-2) of the PLMN operator, which is a Capacity booster cell, and the SFN (2) In a case where the offset of the frame timing between the second RU 25-2 and the first RU 25-1 is known for the second CU 23-2

In the configuration of FIG. 20, a core network (that is, the first NGC 30-1 and the second NGC 30-2), a central unit (that is, the first CU 23-1 and the second CU 23-2) and a distributed unit (that is, the first DU 24-1 and the second DU 24-2) are provided by the same PLMN operator. Therefore, for example, the first CU 23-1 and the second CU 23-2 can control the first DU 24-1 and the second DU 24-2 so that frame timings of the second RU 25-2 and the first RU 25-1 are aligned. Alternatively, the second CU 23-2 may obtain information pertaining to the frame timing (for example, correspondence between a timing specified by an arbitrary SFN, a slot number, and a symbol number, and coordinated universal time (UTC)) of the first RU 25-1 from the first CU 23-1 and calculate the offset of the frame timing between the second RU 25-2 and the first RU 25-1. Furthermore, in a case where an interface is established between the first DU 24-1 and the second DU 24-2, the second CU 23-2 may obtain information related to the frame timing of the first RU 25-1 through the interface, and calculate the offset of the frame timing between the second RU 25-2 and the first RU 25-1.

In FIG. 21, the second CU 23-2 transmits a Carrier Aggregation request message to the management device 50 instead of the Dual Connectivity request message 601. Upon receiving the Carrier Aggregation permission from the management device 50, the second CU 23-2 transmits an RRC reconfiguration message 603 to the UE 10 via the second DU 24-2 and the second RU 25-2 to add the first RU 25-1 operating in the second time interval of the first licensed frequency band as part of the PLMN operator's 5G base station device (second gNB 25-2) as a secondary cell (SCell).

Note that, in a case where the PLMN operator is not allowed to use the first licensed frequency band by law, the PLMN operator can enter into a roaming agreement with the microoperator as an SLA, and use the first RU 25-1 operating on the first licensed frequency band as the first RU 25-1 to which the PLMN operator is roaming. That is, the first RU 25-1 may operate in the first time interval of the first licensed frequency band as part of a local 5G base station device (the first gNB 20-1) and in the second time interval of the first licensed frequency band as part of a 5G base station device (the second gNB 20-2) of a Visitor PLMN (that is, the microoperator).

Here, in a case where the second gNB 20-2 operates in the same frequency band as the first gNB 20-1, the first CU 23-1 constituting the first gNB 20-1 can process the RRC of the second gNB 20-2 in addition to the first gNB 20-1. However, in a case where the Capacity booster cell is added in the Dual Connectivity, the RRC unit 2311-2 of the second CU 23-2 is only required to process only the RRC via the third gNB 20-3 which is a Basic coverage cell operating as the MCG. Furthermore, in a case where a Capacity booster cell is added by Carrier Aggregation, the RRC unit 2311-2 of the second CU 23-2 is only required to process only the RRC via the third gNB 20-3 which is a Basic coverage cell operating as a PCell. Therefore, the first CU 23-1 processes only the RRC of the first gNB 20-1.

[4.3.4. In a Case of Operating on Different Wireless Resources of the Same Licensed Frequency Band]

A microoperator is allocated a first licensed frequency band dedicated to local 5G, and a PLMN operator is allocated a second licensed frequency band dedicated to the 5G service of the PLMN. Furthermore, as illustrated in the foregoing FIG. 11, the first RU 25-1 is equipped with a wireless front end unit 251, and the wireless front end unit 251 is equipped with hardware for operating in the first licensed frequency band.

Here, the capability information management unit 5012 of the management device 50 manages, as the capability information of the first RU 25-1, a supported release (for example, Release 15 and Release 16), a BS type, the number of transmission units, the number of reception units, a radio access technology (RAT) type (for example, EUTRA, NR) corresponding to each transmission unit or reception unit, a duplex system, a configuration of an antenna including the number of antenna ports (for example, the number of transmission antennas and the number of reception antennas), the maximum number of MIMO transmission/reception layers, an RF parameter (for example, a list of supported NR operation frequency bands, a list of supported band combinations, maximum output power, and a channel band for each operation frequency band), and the like.

While avoiding redundancy with the above description, the first RU 25-1 may operate on the first wireless resource of the first licensed frequency band as part of the local 5G base station device (the first gNB 20-1) and on the second wireless resource of the first licensed frequency band as part of the PLMN operator's 5G base station device (the second gNB 20-2). The first CU 23-1 and the second CU 23-2 share information related to the first wireless resource and the second wireless resource.

The second RU 25-2 installed by the PLMN operator operates as a part of the third gNB 20-3 as a Basic coverage cell. Here, the second RU 25-2 operates on the second licensed frequency band dedicated to the 5G service of the PLMN. Then, the PLMN operator can leverage the first RU 25-1 operating on the second wireless resource of the first licensed frequency band as part of the PLMN operator's 5G base station device (second gNB 20-2) as a Capacity booster cell.

According to the Dual Connectivity setting procedure for the local 5G base station by the PLMN illustrated in FIG. 21, the second CU 23-2 determines the Dual Connectivity setting for adding the Capacity booster cell to the second RU 25-2 that is a Basic coverage cell. Here, the added Capacity booster cell is the first RU 25-1 operating on the second wireless resource of the first licensed frequency band as part of the PLMN operator's 5G base station device (second gNB 20-2). The second CU 23-2 transmits the Dual Connectivity request message 601 to the management device 50.

The management device 50 determines whether or not the Dual Connectivity request can be made on the basis of the SLA that is entered into between the PLMN operator and the microoperator. If the SLA includes a condition that approves the Dual Connectivity to the first RU 25-1 operating on the second wireless resource of the first licensed frequency band, the management device 50 responds with a message 602 that approves the Dual Connectivity request.

The second CU 23-2 that has received the permission of the Dual Connectivity from the management device 50 transmits an RRC reconfiguration message 603 for adding the first RU 25-1 that operates on the second wireless resource of the first licensed frequency band as a part of the 5G base station device (the second gNB 20-2) of the PLMN operator as the SCG to the UE 10 via the second DU 24-2 and the second RU 25-2.

The UE 10 performs necessary configuration according to the RRC reconfiguration message 603, and responds to the second CU 23-2 via the second RU 25-2 and the second DU 24-2 with the RRC reconfiguration complete message 604.

Subsequently, the UE 10 performs a Random Access procedure 605 with the second CU 23-2 via the first RU 25-1 operating on the second wireless resource of the first licensed frequency band that is the SCG.

When the Random Access succeeds, the second CU 23-2 issues the PDU Session Modification Indication message 606 to the AMF 301. The AMF 301 performs Bearer Modification 607 with the UPF 330. When the Bearer Modification is completed, the AMF 301 responds to the second CU 23-2 with the PDU Session Modification Confirmation message 608, and the Dual Connectivity setting is completed.

Here, the second CU 23-2 may add the first RU 25-1 operating in the first licensed frequency band constituting the CC as the SCG, and then configure the second wireless resource for the first RU 25-1 operating as a part of the 5G base station device (the second gNB 20-2) of the PLMN operator.

Furthermore, in any of the following cases (1) and (2), the second CU 23-2 may determine the setting of Carrier Aggregation for adding a Capacity booster cell to the second RU 25-2 which is a Basic coverage cell.

(1) In a case where the SFN is aligned with the frame timing of the second RU 25-2, which is a Basic coverage cell, and the frame timing of the first RU 25-1 that operates on the second wireless resource of the first licensed frequency band as a part of the 5G base station device (the second gNB 20-2) of the PLMN operator, which is a Capacity booster cell.

(2) In a case where the offset of the frame timing between the second RU 25-2 and the first RU 25-1 is known for the second CU 23-2

In the configuration of FIG. 20, because the core network (that is, the first NGC 30-1 and the second NGC 30-2), the central unit (that is, the first CU 23-1 and the second CU 23-2), and the distributed unit (that is, the first DU 24-1 and the second DU 24-2) are provided by the same PLMN operator, for example, the first CU 23-1 and the second CU 23-2 can control the first DU 24-1 and the second DU 24-2 so that frame timings of the second RU 25-2 and the first RU 25-1 are aligned. Alternatively, the second CU 23-2 may obtain information pertaining to the frame timing (for example, correspondence between a timing specified by an arbitrary SFN, a slot number, and a symbol number, and coordinated universal time (UTC)) of the first RU 25-1 from the first CU 23-1 and calculate the offset of the frame timing between the second RU 25-2 and the first RU 25-1. Furthermore, in a case where an interface is established between the first DU 24-1 and the second DU 24-2, the second CU 23-2 may obtain information related to the frame timing of the first RU 25-1 through the interface, and calculate the offset of the frame timing between the second RU 25-2 and the first RU 25-1.

In FIG. 21, the second CU 23-2 transmits a Carrier Aggregation request message to the management device 50 instead of the Dual Connectivity request message 601. Upon receiving the Carrier Aggregation permission from the management device 50, the second CU 23-2 transmits an RRC reconfiguration message 603 for adding a first RU 25-1 operating on the second wireless resource of the first licensed frequency band as part of the PLMN operator's 5G base station device (the second gNB 20-2) as a secondary cell (SCell) to the UE 10 via the second DU 24-2 and the second RU 25-2.

Note that, in a case where the PLMN operator is not allowed to use the first licensed frequency band by law, the PLMN operator can enter into a roaming agreement with the microoperator as an SLA, and use the first RU 25-1 operating on the first licensed frequency band as the first RU 25-1 to which the PLMN operator is roaming. That is, the first RU 25-1 may operate on the first wireless resource of the first licensed frequency band as part of the local 5G base station device (the first gNB 20-1) and on the second wireless resource of the first licensed frequency band as part of the 5G base station device (the second gNB 20-2) of the Visitor PLMN (that is, the microoperator).

Here, in a case where the second gNB 20-2 operates in the same frequency band as the first gNB 20-1, the first CU 23-1 constituting the first gNB 20-1 can process the RRC of the second gNB 20-2 in addition to the first gNB 20-1. However, in a case where the Capacity booster cell is added in the Dual Connectivity, the RRC unit 2311-2 of the second CU 23-2 is only required to process only the RRC via the third gNB 20-3 which is a Basic coverage cell operating as the MCG. Furthermore, in a case where a Capacity booster cell is added by Carrier Aggregation, the RRC unit 2311-2 of the second CU 23-2 is only required to process only the RRC via the third gNB 20-3 which is a Basic coverage cell operating as a PCell. Therefore, the first CU 23-1 processes only the RRC of the first gNB 20-1.

Furthermore, in FIG. 20, the PLMN operator may provide some resources of the second RU 25-1 to the microoperator as a Basic coverage cell to the first RU 25-2 operating as a part of the Capacity booster cell of the microoperator on the basis of the SLA. For example, the PLMN operator provides a service of the Basic coverage cell to the microoperator in the form of PNI-NPN or roaming. Here, the part of resources described above is, for example, a part of a channel band of the third licensed frequency band, a time interval, or a wireless resource. The microoperator may add the resources of the first RU 25-1 operating as part of the Capacity booster cell using Dual Connectivity or Carrier Aggregation to the resources of part of the second RU 25-2 operating as a Basic coverage cell provided by the PLMN operator.

Here, the microoperator can use the second CU 23-2, the second DU 24-2, and the second NGC 30-2 as a visitor network by being connected to the first NGC 30-1 that is a home network. Moreover, the microoperator may use at least one of the second CU 23-2, the second DU 24-2, and the second NGC 30-2 as a device of the visitor network by being connected to the first CU 23-1, the first DU 24-1, or the first NGC 30-1 that is a device of the home network.

The microoperator allocates all or a part of the control plane processing to, for example, a Basic coverage cell provided by a PLMN operator, and allocates the user plane processing to the first gNB 20-1 including the first CU 23-1, the first DU 24-1, and the first RU 25-1 operating as a Capacity booster cell.

The embodiment in which the base station device (gNB 20) or the RU (Radio Unit) 25 installed, operated, and managed by the microoperator is shared by the PLMN operator has been described above. Although FIG. 10 illustrates the embodiment in which the second distributed unit (DU) 24-2 is connected to the radio unit (RU) 25 to constitute the second gNB 20-2, the present invention is not limited to this configuration.

For example, the second central unit (CU) 23-2 may construct an interface (for example, the F1 interface) with the first DU 24-1 constituting a part of the base station device (the first gNB 20-1) of the local 5G of the microoperator via the network communication unit 235-2, so that the second gNB 20-2 is constituted by the second CU 23-2, the first DU 24-1, and the RU 25. In this case, the control unit 242-1 of the first DU 24-1 implements a mapping unit (that is, a role of allocating data of two different operators to different frequency bands, different bands of the same frequency band, different periods of the same frequency band, or different wireless resources of the same frequency band) that plays a role equivalent to that of the mapping unit 2545 of the RU 25 (not illustrated in FIG. 17).

Alternatively, the second central unit (CU) 23-2 may construct an interface (for example, the Xn interface) with the first CU 23-1 constituting a part of the base station device (the first gNB 20-1) of the local 5G of the microoperator via the network communication unit 235-2, and the second gNB 20-2 may be constituted by the first CU 23-1, the first DU 24-1, and the RU 25. In this case, the control unit 233-1 of the first CU 23-1 implements a mapping unit (not illustrated in FIG. 16) that plays a role equivalent to that of the mapping unit 2545 of the RU 25 (That is, a role of allocating data of two different operators to different frequency bands, different bands of the same frequency band, different periods of the same frequency band, or different wireless resources of the same frequency band).

According to the present embodiment, by utilizing a cloud-based core network service provided by a service provider as a network as a service (NaaS), the local 5G business operator only needs to install, operate, and manage only the base station device by itself, and can reduce the burden. Moreover, when the PLMN operator providing the public 5G service shares the communication resources (operation frequency band, channel band, time interval, and the like) of the base station device installed by the local 5G operator, the local 5G operator can obtain a considerable reward from the PLMN operator. On the other hand, PLMN operators can increase the capacity of public 5G services at low cost.

Moreover, the local 5G business operator only needs to install, operate, and manage only a radio unit (RU) by itself by utilizing a cloud-based central unit (CU) and a distributed unit (DU) provided as a network as a service (NaaS) by a service provider, and can further reduce a burden.

The RU in this embodiment may be a part of a fixed station or a part of a mobile station. The mobile station is a wireless communication device (for example, a base station) configured to be movable. At this time, the base station device may be a device installed in a mobile body or may be a mobile body itself. Furthermore, a device that is originally a device having a mobile capability and has a function of a base station (at least a part of the function of the base station), such as a vehicle (including a railway), an unmanned aerial vehicle (UAV) typified by a drone, or a smartphone, also corresponds to a base station device as a mobile station.

Here, the moving object may be a mobile terminal such as a smartphone or a mobile phone. Furthermore, the moving body may be a moving body (for example, a vehicle such as an automobile, a bicycle, a bus, a truck, a motorcycle, a train, or a linear motor car) that moves on land (on the ground in a narrow sense) or a moving body (for example, the subway) that moves in the ground (for example, in the tunnel).

Furthermore, the moving body may be a moving body (for example, a ship such as a passenger ship, a cargo ship, or a hovercraft) that moves over water or a moving body (for example, submersibles such as submersibles, submersibles, and unmanned submersibles) that moves under water.

Moreover, the moving body may be a moving body (for example, an aircraft such as an airplane, an airship, or a drone) that moves in the atmosphere.

Note that the embodiments described above illustrate examples for embodying the present disclosure, and the present disclosure can be implemented in various other modes. For example, various modifications, substitutions, omissions, or combinations thereof are possible without departing from the gist of the present disclosure. Such modifications, substitutions, omissions, and the like are also included in the scope of the present disclosure, and are similarly included in the inventions disclosed in the claims and the equivalents thereof.

Furthermore, the effects of the present disclosure described in the present specification are merely an example, and other effects may be achieved.

Note that, the present disclosure can also have the following configurations.

(1) A radio unit belonging to a local network domain,
in which the radio unit connects to a first distributed unit and performs first communication between the first distributed unit and a terminal device, and
connects to a second distributed unit belonging to a public network domain and performs second communication between the second distributed unit and the or another terminal device.

(2) The radio unit according to (1), in which traffic for a non-public network is transmitted and received in the first communication.

(3) The radio unit according to (1), in which traffic for the public network is transmitted and received in the second communication.

(4) The radio unit according to (1), in which communication is performed using a band allocated to a non-public network in the first communication.

(5) The radio unit according to (1), in which communication is performed using a band allocated to the public network in the second communication.

(6) The radio unit according to (1), in which the first distributed unit belongs to the public network.

(7) The radio unit according to (1), in which the first distributed unit belongs to a service provider domain that is different from both the local network domain and the public network domain.

(8) The radio unit according to (1), in which the first communication is performed using a first resource, and the second communication is performed using a second resource.

(9) The radio unit according to (8), in which the first communication is performed using a first frequency band as the first resource, and the second communication is performed using a second frequency band as the second resource.

(10) The radio unit according to (8), in which the first communication is performed using a first time interval of a first frequency band as the first resource, and the second communication is performed using a second time interval of the first frequency band as the second resource.

(11) The radio unit according to (8), in which the first communication is performed using a first channel band of a first frequency band as the first resource, and the second communication is performed using a second channel band of the first frequency band as the second resource.

(12) The radio unit according to (8), in which different priorities are set to the first communication and the second communication, and the first resource and the second resource are allocated to the first communication and the second communication, respectively, on the basis of the priorities.

(13) The radio unit according to (8), in which at least one of the first resource and the second resource is selected on the basis of information regarding a frequency band in which the radio unit can operate and identification information for identifying a network.

(14) The radio unit according to (1), in which the second distributed unit connected to the radio unit is assigned with an address or identifier that is unique only in the public network domain, and the radio unit is assigned with an address or identifier that is unique only in the local network domain.

(15) The radio unit according to (7), in which the first distributed unit connected to the radio unit is assigned with an address or identifier that is unique only in the service provider domain, and the radio unit is assigned with an address or identifier that is unique only in the local network domain.

(16) A communication control method including:

connecting a radio unit belonging to a local network domain to a first distributed unit, and performing first communication between the first distributed unit and a terminal device; and connecting the radio unit to a second distributed unit belonging to a public network domain, and performing second communication between the second distributed unit and the terminal device or another terminal device.

(17) The radio unit according to (1), further including:

a processing unit in which a virtualized function or a container is implemented;

an acquisition unit that acquires the function implemented in the processing unit or identification information for identifying the container from another device; and a specification unit that specifies the function or the container on the basis of the identification information, in which the function or the container specified by the specification unit is implemented on the processing unit.

(18) The radio unit according to (17), in which the function or the container implemented in the processing unit is at least one of a part or all of functions of a PHY layer, a part or all of functions of a MAC sublayer, or a part or all of functions of an RLC sublayer.

(19) The radio unit according to (18), in which the acquisition unit acquires a first identifier related to the first communication and a second identifier related to the second communication, mounting a first function specified by the specifying unit or a first container in the processing unit on the basis of the first identifier; and a second function or a second container specified by the specifying unit is implemented in the processing unit on the basis of the second identifier.

(20) A management device that controls to perform first communication between a first distributed unit connected to a radio unit belonging to a local network domain and a terminal device, and controls to connect the radio unit belonging to the local network domain to a second distributed unit belonging to a public network domain and to perform second communication between the second distributed unit and the terminal device or another terminal device.

(21) The management device according to (20), in which control is performed to transmit and receive traffic for a non-public network in the first communication.

(22) The management device according to (20), in which control is performed to transmit and receive traffic for the public network in the second communication.

(23) The management device according to (20), in which control is performed to perform communication using a band allocated to a non-public network in the first communication.

(24) The management device according to (20), in which control is performed to perform communication using a band allocated to the public network in the second communication.

(25) The management device of (20), in which the first distributed unit belongs to the public network.

(26) The management device according to (20), in which the first distributed unit belongs to a service provider domain that is different from both the local network domain and the public network domain.

(27) The management device according to (20), in which control is performed such that the first communication is performed using a first resource and the second communication is performed using a second resource.

(28) The management device according to (27), in which control is performed such that the first communication is performed using a first frequency band as the first resource, and the second communication is performed using a second frequency band as the second resource.

(29) The management device according to (27), in which control is performed such that the first communication is performed using a first time interval of a first frequency band as the first resource, and the second communication is performed using a second time interval of the first frequency band as the second resource.

(30) The management device according to (27), in which control is performed such that the first communication is performed using a first channel band of a first frequency band as the first resource, and the second communication is performed using a second channel band of the first frequency band as the second resource.

(31) The management device according to (27), in which different priorities are set to the first communication and the second communication, and control is performed such that the first resource and the second resource are allocated to the first communication and the second communication, respectively, on the basis of the priorities.

(32) The management device according to (27), in which at least one of the first resource and the second resource is controlled to be selected on the basis of information regarding a frequency band in which the radio unit can operate and identification information for identifying a network.

(33) The management device according to (20), in which the second distributed unit is assigned with an address or an identifier unique only in the public network domain, and the radio unit is assigned with an address or identifier unique only in the local network domain.

(34) The management device according to (26), in which the first distributed unit is assigned with an address or an identifier unique only in the service provider domain, and the radio unit is assigned with an address or identifier unique only in the local network domain.

(35) A central unit that controls to perform first communication between a first distributed unit connected to a radio unit belonging to a local network domain and a terminal device, and to connect the radio unit to a second distributed unit belonging to a public network domain, and to perform second communication between the second distributed unit and the terminal device or another terminal device.

(36) The central unit according to (35), in which traffic for a non-public network is transmitted and received in the first communication.

(37) The central unit according to (35), in which traffic for the public network is transmitted and received in the second communication.

(38) The central unit according to (35), in which communication is performed using a band allocated to a non-public network in the first communication.

(39) The central unit according to (35), in which communication is performed using a band allocated to the public network in the second communication.

(40) The central unit according to (35), in which the first distributed unit belongs to the public network.

(41) The central unit according to (35), in which the first distributed unit belongs to a service provider domain that is different from both the local network domain and the public network domain.

(42) The central unit according to (35), further including a first radio resource control (RRC) unit that performs RRC processing related to the first communication.

(43) The central unit according to (42), in which the first RRC unit performs RRC processing related to the second communication.

(44) The central unit according to (43), further including an acquisition unit that acquires information necessary for the RRC processing related to the second communication from a core network belonging to the public network domain, in which the RRC processing related to the second communication is performed on the basis of the information acquired by the acquisition unit.

(45) The central unit according to (44), in which the information acquired by the acquisition unit is system information related to the second communication.

(46) The central unit of (42), in which a second RRC unit included in a second central unit connected to the second distributed unit transmits, to the second central unit, a message instructing to process RRC related to the second communication.

(47) The central unit according to (35), in which a second radio unit belonging to the public network domain is connected to the second distributed unit, and third communication is performed between the second distributed unit and the terminal device or another terminal device, and Dual Connectivity of adding, to the third communication performed by the second radio unit belonging to a first cell group, the second communication performed by the radio unit that belongs to the local network domain belonging to a second cell group is controlled.

(48) The central unit according to (47), in which the first distributed unit performs the second communication.

(49) The central unit according to (47), in which an RRC unit included in a second central unit connected to the second distributed unit processes, in addition to the third communication, RRC of the second communication added to the third communication.

(50) The central unit according to (47), in which the second distributed unit processes scheduling of the third communication and the second communication.

(51) The central unit according to (48), in which the second distributed unit processes scheduling of the third communication and the first distributed unit processes scheduling of the second communication.

(52) The central unit according to (35), in which a second radio unit belonging to the public network domain is connected to the second distributed unit, and third communication is performed between the second distributed unit and the terminal device or another terminal device, and Dual Connectivity of adding, to the third communication performed by the second radio unit belonging to a first cell, the second communication performed by the radio unit that belongs to the local network domain belonging to a second cell is controlled.

(53) The central unit according to (52), in which the first distributed unit performs the second communication.

(54) The central unit of (52), in which the first distributed unit acquires information related to a first frame timing of the first cell from the second distributed unit, and a second frame timing of the second cell is aligned with the first frame timing.

(55) The central unit of (52), in which information related to a first frame timing of the first cell is acquired from a second central unit connected to the second distributed unit, and an offset amount of a second frame timing of the second cell with respect to the first frame timing is calculated.

(56) The central unit according to (55), in which the offset amount is provided to the second central unit.

(57) The central unit according to (52), in which information related to a first frame timing of the second cell is provided to a second central unit connected to the second distributed unit, and the second central unit calculates an offset amount of the first frame timing with respect to a second frame timing of the first cell.

(58) The central unit according to (52), in which an interface is constructed between the first distributed unit and the second distributed unit, and information related to a first frame timing of the second cell is provided from the first distributed unit to the second distributed unit via the interface, and a second central unit connected to the second distributed unit calculates an offset amount of the first frame timing with respect to a second frame timing of the first cell.

(59) The central unit according to (55), (57), or (58), in which the information related to the first frame timing includes a correspondence between a timing specified by an arbitrary system frame number (SFN), a slot number or a symbol number and coordinated universal time (UTC).

(60) The central unit according to (35), in which a second radio unit belonging to the public network domain is connected to the second distributed unit, and third communication is performed between the second distributed unit and the terminal device or another terminal device, and transmission and reception points (multi-TRP) transmission and reception by the third communication performed by the second radio unit belonging to a first cell between the second distributed unit and the terminal device or another terminal device and the second communication performed by the radio unit that belongs to the local network domain belonging to a second cell is controlled.

(61) The central unit according to (60), in which the multi-TRP transmission and reception is diversity transmission and reception by the third communication and the second communication.

(62) The central unit according to (60), in which the Multi-TRP transmission and reception is spatial multiplexing transmission and reception by the third communication and the second communication.

(63) The central unit according to (60), in which the second distributed unit acquires information related to intercell interference (ICI) occurring between the radio unit and the second radio unit from the terminal device or another terminal device.

(64) The central unit according to (63), in which the second distributed unit performs allocation of data transmission and reception to wireless resources in the third communication and the second communication on the basis of the acquired information related to the ICI.

(65) The central unit according to (60), in which the second distributed unit acquires a measurement result of cross link interference (CLI) occurring between the radio unit and the second radio unit from the terminal device or another terminal device.

(66) The central unit according to (65), in which the second distributed unit adjusts DL-UL settings of time division duplex (TDD) in the third communication and the second communication on the basis of the acquired measurement result of the CLI.

(67) The central unit according to (60), in which the second distributed unit acquires first channel status information (CSI) between the terminal device or another terminal device and the radio unit and second CSI between the terminal device or another terminal device and the second radio unit from the terminal device or another terminal device.

(68) The central unit according to (67), in which the second distributed unit determines a parameter necessary for spatially multiplexing transmission and reception of data in the third communication and the second communication on the basis of the acquired first CSI and the acquired second CSI.

(69) The central unit according to (68), in which the parameter necessary for spatial multiplexing transmission and reception includes at least antenna ports and a number of layers.

REFERENCE SIGNS LIST

10 UE (User Equipment)
20 Base station device
201 Wireless front end unit
202 Digital front end unit
203 CU (Central Unit) (C-Plane)
204 CU (Central Unit) (U-Plane)
205 DU (Distributed Unit)
206 Control unit
207 Network communication unit
23 CU
231 CU (C-Plane)
232 CU (U-Plane)
233 Control unit
234 Information exchange unit
235 Network communication unit
236 Priority order determination unit
24 DU
241 Processing unit
242 Control unit
243 Information exchange unit
244 Network communication unit
245 Priority order determination unit
25 RU (Radio Unit)
250 Communication processing unit
251 Wireless front end unit
252 Digital front end unit
253 LOW-PHY unit
254 Control unit
255 Network communication unit
30 Core network
50 Management device
501 Storage unit
502 Control unit
503 Information exchange unit
504 Network communication unit

The invention claimed is:

1. A radio unit, comprising:

circuitry configured to:

connect to a first distributed unit via a first fronthaul, wherein the radio unit belongs to a local network domain;

perform first communication between the first distributed unit and a first terminal device;

connect to a second distributed unit via a second fronthaul, wherein the second distributed unit belongs to a public network domain; and perform second communication between the second distributed unit and one of the first terminal device or a second terminal device.

2. The radio unit according to claim 1, wherein the circuitry is further configured to:

transmit traffic for a non-public network in the first communication; and receive traffic for the non-public network in the first communication.

3. The radio unit according to claim 1, wherein the circuitry is further configured to:

transmit traffic for a public network in the second communication; and receive traffic for the public network in the second communication.

4. The radio unit according to claim 1, wherein the circuitry is further configured to perform the first communication based on a band associated with a non-public network.

5. The radio unit according to claim 1, wherein the circuitry is further configured to perform the second communication based on a band associated with a public network.

6. The radio unit according to claim 1, wherein the radio unit is connected to a public network, and the first distributed unit is associated with the public network domain of the public network.

7. The radio unit according to claim 1, wherein the radio unit is connected to a non-public network, the first distributed unit is associated with a service provider domain of the non-public network, and the service provider domain is different from both the local network domain and the public network domain.

8. The radio unit according to claim 1, wherein the circuitry is further configured to:

perform the first communication based on a first resource; and perform the second communication based on a second resource.

9. The radio unit according to claim 8, wherein the first resource includes a first frequency band, and the second resource includes a second frequency band.

10. The radio unit according to claim 8, wherein the first resource includes a first time interval of a first frequency band, and the second resource includes a second time interval of the first frequency band.

11. The radio unit according to claim 8, wherein the first resource includes a first channel band in a first frequency band, and the second resource includes a second channel band in the first frequency band.

12. The radio unit according to claim 8, wherein the first communication is associated with a first priority, the second communication is associated with a second priority different from the first priority, and the first resource and the second resource are allocated to the first communication and the second communication, respectively, based on first priority and the second priority.

13. The radio unit according to claim 8, wherein the circuitry is further configured to receive an instruction that indicates at least one of the first resource or the second resource, and the reception of the instruction is based on each of;

information that indicates an operation frequency band associated with in which the radio unit, and identification information that identifies a network.

14. The radio unit according to claim 1, wherein the second distributed unit, connected to the radio unit, is associated with one of an address or an identifier that is unique in the public network domain, and the radio unit is associated with one of an address or an identifier that is unique in the local network domain.

15. A management device, comprising:

circuitry configured to control a radio unit to:

connect to a first distributed unit via a first fronthaul, wherein the radio unit belongs to a local network domain;

perform first communication between the first distributed unit and a first terminal device;

connect to a second distributed unit via a second fronthaul, wherein the second distributed unit belongs to a public network domain; and perform second communication between the second distributed unit and one of the first terminal device or a second terminal device.

16. The management device according to claim 15, wherein the circuitry is further configured to control the radio unit to:

perform, based on a first resource, the first communication; and perform, based on a second resource, the second communication.

17. The management device according to claim 16, wherein the first resource includes a first frequency band, and the second resource includes a second frequency band.

18. The management device according to claim 16, wherein the first resource includes a first time interval of a first frequency band, and the second resource includes a second time interval of the first frequency band.

19. The management device according to claim 16, wherein the first resource includes a first channel band of a first frequency band, and the second resource includes a second channel band of the first frequency band.

20. A communication control method, comprising:

connecting a radio unit to a first distributed unit via a first fronthaul, wherein the radio unit belongs to a local network domain;

performing first communication between the first distributed unit and a first terminal device;

connecting the radio unit to a second distributed unit via a second fronthaul, wherein the second distributed unit belongs to a public network domain; and performing second communication between the second distributed unit and one of the first terminal device or a second terminal device.

* * * * *